United States Patent
Wilde et al.

(10) Patent No.: US 10,032,431 B2
(45) Date of Patent: Jul. 24, 2018

(54) MOBILE COMPUTING DEVICE TECHNOLOGY AND SYSTEMS AND METHODS UTILIZING THE SAME

(71) Applicants: Myles Wilde, Charlestown, MA (US); Matthew J. Adiletta, Bolton, MA (US); William R. Wheeler, Southborough, MA (US); Michael F. Fallon, Tiverton, RI (US); Thomas M. Garrison, Lake Oswego, OR (US); Aaron Gorius, Upton, MA (US); Chengda Yang, Auburndale, MA (US)

(72) Inventors: Myles Wilde, Charlestown, MA (US); Matthew J. Adiletta, Bolton, MA (US); William R. Wheeler, Southborough, MA (US); Michael F. Fallon, Tiverton, RI (US); Thomas M. Garrison, Lake Oswego, OR (US); Aaron Gorius, Upton, MA (US); Chengda Yang, Auburndale, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/768,141

(22) PCT Filed: Mar. 13, 2014

(86) PCT No.: PCT/US2014/025648
§ 371 (c)(1),
(2) Date: Aug. 14, 2015

(87) PCT Pub. No.: WO2014/151397
PCT Pub. Date: Sep. 25, 2014

(65) Prior Publication Data
US 2016/0027399 A1 Jan. 28, 2016

Related U.S. Application Data

(60) Provisional application No. 61/790,092, filed on Mar. 15, 2013.

(51) Int. Cl.
*G09G 5/00* (2006.01)
*H04L 29/06* (2006.01)
(Continued)

(52) U.S. Cl.
CPC ........... *G09G 5/003* (2013.01); *G06F 13/382* (2013.01); *G06T 1/60* (2013.01); *H04L 65/1083* (2013.01);
(Continued)

(58) Field of Classification Search
CPC .......................... G09G 5/003; G09G 2370/16;
H04L 65/1083; H04N 5/38; H04W 4/008;
H04W 4/18
See application file for complete search history.

(56) References Cited

U.S. PATENT DOCUMENTS 6,973,037 B1 * 12/2005 Kahveci ............. H04Q 11/0464
370/236
8,601,601 B2 * 12/2013 Meyerson ........... G06F 21/6218
380/205
(Continued)

FOREIGN PATENT DOCUMENTS

JP       2006092024 A    4/2006
JP       2006216006 A    8/2006
(Continued)

OTHER PUBLICATIONS

International Search Report and Written Opinion received for PCT Application No. PCT/US2014/025648, dated Aug. 30, 2014, 14 pages.
(Continued)

*Primary Examiner* — Jacinta M Crawford
(74) *Attorney, Agent, or Firm* — Grossman, Tucker, Perreault & Pfleger, PLLC

(57) ABSTRACT

Mobile computing device technology and systems and methods using the same are described herein. In particular, mobile computing devices that may serve as a processing component of a disaggregated computing system described, non-integral screens that may be paired with the mobile computing devices, and systems and methods using such devices and screens are described. In some embodiments, the mobile computing device technology includes a mobile computing device that lacks an integral screen, but which is capable of throwing at least video information to a non-integral target screen, e.g., via a paired connection established over a wired or wireless communication interface.

25 Claims, 22 Drawing Sheets

(51) Int. Cl.
*G06F 13/38* (2006.01)
*H04N 19/423* (2014.01)
*H04N 19/44* (2014.01)
*G06T 1/60* (2006.01)
*H04N 5/38* (2006.01)
*H04W 4/18* (2009.01)
*H04W 4/21* (2018.01)
*H04W 4/80* (2018.01)
*H04W 76/14* (2018.01)

(52) U.S. Cl.
CPC ........... *H04L 65/4084* (2013.01); *H04N 5/38* (2013.01); *H04N 19/423* (2014.11); *H04N 19/44* (2014.11); *H04W 4/18* (2013.01); *H04W 4/21* (2018.02); *H04W 4/80* (2018.02); *H04W 76/14* (2018.02); *G09G 2370/16* (2013.01)

(56) References Cited

U.S. PATENT DOCUMENTS

| | | | |
|---|---|---|---|
| 9,857,193 | B2 | 1/2018 | Vulcano et al. |
| 2004/0192206 | A1 | 9/2004 | Hirvonen |
| 2005/0037736 | A1 | 2/2005 | Jung |
| 2006/0061580 | A1 | 3/2006 | Kohji et al. |
| 2007/0288971 | A1* | 12/2007 | Cragun .............. H04N 21/4333 725/90 |
| 2009/0023389 | A1 | 1/2009 | Paryani |
| 2010/0052870 | A1 | 3/2010 | King |
| 2010/0077586 | A1 | 4/2010 | Haehnle et al. |
| 2010/0165216 | A1 | 7/2010 | Beals |
| 2010/0278345 | A1 | 11/2010 | Alsina et al. |
| 2011/0010607 | A1 | 1/2011 | Raveendran |
| 2011/0080935 | A1 | 4/2011 | Kim et al. |
| 2011/0227827 | A1 | 9/2011 | Yoram et al. |
| 2011/0237189 | A1 | 9/2011 | Ye et al. |
| 2011/0258329 | A1* | 10/2011 | Lee .................... H04L 63/0815 709/227 |
| 2012/0030769 | A1* | 2/2012 | De Laet .................. H04N 7/16 726/26 |
| 2012/0083208 | A1 | 4/2012 | Giles et al. |
| 2012/0146918 | A1 | 6/2012 | Kreiner et al. |
| 2012/0223883 | A1 | 9/2012 | Yoram |
| 2012/0274443 | A1 | 11/2012 | Kai et al. |
| 2012/0324517 | A1 | 12/2012 | Ogle et al. |
| 2013/0031261 | A1 | 1/2013 | Suggs |
| 2013/0162502 | A1* | 6/2013 | Lee ........................ G09G 5/003 345/1.2 |
| 2014/0176436 | A1* | 6/2014 | Raffa ...................... G06F 3/017 345/158 |

FOREIGN PATENT DOCUMENTS

| | | |
|---|---|---|
| JP | 2012237748 A | 12/2012 |
| JP | 2012533220 A | 12/2012 |
| RU | 2289218 C2 | 12/2006 |
| WO | 2012037139 A2 | 3/2012 |

OTHER PUBLICATIONS

Taiwan Office Action from related Taiwan Patent Application 103109573 dated Apr. 6, 2016.
Korean Office Action from related Korean Patent Application 10-2015-7021672 dated May 18, 2016.
Taiwanese Office Action issued in Taiwanese Application No. 103109573, dated Aug. 25, 2016, with English translation, 8 pages.
Russian Office Action issued in Russian Application No. 2015134171, dated Sep. 1, 2016, with English translation, 12 pages.
Japanese Office Action issued in Japanese Application No. 2015-560410, dated Sep. 20, 2016, with English translation, 12 pages.
Extended European Search Report issued in European Application No. 14768115.9, dated Oct. 25, 2016, 8 pages.
International Preliminary Report on Patentabiltiy received for PCT Application No. PCT/US2014/025648, dated Sep. 15, 2015.
Chinese Office Action issued in Chinese Application No. 201480010020.5, dated Apr. 19, 2017, with English machine translation, 39 pages.
Chinese Office Action issued in Chinese Application No. 201480010020.5, dated Jan. 1, 2018, with English machine translation, 41 pages.
Taiwanese Office Action issued in Taiwanese Application No. 103109573, dated Nov. 8, 2017, with English translation, 4 pages.

\* cited by examiner

Framethrower Protocol

Framethrower Dynamic Compression

Streamthrower Protocol

Concurrent Connection For Quality of Service

Screen Orientation Methodology

Gesture Based Application Initiation

Gesture/Input Device Security

Motion/Gesture Based
Digital Pointer Control

MOBILE COMPUTING DEVICE TECHNOLOGY AND SYSTEMS AND METHODS UTILIZING THE SAME

FIELD

The present disclosure relates to mobile computing device technology and systems and methods using the same. More particularly, the present disclosure relates to mobile computing devices that may serve as a processing component of a disaggregated computing system, non-integral screens that may be paired with the mobile computing devices, and systems and methods using such devices.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAILED DESCRIPTION

Figure 1:
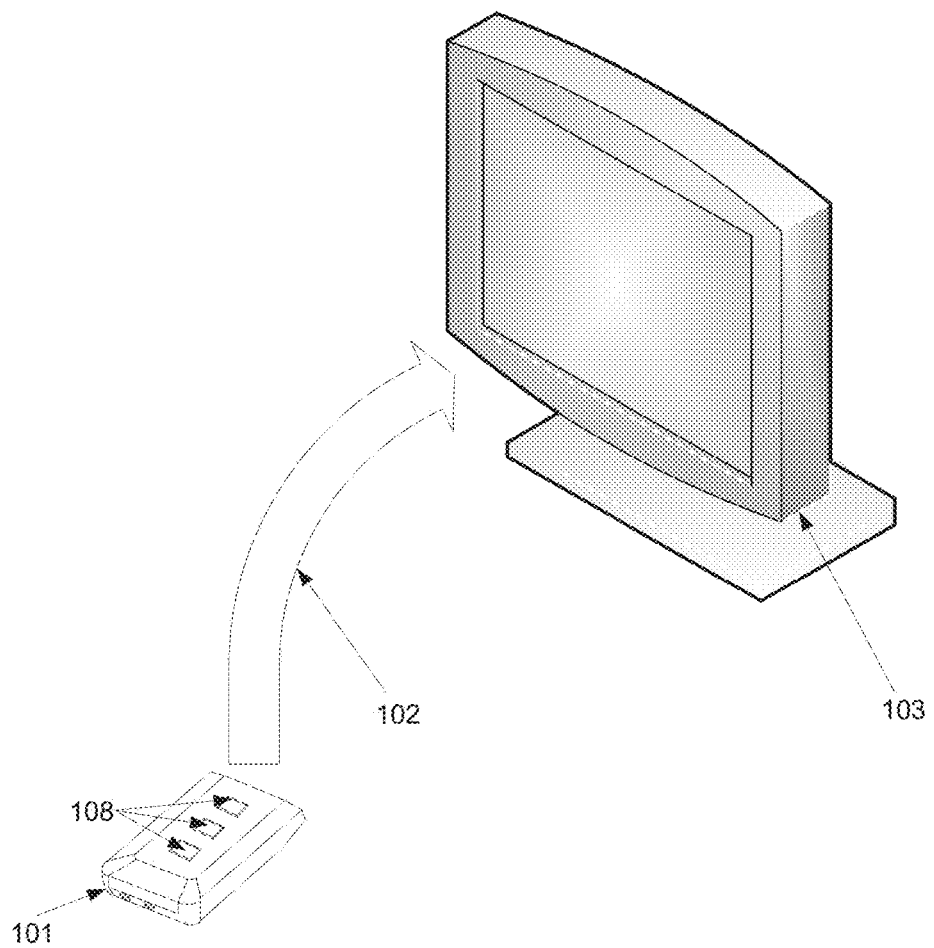
FIG. 1 illustrates a mobile computing system including a mobile computing device and a screen consistent with the present disclosure.

The terms, "communications network," and "communications networks" are interchangeably used herein to refer to one or more systems and/or methods for sending and/or receiving a data signal. These terms encompass short range communication and long range communication.

The term, "short range communication" is used herein to refer to systems and methods for wirelessly sending/receiving data signals between devices that are relatively close to one another. Short range communication includes, for example, communication between devices using a BLUETOOTH® network, a personal area network (PAN), near field communication, radio frequency identification (RFID), ZigBee networks, an INTEL® Wireless Display (WiDi) connection, an INTEL® WiGig (wireless with gigabit capability) connection, millimeter wave communication, ultra high frequency (UHF) communication, combinations thereof, and the like. Short range communication may therefore be understood as enabling direct communication between devices, without the need for intervening hardware/systems such as routers, cell towers, internet service providers, and the like.

In contrast, the term, "long range communication" is used herein to refer to systems and methods for wirelessly sending/receiving data signals between devices that are a significant distance away from one another. Long range communication includes, for example, communication between devices using WiFi, a wide area network (WAN) (including but not limited to a cell phone network (3G, 4G, etc. and the like), the internet, a global positioning system (GPS), a television whitespace network, combinations thereof and the like. Long range communication may therefore be understood as enabling communication between devices through the use of intervening hardware/systems such as routers, cell towers, television whitespace towers, internet service providers, combinations thereof, and the like.

As used in any embodiment herein, the term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hard-wired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a client device or an authentication device.

For the sake of clarity and ease of understanding, the present disclosure often describes mobile computing devices and screens as including one or more modules stored in a memory, wherein the module(s) include(s) computer readable instructions which when executed by a processor of the pertinent device (mobile computing device or screen), cause the device to perform various operations. It should be understood that such descriptions are exemplary, and that mobile computing devices and screens may be configured to perform operations described in association with one or more modules in another manner. By way of example, the mobile computing devices and screens described herein may include logic that is implemented at least in part in hardware to cause the performance of one or more operations consistent with the present disclosure, such as those described in association with various modules identified herein. In this regard, it is noted that "logic" as used herein may include discrete and/or analog circuitry, including for example, a general-purpose processor, digital signal processor (DSP), system on chip (SoC), state machine circuitry, hardwired circuit elements, application specific integrated circuits, combinations thereof, and the like.

The use of mobile devices such as cellular phones, smart phones, tablet personal computers, and laptop personal computers has increased dramatically. In view of the widespread adoption of these mobile technologies, microprocessor developers are increasingly focusing on the development of processors that exhibit both high performance and low power consumption. One goal of such development is to increase processing capability, while maintaining or even increasing battery life of the underlying device. In some instances, it has been demonstrated that shrinking the size of processor components can improve processor performance while simultaneously reducing power consumption. In the coming years, it is expected that manufacturing techniques will have enabled the production of processors with "desktop-like" computing performance as well as power consumption that is low enough to be used in a mobile device.

In recent years consumer demand has trended towards mobile devices that have large integral displays but which are thin enough to fit in a pocket or a small bag. Improved manufacturing techniques have allowed device manufacturers to increasingly miniaturize the driving electronics of such devices. Although this has enabled the production of increasingly thin devices, the length and width dimensions of current mobile devices is often constrained by the requirement of an integral display. While further miniaturization of the driving electronics may enable further reductions in device thickness, the length and width of a mobile device may be dictated by the corresponding dimensions of an integral display. This may limit the degree to which a mobile device may be miniaturized as a whole.

The present disclosure is generally directed to mobile computing technology that includes one or more mobile computing devices having the capability to transmit or "throw" video information to a locally present but not integral screen for display thereof. As will be discussed in detail below, this capability may eliminate the need for an integral display in the mobile computing device, opening avenues for new and smaller form factors. Technology for interacting with a mobile computing device that lacks an integral screen and/or that throws display information to a non-integral screen is also described. The mobile computing devices may also include advanced communications and network technology, which may enable them to seamlessly connect with one another and other compatible devices, e.g., to establish a connection to a wide area network such as the internet or another data communications system. Various systems and methods that utilize a mobile computing device consistent with the present disclosure are also described.

As noted previously, the mobile computing devices described herein have the capability to transmit or "throw" video information to a locally present but non-integral screen for display. This concept is generally illustrated in FIG. 1, wherein mobile device 101 is depicted as transmitting video information 102 to screen 103. As shown, display 103 is locally present/proximate (e.g., within the same room or environment as) device 101, but is not integral with device 101.

For clarity and ease of illustration, mobile device 101 is depicted in FIG. 1 in a form factor that does not include an integral display. This illustration is exemplary only, and it should be understood that mobile device 101 may have any suitable form factor. For example, mobile device 101 may have a form factor consistent with any number of mobile electronic devices such as cellular phones, electronic readers, eyewear, mobile game consoles, netbook computers, notebook computers, internet devices, personal digital assistants, media players and/or recorders, smart phones, tablet personal computers, ultra-mobile personal computers, wearable computing devices, and combinations thereof. Without limitation, device 101 preferably is in a form factor that does not include an integral display, or which includes a relatively small integral display. Of course, mobile device 101 may be in another form factor, and may be equipped with an integral display of any desired size. Nonetheless, it should be understood that the term "mobile computing device" is exclusive of computing devices that are or are designed to be installed or otherwise maintained in a single location for a significant period of time (e.g., desktop computers, routers, network servers, etc.) such as would be understood by those of skill in the art.

Also for clarity and ease of illustration, screen 103 has been depicted in FIG. 1 in the form of a computer monitor. This illustration is exemplary, and it should be understood that screen 103 may be in any suitable form, and may form part of another device such as an independent computing system. For example, screen 103 may be in the form of a computing terminal display, a desktop computer display, a laptop computer display, a mobile phone display, a smart phone display, a tablet personal computer display, a kiosk display, an automated teller machine display, a vehicle (e.g., airplane, automobile, bicycle, motorcycle, train, etc.) display, a medical device (e.g., electrocardiogram display), a display of a record system (e.g., a medical record system), a display of a financial transaction system, a mobile game console display, a projector, a television, an ultramobile personal computer display, a wearable display (e.g., in the form of eyewear, a watchband, a necklace, or the like), a smart badge display, combinations thereof, and the like. Without limitation, screen 103 is preferably in the form of a display for a desktop or mobile computer, the display of a desktop computer, the display of a mobile device such as a smart phone, laptop computer, or tablet personal computer, a kiosk display, a public computer terminal display, a television, or a combination thereof.

In some embodiments screen 103 may be in the form of a "dumb screen." As used herein, the term "dumb screen"

refers to a display that has the capability operate as a computer or television monitor that is capable of receiving data wirelessly or via wired connection. For example, a dumb screen may include application specific integrated circuits or other circuitry to process (e.g., video and/or audio) data in a specific manner (e.g., to receive and decode network packets, upscale video data, interpret video formats, etc. In some embodiments, the dumb screens described herein may be designed for low cost and/or low compute intensive operations. Non-limiting examples of "dumb screens" consistent with the present disclosure include televisions lacking general purpose computing capability, independent computer monitors (e.g., monitors not connected to a central processing unit), display docks (as described below), projectors, combination thereof, and the like.

In other embodiments screen 103 may be in the form of a "smart screen." As used herein, the term "smart screen" refers to a display that is either highly integrated with a computer subsystem (circuit board, common power supply, etc) or a display that has the ability to be programmed by the user or manufacturer to perform tasks other than to receive and display video data. Non-limiting examples of smart screens that may be used include displays that are coupled to a computer (e.g., such as a laptop computer, desktop computer, electronic reader, personal data assistant, smart phone, tablet, cellular phone, kiosk, etc.) and displays that include their own general purpose processor.

While the present disclosure makes frequent reference to smart and dumb screens as independent devices, such screens need not be independent of other machinery, circuitry, or the like. Indeed, the smart and dumb screens described herein may form all or a part of another mechanical and/or electrical device. For example, the smart and dumb screens described herein may form part of an airplane, automobile, bicycle, motorcycle, snowmobile, medical device, heads up display, a control interface, an electronic shopping portal, a restaurant menu, binoculars, eyewear, food preparation tools, record systems, transaction systems, the smart screens noted above, combinations thereof, and the like.

Figure 2:
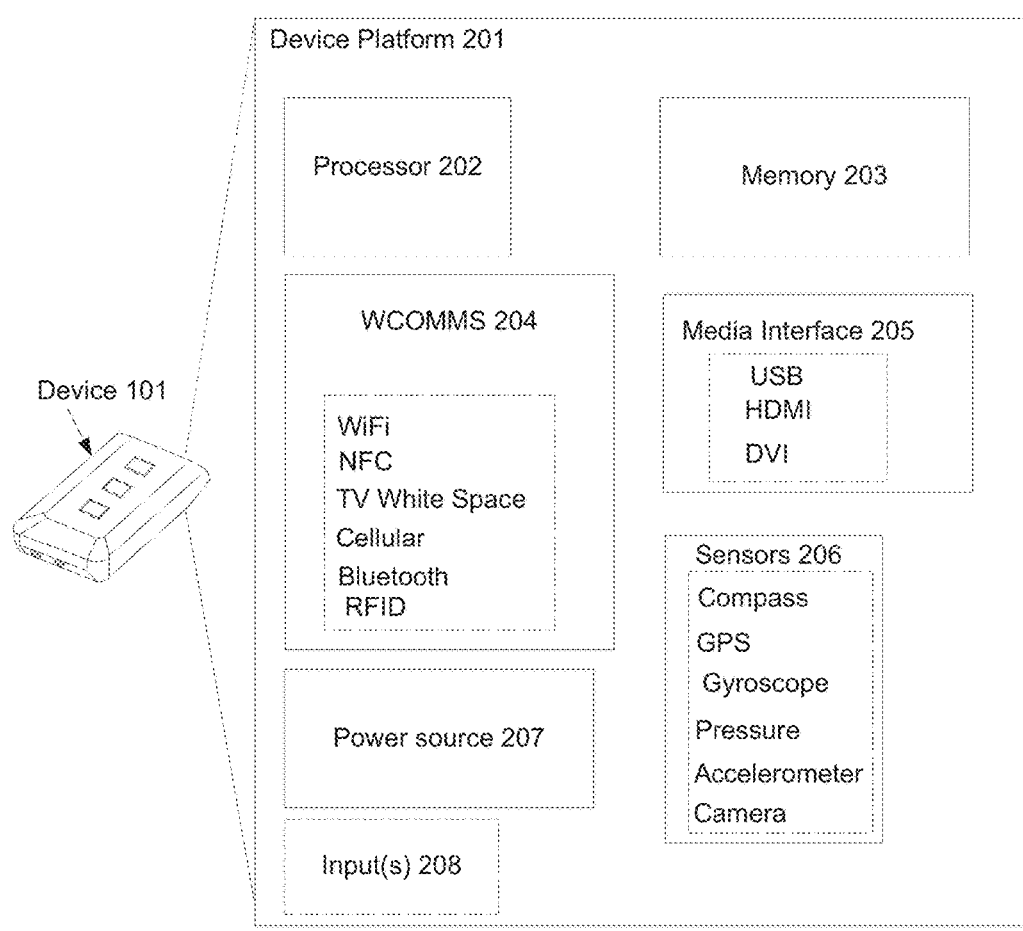
FIG. 2 is a block diagram of an exemplary architecture of a mobile computing device consistent with the present disclosure.

Reference is now made to FIG. 2, which depicts a block diagram of an exemplary architecture of a mobile computing device consistent with the present disclosure. As shown, device 101 includes device platform 201. Without limitation, device platform 201 may correlate to one or more of the device form factors mentioned above as suitable for use as device 101. Accordingly, device platform 201 may be a cellular phone platform, electronic reader platform, eyewear platform, mobile game console platform, netbook computer platform, notebook computer platform, internet device platform, personal digital assistant platform, media player and/or recorder platform, smart phone platform, tablet personal computer platform, ultra-mobile personal computer platform, wearable computing device platform, or a combination thereof.

As shown in FIG. 2, device platform 201 may include processor 202, memory 203, wireless communication interface (WCOMMS) 204, media interface circuitry 205, sensors 206, power source 207, and optional inputs 208.

Processor 202 may be any suitable processor. For example, processor 202 may be a single or multi-core processor, a general purpose processor, an application specific integrated circuit, combinations thereof, and the like. Without limitation, processor 202 is preferably one or more processors offered for sale by INTEL® Corporation, NVIDIA®, ARM®, Advanced Micro Devices (AMD®), SAMSUNG® or APPLE®. Non-limiting examples of suitable processors include the Atom, Nehalem, Ivy Bridge, and Sandy Bridge lines of processors sold by INTEL®.

Memory 203 may include any suitable type of memory, such as semiconductor firmware memory, programmable memory, non-volatile memory, read only memory, electrically programmable memory, random access memory, flash memory (which may include, for example, NAND or NOR type memory structures), magnetic disk memory, and/or optical disk memory. Additionally or alternatively, memory 203 may include other and/or later-developed types of computer-readable memory. Memory 203 may be integral with processor 202, separate from processor 202, or a combination thereof. As will be discussed later, memory 203 may store one or more modules that include computer readable instructions that when executed by processor 202 may cause device 101 to perform functions consistent with the present disclosure.

WCOMMS 204 may include hardware (e.g., circuitry), software, or a combination of hardware and software that allows device 101 to send and receive signals over one or more communications networks. For example, WCOMMS 204 may include one or more antennas, transmitters, receivers, transceivers, transponders, network interface communications circuitry, and combinations thereof that permit device 101 to send and receive signals via one or more communications networks, including a long range communications network, short range communication network, or a combination thereof. Accordingly, WCOMMS 204 may include hardware and/or software that permits device 101 to communicate using WiFi, near field communication, television white space, radio frequency identification (RFID) a cellular network, BLUETOOTH®, a personal area network, millimeter wave communication, communication using ultra high frequency (UHF) (e.g., using frequencies in the range of about 300 megahertz to about 3000 megahertz) or a combination thereof using an appropriate wireless communications protocol.

Device platform 201 may further include media interface 205. In general, media interface 205 may be configured to facilitate the communication of signals containing data, audio and/or visual (display) information to and from device 101 over a wired communication interface. Thus for example, media interface 205 may include a high definition multimedia interface (HDMI), a digital video interface (DVI), a universal serial bus (USB) interface, combinations thereof, and the like. Without limitation, device platform 201 preferably includes HDMI and DVI interfaces and associated connectors. Alternatively or additionally, media interface 205 may include one or more docking ports that may mate with a corresponding connector of a smart or dumb screen. Such docking ports may comprise a DVI, HDMI, and/or USB port, or another type of docking port.

As will be described in detail later, device 101 may use one or a combination of WCOMMS 204 and media interface 205 to transmit signals (e.g., media signals, video signals, etc.) containing video information to one or more dumb or smart screens. Without limitation, device 101 preferably is configured to wirelessly transmit video information via WCOMMS 204.

Device platform 201 may also include sensors 206. Sensors 206 may include any type of sensor that is capable of detecting objects, signals, inputs or other information that may be of interest to a user of device 101 and/or an application executed on device 101. Non-limiting examples of sensors that may be used as sensors 206 include optical sensors such as a camera, location sensors such as a global positioning system, orientation sensors such as a gyroscope and/or compass, tactile sensors such as a pressure sensor or touch screen, motion sensors such as an accelerometer, biometric sensors such as a thumb print sensor and/retinal scanner, combinations thereof and the like. In some embodiments, device 101 includes all of the aforementioned sensor types.

Device platform 201 also includes power source 207. Power source 207 may be any suitable source of electric power for device 101 and the components thereof. Non-limiting examples of suitable sources of electric power that may be used as power source 207 include non-rechargeable batteries, rechargeable batteries such as nickel-cadmium batteries, nickel-metal hydride batteries, lithium ion batteries, lithium ion polymer batteries and lead acid batteries, fuel cells, later developed sources of electric power, AC or DC corded power, combinations thereof, and the like. Without limitation, power source 207 is preferably configured to provide supply sufficient electric power to enable device 101 and the components thereof to operate at a particular operational load for a desired period of time.

If power source 207 is configured as a rechargeable source of power such as a rechargeable battery, it may be recharged using any suitable mechanism. For example, power source 207 may be recharged by plugging device 101 into a source of power using a wired connection (e.g., AC and/or DC corded power). Alternatively or additionally, power source 207 may be recharged wirelessly, for example using electromagnetic induction, electrodynamic induction, electrostatic induction, combinations thereof, and the like. Alternatively or additionally, power source 207 may be charged using electromagnetic radiation, such as microwave radiation, a laser, combinations thereof, and the like. In the latter instance, device 101 may include a receiver configured to receive electromagnetic radiation from a source, and convert that radiation into electric power which may be used for recharging purposes. Device platform 201 may optionally include one or more inputs devices, shown in FIG. 2 as input(s) 208. Such inputs may be integral with, physically connected to, and/or wirelessly connected to device 101. Exemplary input devices that may be used include buttons, touch panels, input devices (e.g., a trackball, trackpad, keyboard, etc.), combinations thereof, and the like. Of course, such input devices are exemplary only, and any suitable input device may be used. Without limitation, optional inputs 208 preferably include one or more buttons. This concept is shown in FIG. 1, wherein device 101 includes three buttons 108. Of course, the number of buttons in FIG. 1 is exemplary only, and any number of buttons may be used.

Because device 101 need not include an integral display, it may be produced in any suitable form factor, including form factors that are volumetrically smaller than current mobile devices that include an integral display. For example, device 101 may be sized to fit in the average palm of a human hand, within a watchband, within eyewear, etc. In some embodiments, device 101 may be sized so as to be wearable within or on an article of clothing, such as within or on the collar and/or cuffs of a shirt, on or within a shirt pocket, on or within a pants pocket, combinations thereof, and the like.

The dumb and smart screens disclosed herein may be configured to display video information received from a mobile computing device consistent with the present disclosure, e.g., in one or more media/video signals. Any suitable smart or dumb screen may be used, provided that it has the necessary connectivity to enable reception of signals containing video information from a mobile computing device consistent with the present disclosure and the ability to interpret those signals and display the video information contained therein. As will be described in detail later, such signals may be formatted for transmission over a wired or wireless connection. Accordingly, any dumb/smart screen with appropriate physical and/or wireless capabilities may be used.

Figure 3:
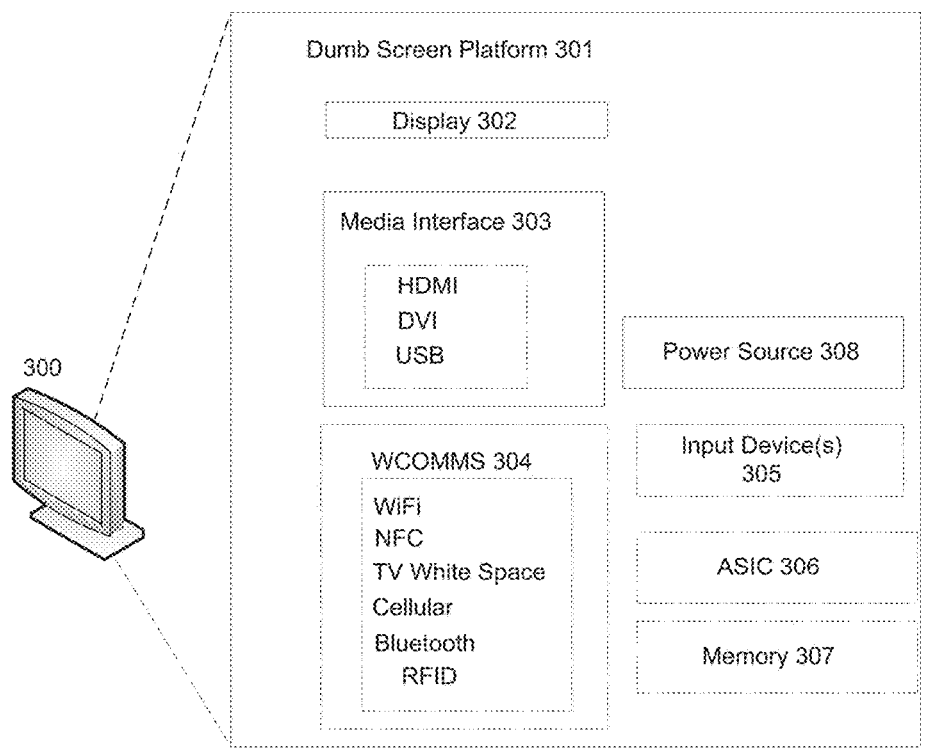
FIG. 3 is a block diagram of an exemplary architecture of a dumb screen consistent with the present disclosure.

Reference is now made to FIG. 3, which depicts a block diagram of an exemplary architecture of a dumb screen consistent with the present disclosure. As shown, dumb screen 300 includes dumb screen platform 301. Dumb screen platform 301 may be any suitable dumb screen platform, and may for example correlate to a platform consistent with the exemplary types of dumb screens noted above. For the sake of illustration, dumb screen 300 is illustrated in FIG. 3 in the form of an independent monitor (e.g., a television) and thus, dumb screen platform 301 may be an independent monitor platform, such as a television platform. Dumb screen platform 301 has also been illustrated with limited components for the sake of clarity and ease of understanding, and it should be understood that illustrated configuration is exemplary. Indeed, dumb screen platform 301 may include other components that may be commonly found in such screens.

Dumb screen platform 301 includes display 302, media interface 303, and optional wireless communications interface WCOMMS 304. Display 302 may be any suitable type of display, such as an electronic ink display, light emitting diode display, liquid crystal display, plasma display, phosphor display, organoluminescent display, organic light emitting diode display, another type of display, or a combination thereof.

In general, media interface 303 may be configured to facilitate the reception of data, audio and/or visual (display) information by screen dumb 300 from a mobile computing device over a wired connection with such computing device. Thus for example media interface 303 may include a high definition multimedia interface (HDMI), a digital video interface (DVI), a wired universal serial bus (USB) interface, combinations thereof, and the like. Without limitation, dumb screen platform 301 preferably includes both HDMI and DVI interfaces and associated connectors as media interface 303. Alternatively or additionally, media interface 303 may include one or more docking ports that may mate with a corresponding connector of a mobile computing device consistent with the present disclosure. Such docking ports may include a DVI port, HDMI port, a USB port, another type of docking port, and combinations thereof.

Dumb screen 301 may optionally further include WCOMMS 304. WCOMMS 304 may include hardware (e.g., circuitry), software, or a combination of hardware and software that allows dumb screen 300 to receive (and optionally send) signals over one or more communications networks. For example, WCOMMS 204 may include one or more antennas, transmitters, receivers, transceivers, transponders, network interface communications circuitry, and combinations thereof that permit dumb screen 300 to receive (and optionally send) signals from a mobile computing device via one or more communications networks, including a long range communications network, short range communication network, or a combination thereof. Accordingly, WCOMMS 204 may include hardware and/or software that permits screen 300 to receive communications from device 101 using WiFi, wireless USB, near field communication, television white space, radio frequency identification (RFID), a cellular network, BLUETOOTH™, a personal area network, or a combination thereof using an appropriate communications protocol.

As will be described in detail later, dumb screen 300 may be configured to receive video information from a mobile computing platform such as device 101 via media interface 303, WCOMMS 304, or a combination thereof. Without limitation, dumb screen is preferably configured to receive video information from a mobile computing device via WCOMMS 304.

Dumb screen platform 301 may optionally further include one or more input devices 305. If included, input device(s) 305 may be in wired or wireless communication with dumb screen 300. Input device(s) 305 may for example be a touch screen interface of display 302, a computer mouse, keyboard, trackball, trackpad, or other input device such as a sensor, a button, or a switch. As will be described in detail later, input device(s) 305 if included may be used to interact with applications executed on a mobile computing device and displayed on dumb screen 300. In such instances, dumb screen platform may include application specific integrated circuits (such as optional ASIC 306 in FIG. 3) or another type of processor that is configured to monitor for inputs (e.g., events) made with input device(s) 305 and report input information to a mobile computing device consistent with the present disclosure.

Dumb screen platform 301 may optionally include memory 307. Memory 307 may be integral with or separate from optional ASIC 306, and may be any suitable type of memory, such as the memory types previously specified as suitable for use with the mobile computing devices of the present disclosure. If present, memory 307 may include one or more software/firmware modules that when executed cause dumb screen to perform device pairing and/or input monitoring functions consistent with the present disclosure. For example, memory 307 may include a device pairing module ("DPM", not shown) that includes computer readable instructions that when executed by an application specific processor of dumb screen platform 301 cause or facilitate the pairing of dumb screen 300 with a mobile computing device over a wired or wireless communications interface, such as may be provided media interface 303 or WCOMMS 304.

Specifically, memory 307 may include a device pairing module ("DPM"; not shown) that includes computer readable instructions that when executed by application specific processor 306 may cause or facilitate the pairing of dumb screen 300 with a mobile computing device consistent with the present disclosure. Once dumb screen 300 has paired with a mobile computing device, it may receive video and other information from the mobile computing device, e.g., via media interface 303 or WCOMMS 304. In the former case, video and other information received from a mobile computing device may be included in signals (e.g., media/video signals) formatted appropriately for DVI, HDMI, and/or USB video, and thus may be readily displayed by dumb screen 300 using an appropriate interface of media interface 303.

In the latter case, video and other information received from a mobile computing device may be encapsulated in one or more packets that are transmitted to dumb screen 300 over a wireless connection. In such instances, dumb screen platform 301 may include an ASIC 306 (or another type of processor) and a video decode module (not shown) stored in memory 307. The video decode module may include computer readable decode module instructions (e.g., JAVA or other code) which when executed by ASIC 306 or another processor cause dumb screen 300 to decode packets received from a mobile computing device to obtain the video information contained therein. The decode module instructions when further executed may cause dumb screen 300 to display the video information thus obtained.

Memory 307 may also store one or more input device monitoring modules ("IDMM"; not shown). If included, an IDMM may include computer readable instructions that when executed by a processor (e.g., ASIC 306 or another processor) cause the performance of input device monitoring and reporting operations consistent with the present disclosure. For example, the instructions of the IDMM when executed may cause dumb screen 300 (e.g., ASIC 306) to monitor for events associated with optional input device(s) 305, such as mouse click operations, mouse click and release operations, a touch input (if input(s) 305 include a touch screen, swipe operations, motion operations, combinations thereof, and the like. Upon detection of a such an event, IDMM when executed may cause the processor to report such events as input information to a mobile computing device, e.g., via media interface 303 (in the case of a wired communications link between dumb screen 300 and a mobile computing device), a docking interface ((not shown), a wireless backchannel (not shown) between dumb screen 300 and a mobile computing device, or a combination thereof.

Input information reports produced by dumb screen 300 may include any suitable type of information. For example, such reports may include pixel coordinates specifying the location and/or type of an event, such as the location of a mouse pointer during a mouse click, a mouse click and release, the location of a touch on a touch screen, pixel coordinates of a swipe operation, etc. Applications executed on a mobile computing device may utilize such information to perform appropriate actions with one or more applications, as will be discussed later.

Dumb screen platform 301 may also include power source 308, which may be any suitable source of electric power for dumb screen 300 and the components thereof. Non-limiting examples of suitable sources of power which may be used as power source 308 include the power sources described above in connection with power source 208 of FIG. 2. Without limitation, power source 308 is preferably in the form of a rechargeable battery, which may be recharged using a wired connection to a source of power, or via a wireless charging technique.

Figure 4:
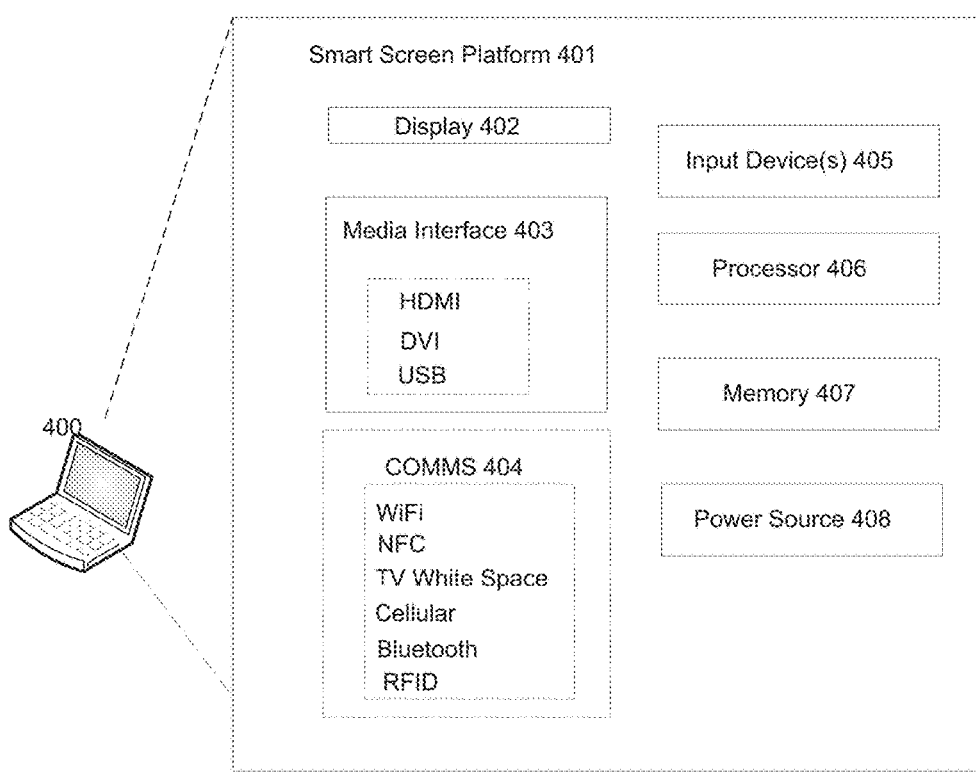
FIG. 4 is a block diagram of an exemplary smart screen consistent with the present disclosure.

Reference is now made to FIG. 4, which depicts a block diagram of an exemplary smart screen consistent with the present disclosure. As shown, smart screen 400 includes smart screen platform 401. Smart screen platform 401 may be any suitable platform, and may for example correlate to a platform consistent with the exemplary types of smart screens noted above. For the sake of illustration, smart screen 400 has been illustrated in the form of a laptop computer and thus, smart screen platform 401 may correlate to a laptop computer platform. It is noted that smart screen platform 401 has been illustrated with limited components for the sake of clarity and ease of understanding, and may include other components that may be found in such screens.

As shown, smart screen platform 401 includes display 402, media interface 403, WCOMMS 404 and input devices 405. Apart from their connection to general purpose processor 406, the nature and function of such components is the same as described above for display 302, media interface 303, WCOMMS 304, and optional input device(s) 305. Thus for the sake of brevity the description of such components and their function is not reiterated. In addition to such components, smart screen platform 401 includes general purpose processor 406 and memory 407. Processor 406 may be any suitable type of general purpose processor, such as the single or multi-core processors specified above for use in connection with the mobile computing devices described herein. Similarly, memory 407 may be any suitable type of memory, such as the memory types previously specified as suitable for use with the mobile computing devices of the present disclosure.

Memory 407 may store software such as an operating system (OS; not shown) and one or more software/firmware modules (also not shown) for execution by processor 406. For example, memory 407 may store one or more software modules that when executed by processor 406 cause smart screen 400 to perform device pairing operations consistent with the present disclosure. Specifically, memory 407 may include a device pairing module ("DPM"; not shown) that includes computer readable instructions that when executed by general purpose processor 406 may cause or facilitate the pairing of smart screen 400 with a mobile computing device over a wired or wireless communications interface, such as media interface 403 and/or WCOMMS 404. Execution of the DPM may occur within the context of the operating system executed by processor 406, or in another context.

Once smart screen 400 has paired with a mobile computing device, it may receive video and other information from the mobile computing device, e.g., via media interface 403 or WCOMMS 404. The video and other information may be included in an appropriately formatted signal (e.g., in the case of wired transmission) or encapsulated in packets (in the case of wireless transmission), either of which may be decoded and/or interpreted upon receipt by one or more components of smart screen 400 such as processor 406 or WCOMMS 404. For example, memory 407 may store a video decode module (not shown). The video decode module may include computer readable decode instructions (e.g., JAVA or other code) which when executed by processor 406 or another processor cause smart screen 400 to decode packets received from a mobile computing device to obtain the video and/or other information contained therein. The decode instructions when further executed may cause smart screen 400 to display the video information thus obtained.

Memory 407 may also store one or more input device monitoring modules ("IDMM"; not shown). If included, the IDMM may include computer readable instructions that when executed by an application specific processor (e.g., processor 406) or another processor cause the performance of input device monitoring and reporting operations consistent with the present disclosure. For example, the IDMM when executed may cause smart screen 400 (e.g., processor 406) to monitor for events associated with optional input device(s) 405, and report such events as input information to a mobile computing device. The nature and function of these components is largely the same as the corresponding components of dumb screen 300, and for the sake of brevity is not reiterated.

Dumb screen platform 401 may also include power source 408, which may be any suitable source of electric power for smart screen 400 and the components thereof. Non-limiting examples of suitable sources of power which may be used as power source 408 include the power sources described above in connection with power source 208 of FIG. 2. Without limitation, power source 408 is preferably in the form of a rechargeable battery, which may be recharged using a wired connection to a source of power, or via a wireless charging technique.

The mobile devices described herein may pair (i.e., establish a paired connection) with a dumb or smart screen using any suitable method, such as with a wired communications protocol, a wireless communications protocol, or a combination thereof, and the like. In the case of wired pairing, respective media interfaces of a mobile computing device and a smart/dumb screen may be connected with one another via an appropriate cable or docking interface. For example, the mobile computing devices and smart/dumb screens described herein may each include HDMI, DVI and/or wired USB interfaces and associated ports, in which case the mobile computing device and smart/dumb screen may be connected via an appropriate cable. Alternatively or additionally, a mobile computing device may dock with a smart/dumb screen via an appropriate docking connector or via a wireless docking technique. In any case, video and other information may then be transmitted over the resulting physical or wireless connection between the mobile computing device and smart/dumb screen using an appropriate protocol such as an HDMI, DVI, wired USB protocol, and/or wireless communications protocol.

In the case of a truly dumb screen (i.e., a screen with no intrinsic processing capability), the screen may be tuned to the appropriate media interface input to display video information received from a mobile computing device over a wired connection. In contrast, smart or dumb screens having some application specific processing capability may include memory that includes a device pairing module ("DPM") stored therein. The DPM may include computer readable instructions that cause the smart/dumb screen to monitor its media interfaces for signals received from a mobile computing device. Upon receiving such signals, the DPM module instructions when executed may further cause the smart/dumb screen to display video information contained in those signals on a display thereof.

Although the present disclosure envisions systems wherein a mobile computing device may be physically connected to a smart/dumb screen, such connection is not required. Indeed without limitation the mobile devices of the present disclosure are preferably configured to transmit video information wirelessly to a smart/dumb screen. For example, the mobile computing device may be configured to, in response to the touch of a button and/or a near field communications, pair with a WiDi or Miracast display, enabling the user to visually interact with the mobile compute device. In such instances, wireless pairing of the mobile computing device and a smart/dumb screen may be needed.

In this regard, pairing of a mobile computing device and a smart/dumb screen may be performed using any suitable wireless pairing protocol. For example, the mobile computing devices and smart/dumb screens described herein may be configured to pair with one another using a transmission control protocol (TCP), a User Datagram Protocol (UDP), combinations thereof, and the like. Such pairing may establish or utilize one or more sockets for communication over a wireless (e.g., WiFi, Bluetooth, Intel® Wireless Display, etc.) connection between the devices. Pairing between the devices may be initiated by the mobile computing device, a smart/dumb screen, or a combination thereof.

Figure 5A:
FIGS. 5A and 5B illustrate an example mobile device initiated pairing method consistent with the present disclosure.
Figure 5B:
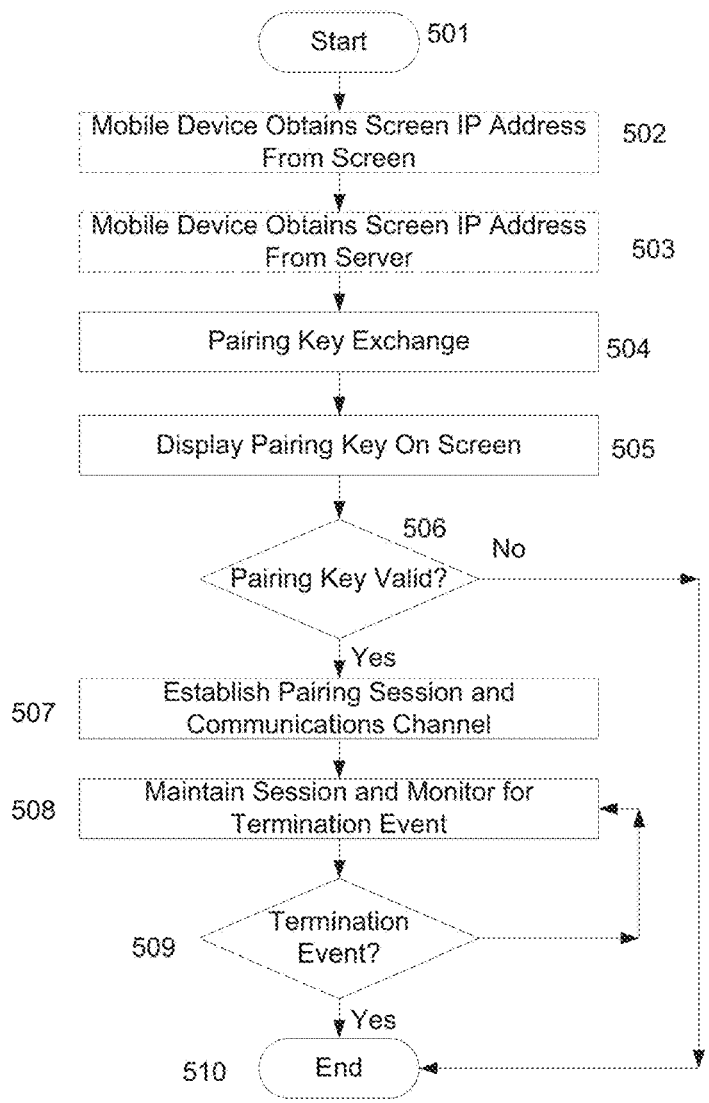

As one example of a mobile computing device initiated pairing method, reference is made to FIGS. 5A and 5B. As shown in FIG. 5A, device 101 may initiate pairing with screen 103. Pairing of device 101 and screen 103 may occur using the exemplary method depicted in FIG. 5B.

As illustrated in FIG. 5B, a mobile computing device initiated pairing method may begin at block 501, whereupon a pairing application is initiated on a mobile computing device. In this regard, the mobile computing device may include memory having a pairing module stored thereon, wherein the pairing module includes instructions that when executed by a processor of the mobile computing device cause the mobile computing device to perform pairing operations consistent with the present disclosure. Execution of the pairing module instructions may be in response to a user input such as a button press, voice command, or the like. Alternatively or additionally, execution of the pairing module instructions may be in response to the detection by the mobile device of a particular gesture or motion made with the mobile device (i.e., in response to a recognized pattern of gyroscopic and/or accelerometer data).

Once the pairing module is initiated, the mobile computing device may need to identify the screen with which it is going to pair "(hereafter, the "target screen"). More specifically, the mobile computing device may need to know an identifier of the target screen, such as its internet protocol (IP) address as generally shown in the method of FIG. 5. If the mobile computing device already has knowledge of the identifier of the target screen, the method may skip optional blocks 502 and 503 and proceed to block 504. If the mobile computing device does not have knowledge of the identifier of the target screen however, the method may proceed to blocks 502 and/or 503, wherein the mobile computing device may use communication modalities available to it to obtain this information from the target screen, as described below.

Pursuant to optional block 502, the mobile computing device may obtain the identifier/IP address of the target screen from the screen itself. For example, where the mobile computing device and the target screen include compatible short range communications technologies such as RFID, BLUETOOTH, or NFC, the mobile computing device may use those technologies to obtain the internet protocol address of the target screen. In some embodiments, a target screen may include an RFID tag that stores the target screen's IP address. In such instances, a mobile computing device including RFID capabilities may be moved in proximity to the RFID tag of the target screen, so as to obtain the target screen's IP address from the RFID tag.

Alternatively or additionally, the target screen may have BLUETOOTH or NFC capability as well as a device pairing module (DPM) stored thereon. The DPM may include instructions that when executed by a processor cause the target screen to transmit its IP address using BLUETOOTH or NFC in response to receiving a pairing request from a mobile computing device.

In other words, the mobile computing device may itself include a DPM including computer readable instructions that when executed cause the mobile computing device to broadcast a request for a screen IP address over NFC, BLUETOOTH, or other short range communications network. Similarly, a target screen may include a DPM including instructions that when executed cause it to monitor for screen identifier/IP address requests. When the target screen receives a request for a screen identifier/IP address (e.g., when a mobile computing device comes into communications range with the screen), the DPM of the screen may cause the screen to transmit its identifier/IP address to the mobile computing device using an appropriate form of communication. For example, when a target screen receives an IP request from a mobile computing device over an NFC or BLUETOOTH connection, the DPM instructions of the target screen when executed may cause the target screen to transmit its IP address to the mobile computing device over the NFC or BLUETOOTH connection, as appropriate.

The mobile computing devices described herein may also attempt to obtain a the identifier/IP address of a target screen from a third party system, such as a server having knowledge of the target screen's identifier/IP address. In such instances, the method may proceed to optional block 503, wherein the mobile computing device may communicate with the server (e.g., over WiFi, a wide area network, or another communications network) and request the identifier/IP address of target screen(s) in proximity to the mobile computing device.

Once the mobile computing device has knowledge of the identifier/IP address of the target screen the method may proceed to block 504, wherein a communications channel is initiated between the mobile computing device and a target screen. In addition, the mobile computing device may exchange a pairing key with the screen, e.g., for the purpose of facilitating authentication of the screen to the mobile device or for another purpose. The pairing key may be unique to the mobile computing device, and/or it may be a key specified by a user of the mobile computing device. In any case, the mobile computing device may include a device pairing module (DPM) that includes pairing instructions that when executed cause the mobile computing device to transmit the pairing key to the screen. Once the screen has received a pairing key from a mobile computing device the method may proceed to block 505 wherein the pairing key is displayed on the screen. Display of the pairing key may be caused by the execution of a device pairing module on the target screen.

The method may then proceed to block 506, wherein a determination may be made as to whether the pairing key displayed on the target screen is valid. If validation of the pairing key fails, the method proceeds to block 510 and ends. If validation of the pairing key succeeds however, the method may proceed to block 507, whereupon a paired connection is established at least in part by establishing a pairing session and a communications channel between the mobile computing device and the target screen. The pairing session and communications channel may be established using any suitable wireless communications protocol, such as a transmission control protocol//user datagram protocol/internet protocol (TCP/UDP/IP). Depending on the capabilities of the respective devices, the communications channel between the mobile computing device and the screen may be unidirectional (mobile computing device to screen) or bidirectional (mobile computing device to screen and vice versa). In some embodiments, the communications channel established between the devices pursuant to block 507 is bidirectional. In other embodiments, the communications channel established pursuant to block 507 is unidirectional. In the latter case, an optional communications backchannel may be established between the screen and the mobile computing device.

By way of example, the mobile computing devices and screens described herein may be may be paired (i.e., may have a paired connection) such that video and other information is transmitted from the mobile computing device to the screen using a first socket, such as a remote monitor socket. This may enable one way communication of video and other information from a mobile computing device to a screen. In additional embodiments, the pairing protocol may also establish a backchannel to enable communication of information from a smart/dumb screen to the mobile computing device. The backchannel may be established using the same socket used for the transmission of video and other information from a mobile computing device to a paired screen, or another socket. In some embodiments, the mobile computing devices and screens described herein may be paired so as to establish a backchannel (and optionally a forward channel) using the real time streaming protocol (RTSP) socket.

In this regard the mobile computing devices and screens described herein may include one or more backchannel modules that may include computer readable backchannel instructions that when executed result in the establishment of a backchannel between a mobile computing device and a screen consistent with the present disclosure. Execution of the backchannel instructions by respective processors of the mobile computing device and screens may cause such devices to negotiate a mutually supported socket for use as a communications backchannel. As noted previously, the mobile computing devices and screens described herein may be configured to support the use of the RTSP socket or another socket as a communications backchannel.

The method may then proceed to block 508, wherein the pairing session may be maintained, and the mobile computing device may monitor for the occurrence of a termination event. More specifically, device pairing module instructions on the mobile computing device when executed may cause the mobile computing device to monitor for the occurrence of an event that will terminate the pairing session and/or communications channel(s) between the mobile computing device and a paired screen. Non-limiting examples of such terminating events include signal failure, session timeout/expiration, receipt of a termination request from an application running on the mobile computing device or screen, combinations thereof, and the like. At block 509, a determination may be made as to whether a termination event has been detected. If no termination event has been detected, the method may proceed to back to block 508, wherein the session and communications channels are further maintained and monitored by the mobile computing device. If a termination event is detected, however, the method may proceed to block 510 and end.

In additional exemplary embodiments, pairing of a mobile computing device with a screen may begin with the initiation of a public connection by the mobile computing device. That is, the mobile computing device may be placed in a public domain, e.g., by pressing an appropriate button sequence, making an appropriate gesture with the device, or by another method. Upon initiation of the public connection, the mobile computing device may broadcast a public connection request using its wireless communications interface and any or all of its available communication modalities. For example, the public connection request may be broadcast from the mobile computing device using NFC, BLUETOOTH, a ZigBee network, WiFi, combinations thereof, and the like.

In this method screens consistent with the present disclosure may continuously or periodically monitor for public connection requests from a mobile computing device. A screen detecting such a request may display a connection screen. In addition, screens detecting a public connection request may ignore other public connection requests for a period of time (hereinafter, an ignore period). A connection key may then be inputted to a target screen, i.e., a screen with which a user of the mobile computing device wishes to pair. Input of the connection key may be made using an input device that is in communication with the screen, such as a keyboard, touchscreen, or a combination thereof. Alternatively or additionally, input of the connection key may be made with the mobile computing device itself, e.g., using its gesture and/or motion recognition capabilities (described later). In some embodiments, input of the connection key may be required before the ignore period expires. If the connection key is not entered before the ignore period expires, pairing of the screen and the mobile computing device may fail.

A screen receiving the connection key may transmit the connection key to the mobile computing device using its media or wireless communication interface. The form of wired/wireless communication used to transmit the connection key may correlate to the form of wired/wireless communication that delivered the public connection request to the screen. Upon receiving the connection key from the screen, the mobile computing device may validate the connection key against a copy of the connection key maintained in its memory. If validation of the connection key succeeds, the mobile computing device may validate and maintain the connection with the screen. If validation of the connection key fails however, the mobile computing device may terminate the pairing process. Once a validated connection is established between the mobile computing device and a screen, the screen may ignore subsequently received public connection requests until its existing connection with a mobile computing device is terminated.

For security purposes or another reason, the mobile computing devices described herein may be configured to store multiple connection keys, and to provide one or a combination of such keys to a screen during a pairing process. This may enhance security in instances where the connection key may be at risk of snooping by an unauthorized third party, as may be the case when pairing of the mobile computing device to a screen will occur in a public place. The method may also further include verification the identity of the user of a mobile computing device prior to, during, or after the establishment of a validated paired connection between a mobile computing device and a screen consistent with the present disclosure. That user verification may be performed biometrically, e.g., with a username and password protocol, with a gesture based protocol, combinations thereof, and the like.

In instances where a mobile computing device is to pair with a single screen that it has paired with before, the exchange of a connection key and/or the optional user verification may be omitted, and the device and screen may pair upon receipt by the screen of a public connection request from the mobile computing device. If multiple known screens are present within range of the mobile electronic device, connection to one of the devices may be disambiguated from a connection to another device as specified above. Alternatively or additionally, the mobile computing device may be configured to assume a connection to one of several known screens, and to toggle or change the connection to another known screen in response to an input such as a button press, gesture, combinations thereof and the like.

Figure 6A:
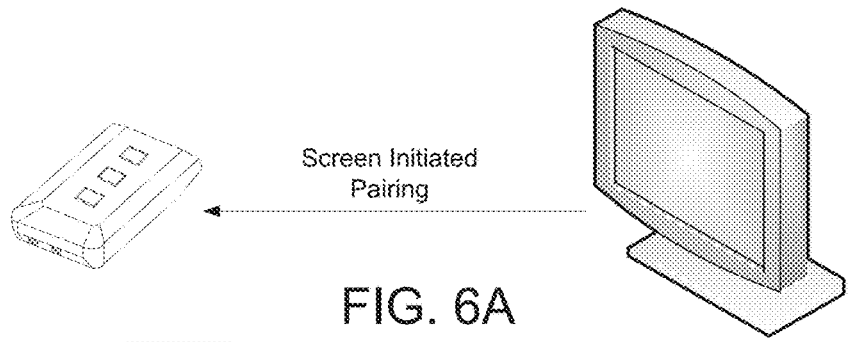
FIGS. 6A and 6B illustrate an example of a screen initiated pairing method consistent with the present disclosure.
Figure 6B:
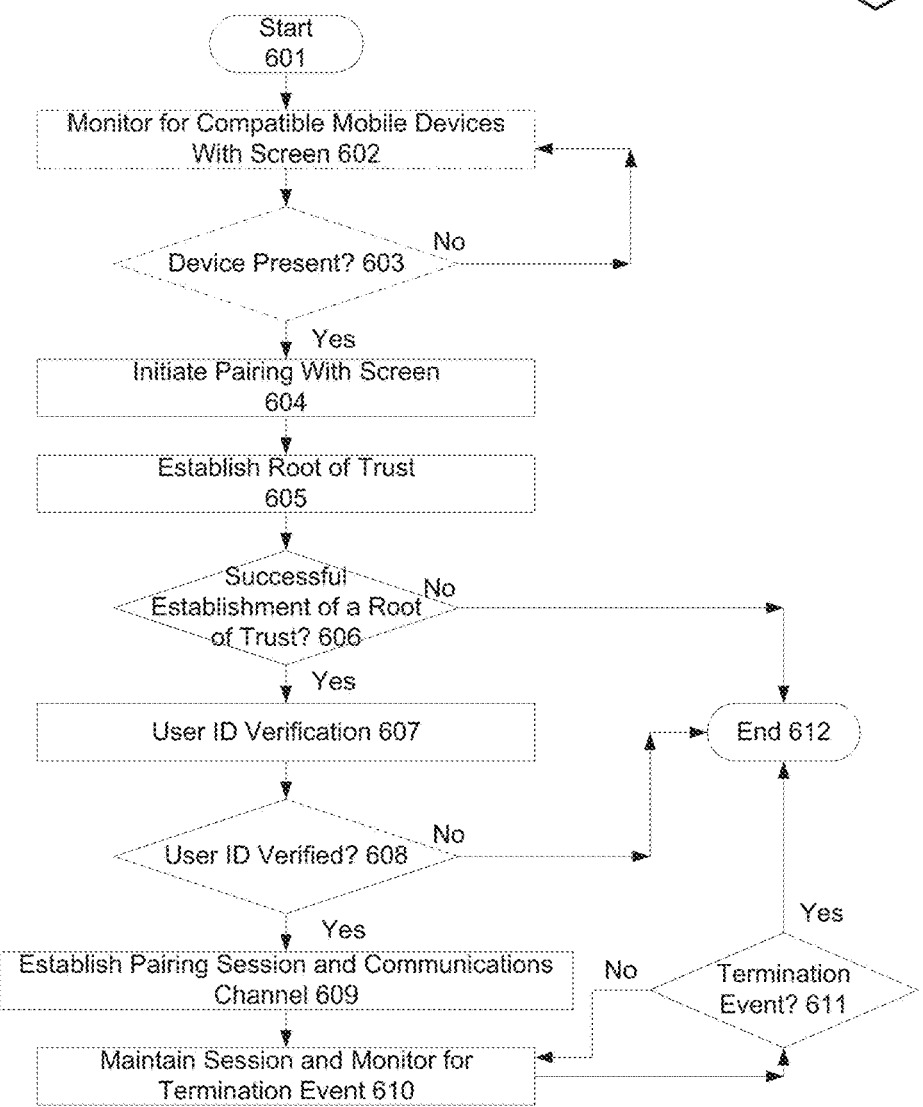

By way of example, the technology described herein may be manufactured as a "kit" that includes at least one mobile computing device and at least one non-integral screen. In such instances, the mobile computing device(s) and screen(s) in the kit may come "factory paired." That is, pairing information for the screen(s) in the kit may come pre-loaded on the mobile computing device(s) in the kit, and vice versa. In such instance, the pairing and/or user verification operations discussed above may be omitted, and the devices and screens in the kit may pair with one another using the pre-loaded pairing information. Reference is now made to FIGS. 6A and 6B, which illustrate a non-limiting example of a screen initiated pairing method consistent with the present disclosure. As shown in FIG. 6A, screen 103 may initiate pairing with mobile computing device 101. Pairing of device 101 and screen 103 may occur using the exemplary method depicted in FIG. 6B.

As shown in FIG. 6B, the screen initiated pairing method may begin at block 601. At optional block 602, a screen may monitor for the presence of compatible mobile computing devices using available sensors. For example, a screen may use its wireless communications interface to monitor for broadcasts (e.g., containing pairing requests, an indicator that the device is available for pairing, etc.) from compatible mobile computing devices. In some embodiments, this monitoring function may be facilitated by the execution of a device pairing module (DPM) by the screen. More specifically, the DPM of the screen may include instructions that when executed cause the screen to monitor for the presence of compatible mobile computing devices, e.g., using sensor(s) or other components available to the screen.

The method may then proceed to optional block 603, wherein a determination may be made as to whether a compatible mobile computing device is present. If not, the method may return to optional block 602 (as shown in FIG. 6B), or it may end (not shown). If a compatible mobile device is present (as determined by the monitoring functions performed pursuant to block 602 or if the presence of a compatible mobile computing device is already known), the method may proceed to block 604 wherein the screen initiates pairing with the mobile device. In this regard, the screen may initiate a communications channel connection with the compatible mobile computing device using available short range communications networks. For example, the screen may transmit a pairing request (e.g., including the screen's IP address, supported video modes, supported forms of video compression, supported packet formats, etc) to the mobile computing device via BLUETOOTH®, NFC, a ZigBee network, a WiFi network, combinations thereof, and the like. In response to receiving the pairing request, a compatible mobile computing device may negotiate a first level connection with the screen.

Once a communications channel connection has been initiated between the screen and the mobile computing device the method may proceed to block 605, wherein a root of trust may be established between the screen and the mobile computing device. The root of trust may be established in any suitable manner. For example, a screen and mobile computing device may establish a root of trust with one another by attesting their identity, execution environment, etc. to one another using any suitable attestation protocol. As non-limiting examples of such protocols, mention is made of the enhanced privacy identification (EPID) protocol, the remote attestation (RAA) protocol, the direct autonomous attestation (DAA) protocol, combinations thereof, and the like. In such instances, a root of trust may be established upon successful attestation of the screen to the mobile computing device and vice versa. Alternatively or additionally, a root of trust may be established based on prior connections between a mobile computing device and a screen, in which case attestation may not be required.

The method may then proceed to block 606, wherein a determination may be made as to whether establishment of a root of trust has succeeded or failed. If establishment of a root of trust fails, the method may proceed to block 612 and end. If a root of trust is successfully established however, the method may proceed to block 607.

At block 606, the identity of the mobile computing device (or a user thereof) may be verified to the screen. Identity verification operations performed pursuant to this block may be executed using any suitable identity verification protocol. For example, a screen may confirm the identity of a mobile computing device or a user thereof using a username and password protocol, a biometric authentication protocol, a gesture based protocol, combinations thereof and the like. For example, the screen may verify the validity of an inputted username and password (or biometric information) against a database of authenticated username and password combinations (or biometric information). Alternatively or additionally, the screen may verify the identity of a mobile device and/or user based on inputted gyroscopic and/or accelerometer data that is generated by movement of the mobile computing device (e.g., a gesture), either alone or in combination with inputs made to the device, e.g., using one or more buttons or other input devices.

The method may then proceed to block 608, wherein a determination may be made as to whether the identity of a mobile device and/or user has been successfully verified. If verification fails, the method may proceed to block 612 and end. If verification succeeds, the method may proceed to block 609, during which a pairing session and communications channel between the mobile computing device and screen may be established. Establishment of the pairing session and communications channel in this method is substantially the same as that described above in connection with FIG. 5B, and for the sake of brevity is not repeated. At block 610, the screen and/or mobile computing device may maintain the session and monitor for a termination event, and at block 611 a determination may be made as to whether a termination event has occurred. If a termination event has not occurred, the method may return to block 610 from block 611, whereupon monitoring of the session continues. If a termination even is detected however, the method may proceed from block 611 to block 612, whereupon the session is terminated and the method ends.

Figure 7A:
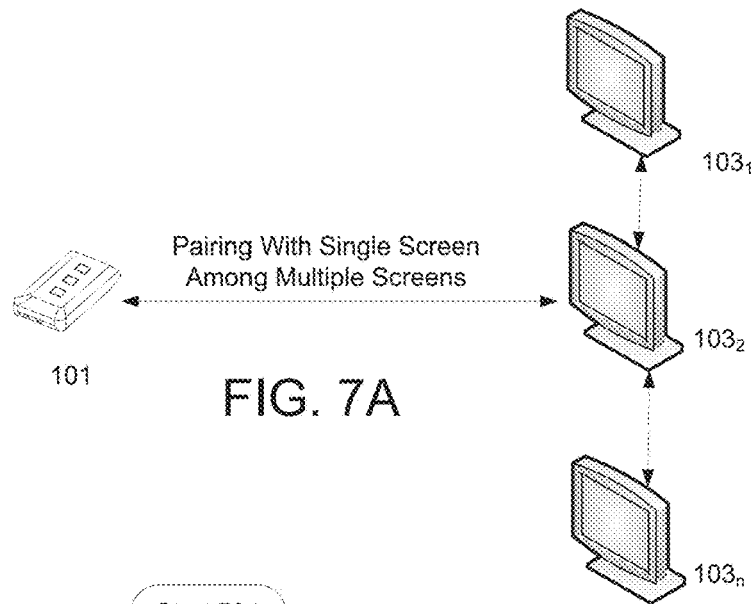
FIGS. 7A and 7B illustrate an example method of pairing a mobile computing device to one of many screens, consistent with the present disclosure.

In some circumstances it may be desirable to pair a mobile computing device to a single screen when multiple compatible screens are within range. This concept is illustrated in FIG. 7A, wherein multiple screens $103_1$, $103_2$, $103_n$ (n being a non-zero integer ranging from 1 to 1000 or more) are within range of device 101 and available for pairing. In such instances, pairing of the device 101 and one of screens $103_1$, $103_2$, $103_n$ may be facilitated using both device 101 and the screen with which it is to pair.

As may be appreciated, because the mobile computing devices described herein may not include a display, security may be an important consideration in situations where multiple screens are available for pairing. In particular, it may be important to ensure that pairing occurs only with an intended screen and not an unintended screen. This is particularly true as the mobile electronic devices described herein cam transmit video and other information to a screen with which it is paired. Security may be even more important in instances where a backchannel is established between the screen and a mobile computing device, especially if the screen is capable of accessing or controlling resources on the mobile computing device through the backchannel.

Figure 7B:
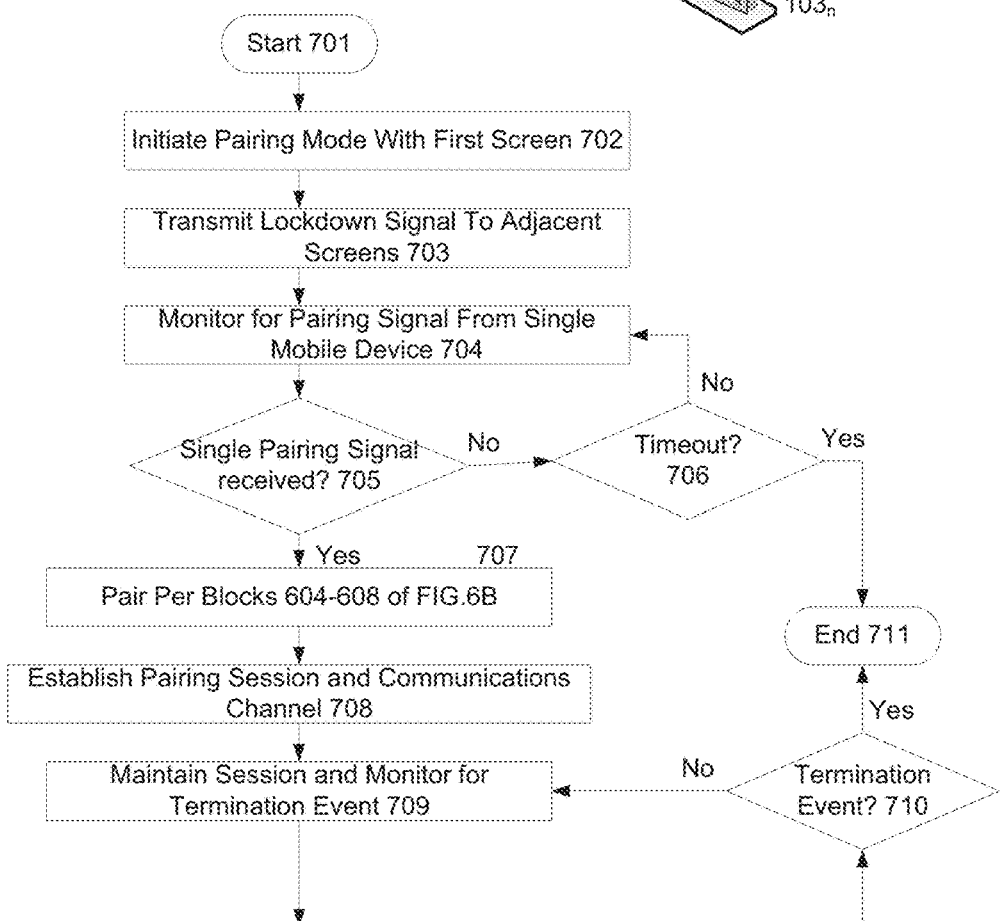

With this in mind, reference is made to FIG. 7B, which illustrates another exemplary pairing method consistent with the present disclosure. As shown, the method begins at block 701. At block 702, a first screen that will be paired to a mobile computing device may be placed into a pairing mode. The pairing mode may be initiated upon receipt of an input made through an input device that is integral with or coupled to the first screen. For example, the first screen may be configured to enter a pairing mode upon in response to a particular button press, touch input, swipe, motion, combinations thereof and the like. Although not required, the first screen may produce a visual indicator to demonstrate that it is in pairing mode. For example, the first screen may illuminate a light (e.g., a light emitting diode), place a notice on its screen, vibrate, etc. to signify that it is in pairing mode.

Once the first screen is placed in pairing mode, the method may proceed to block 703, wherein the first screen may transmit a lockdown signal to other screens within range (hereinafter, "adjacent screens"). In general, the lockdown signal may be configured to prevent adjacent screens (i.e., screens within communications range of the first screen) from accepting pairing requests from any mobile computing device. With reference to FIG. 7A, screen $103_2$ may be put into a pairing mode as discussed above, and transmit a lockdown signal to screens $103_1$, $103_n$ over a wired or wireless communications interface. In response to the lockdown signal, screens $103_1$, $103_n$ may enter a lockdown mode and ignore any pairing requests, e.g., for a specified time period or until receipt of a release signal from screen $103_2$. Similarly screens $103_1$, $103_n$ may not attempt to initiate pairing with any mobile computing devices while in the lockdown mode.

Once a lockdown signal has been sent, the method may proceed to block 704, wherein the first screen may monitor for the receipt of a pairing signal from a single mobile computing device. In this regard, pairing signals may be transmitted by a mobile computing device consistent with the present disclosure using any suitable wired or wireless communications network, as discussed above. In some embodiments, the mobile computing device may be configured to transmit the pairing signal in response to an input, such as a button press, gesture, or combination thereof. In any case, the method may proceed to block 705, wherein a determination may be made by the first screen as to whether a single pairing signal has been received. If a single pairing signal has not been received or if multiple pairing signals are received at the same time, the method may proceed to block 706 wherein the first screen may determine whether a time period for connection has timed out. If so, the method proceeds to block 711 and ends. In such instance, the first screen may be configured to indicate the failure of the connection with an audio and/or visual indicator, such as the illumination of a light, a series of audio cues (e.g., beeps), combinations thereof, and the like. If the time period for connection has not expired, the method may proceed back to block 704, wherein the first screen may continue to monitor for receipt of a pairing signal from a single mobile device.

Once the first screen receives a pairing signal from a single mobile computing device, the method may proceed from block 705 to block 707, wherein the first screen and the mobile computing device may be paired in accordance with the method described in blocks 604-608 of FIG. 6B, and a pairing session and communications channel may be established in the same manner as described in block 609 of FIG. 6B. The method may then proceed to block 709, wherein the first screen and/or the mobile computing device may maintain the session and monitor for the occurrence of a termination event. At block 710, a determination may be made by the first screen and/or the mobile computing device as to whether a termination event has occurred. If so, the method may proceed to block 711, wherein the session and communications channel is terminated and the method ends. If a termination event has not occurred, the method may proceed back to block 709, wherein the first screen and/or mobile computing device may continue to maintain the session and communications channel and monitor for the occurrence of a termination event.

Another aspect of the present disclosure relates to a systems and methods for transmitting video and/or other information from a mobile computing device to a smart/dumb screen. In this regard, during or after pairing, a communications channel may be established between a mobile computing device and a screen to allow the mobile computing device to communicate with one another. The communications channel may be facilitated by the execution of modules on the mobile computing devices and/or screens of the present disclosure. Such modules may include device pairing instructions that when executed by a processor cause their respective devices to create a paired connection including a communications channel suitable for unidirectional and/or bidirectional communication between a mobile computing device and a screen. For example, the device pairing instructions when executed by either or both devices may cause such devices to utilize a TCP socket protocol to establish a socket for a mobile computing device to transmit video and other information to a screen over a physical (e.g., USB) connection or a wireless connection such as WiFi, BLUETOOTH®, wireless with gigabit capability (WiGig), millimeter wave technology, ultra high frequency communication, combinations thereof, and the like. In some embodiments, the device pairing instructions when executed may also cause the mobile computing device and/or screen to establish a backchannel for the transmission of information from a screen to a mobile computing device. The establishment of such channels is described above and for the sake of brevity is not reiterated.

The mobile computing devices and screens described herein may be respectively configured to transmit and receive video information in numerous ways. For example, the mobile computing devices and screens described herein may be configured such that they are compatible with existing wireless video transmission technology such as INTEL® wireless display (WiDi) and/or WiGig technology, wireless USB, or another existing wireless video technology. The operation and hardware requirements of these existing technologies are well understood, and therefor are not described in detail herein.

Although existing wireless video technologies may be useful, they may suffer from one or more drawbacks. For example, the mobile computing devices and screens described herein may be configured such that video information may be transmitted from the mobile computing device to the screen using Intel® Wireless Display ("WiDi") technology. While this technology is useful, some implementations of WiDi may rely on the use of specific hardware on the receiver (e.g., screen) side, e.g., for the purpose of reducing latency. Specifically, the current implementation of WiDi may require the use of a particular network interface and video hardware on the screen (receiver) side, so that video information received by the screen may be retrieved directly from the screen's network interface and placed directly into the video buffer of the screen's video circuitry. Thus, while the mobile computing devices and screens may be configured to support WiDi, the hardware limitations of that technology may be quite limiting, particularly if a user wishes to pair a mobile computing device to a screen that does not have the hardware needed to support WiDi.

In addition, some implementations of WiDi generally enable one way communication from a source of video to a screen. Thus, while video and other information may be transmitted from a mobile computing device to a WiDi enabled screen, existing WiDi protocols may not permit the transmission of data from the screen to the mobile computing device. More particularly, some WiDi protocols may not permit data from input devices connected to a screen to be transmitted from the screen back to a mobile computing device. For these and other reasons, other options for transmitting display (video) information from a mobile computing device to a screen may be desirable.

To address one or more of the challenges with existing wireless display technologies (particularly WiDi), the inventors have developed two new wireless display protocols for transmitting display information from a mobile computing device to a paired smart/dumb screen. These protocols are referred to herein as "framethrower" and "streamthrower." As will be discussed in detail below, both of these protocols utilize peer to peer communication to transmit video and other information from a mobile computing device directly to a screen. As such, they differ significantly from technologies such as virtual network computing (VNC) and virtual display computing (VDC) which transmit a display from a host (server) to a client over an intervening IP network such as the internet, an enterprise network, or the like. Moreover, because the framethrower and streamthrower protocols utilize peer to peer communication, they may not suffer from latency issues that may be experienced in systems utilizing VNC and/or VDC technologies. Finally, the framethrower and streamthrower protocols may be executed by any screen having suitable processing capability, thus lowering, minimizing, or eliminating the limitations that may be imposed by hardware specific requirements of other wireless video technologies.

One aspect of the present disclosure therefor relates to a mobile computing device that is configured to transmit video information to a smart/dumb screen using a framethrower protocol. Such devices generally include any or all of the elements of device 101 as described above with respect to FIG. 2. In particular, such devices generally include logic implemented at least in part in hardware, such as a processor, memory, wireless communications interface (WCOMMS), media interface, one or more sensors, a power source, and optionally one or more input devices. The processor may execute an operating system, which may be stored in the memory of the mobile computing device. The memory may also store a framethrower module, which may include computer readable instructions that when executed by the processor may cause the mobile computing device to transmit video and/or other data to a paired smart/dumb screen via a media (wired) interface or a wireless communications interface using a framethrower protocol.

Figure 8:
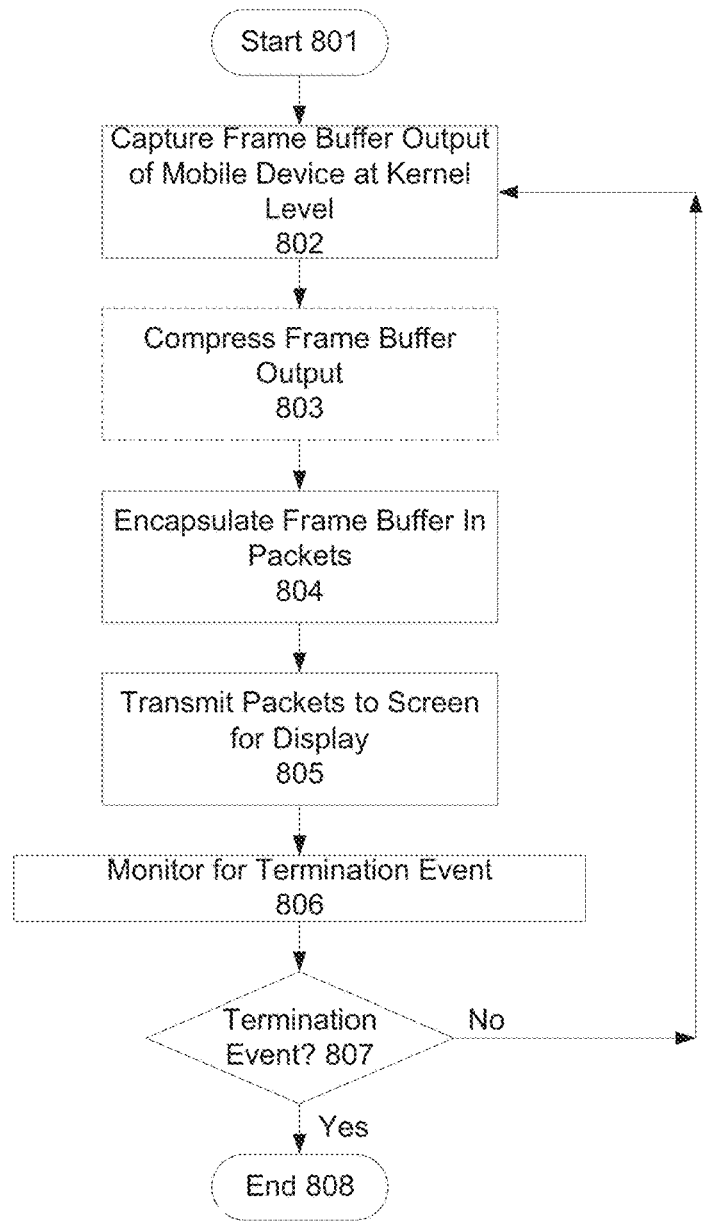
FIG. 8 is a flow diagram of an exemplary framethrower protocol consistent with the present disclosure.

Reference is now made to FIG. 8, which depicts a flow diagram of an exemplary framethrower protocol consistent with the present disclosure. For the sake of discussion, the protocol of FIG. 8 is described under the assumption that it is being executed by a processor of a mobile computing device from within the context of an operating system also executed on that processor. It is also assumed that the method is executed after successful pairing of the mobile computing device with a screen. It should be understood that this description is exemplary only, and that the framethrower protocol may be executed by a mobile computing device in another context, such as in a pre-boot context.

As shown in FIG. 8, the framethrower protocol begins at block 801. At block 802, framethrower module instructions when executed by a processor of a mobile computing device may cause the mobile computing device to capture its frame buffer at the kernel level. It should be understood that the frame buffer may be of the mobile device itself or the result of the execution of an application on the mobile computing device, an operating system on the mobile computing device, or a combination thereof.

In any case, the framethrower module instructions may be understood as including one or more privileged OS operations that capture the frame buffer (e.g., in the form of graphics frames) at the kernel level. Once at least one frame of the frame buffer has been captured the method may proceed to optional block 803, wherein the captured frame buffer may be compressed. As will be discussed later in connection with FIG. 9, the degree to which the frame buffer is compressed may be varied based on numerous factors, such as processor load, compression time, and available bandwidth in the paired connection between the mobile computing device and a paired smart/dumb screen.

In some embodiments, the frame buffer may be compressed using inter frame compression, infra frame compression, color space compression, data reduction, or a combination thereof. Without limitation, the frame buffer is preferably compressed using infra frame compression, i.e., where data for each individual frame is compressed. In any case, compression may be performed by software or a hardware compression engine included in the mobile computing device.

After compression of the captured frame buffer or if the captured frame buffer "is not compressed the method may proceed to block 804, wherein the captured frame buffer may be encapsulated in packets. In this regard, the framethrower instructions when executed may cause the transmission of the captured frame buffer (e.g., via a software or hardware pipeline) to a wireless communication interface of the mobile computing device, whereupon relevant hardware such as a network interface chip/card may encapsulate the captured frame buffer into packets. For example, a network interface card/chip within the wireless communications interface may encapsulate the captured frame buffer into packets that are suitable for wired or wireless transmission using a predetermined transmission protocol, such as any or all of the 802.11 standards specified by the Institute of Electrical and Electronics Engineers (IEEE) prior to the date of this disclosure.

Any suitable packet format may be used to encapsulate the frame buffer. As one exemplary packet format that may be used in accordance with the present disclosure, mention is made of internet protocol (IP) packets, TCP packets, UDP packets, RTSP packets, combinations thereof, and the like. Without limitation, the frame buffer is preferably encapsulated in IP packets.

The method may then proceed to block 805, wherein packets encapsulating one or more frames of the captured frame buffer may be transmitted to a smart/dumb screen paired with the mobile computing device. Transmission of the packets may occur over a communications channel (e.g., a TCP socket) established between the mobile computing device and the smart/dumb screen, as discussed above. Without limitation, communication of the packets occurs wirelessly over a wireless paired connection, e.g., one or more wireless peer to peer communications networks, such as WiFi, NFC, WiGig, wired/wireless USB, millimeter wave communication, ultra high frequency communication, or a combination thereof.

Once the mobile computing device begins to transmit packets encapsulating one or more frames of the captured frame buffer to a smart/dumb screen, transmission of such packets may continue until the occurrence of a termination event. The method may therefore proceed to block 806, wherein the framethrower module instructions when executed may cause the mobile computing device to monitor for the occurrence of a termination event. Non-limiting examples of terminating events include those described above in connection with the pairing methods illustrated in FIGS. 5A-7B. At block 807, a determination may be made as to whether a termination event has occurred. If a termination event has not occurred, the method may return to block 802, wherein the mobile computing device continues to monitor for the occurrence of a termination event. Upon the occurrence of a termination event, the method may proceed to block 808, wherein transmission of packets encapsulating the captured frame buffer is terminated and the method ends.

As noted above, the framethrower protocol may optionally compress frames of the captured frame buffer prior to their encapsulation in packets and transmission to a paired smart/dumb screen. Although compression is useful in situations where limited bandwidth is available for the transmission of video information to a paired smart/dumb screen, it may increase the processing load on the processor of a mobile computing device. In some instances, the load imposed on the processor by compression of the frame buffer may be significant enough to affect the performance of the wirelessly transmitted display. Indeed if the processor is not able to compress frames of the capture frame buffer quickly enough, the transmission of one or more frames of the captured frame buffer may be skipped. Alternatively or additionally, the display produced by the screen may execute at a less than desired number of frames per second. Similarly, bandwidth in the wireless connection between the mobile computing device and the screen may be limited, which can impact performance of the thrown display regardless of the capabilities of the respective capabilities of the screen and mobile computing device. Any of these issues may result in an undesirable user experience and/or display performance that is inadequate for a particular task.

As one option for addressing the foregoing issues, the mobile computing devices of the present disclosure may be configured dynamically adjust the level and/or type of compression applied to frames of a captured frame buffer so as to achieve a desired performance metric such as processor performance (e.g., load), display performance (e.g., frames per second), bandwidth maintenance, power consumption, combinations thereof, and the like. In this regard, a framethrower module stored in a memory of a mobile computing device may include a compression optimization component that includes computer readable compression optimization instructions that when executed cause the mobile computing device to monitor one or more performance metrics and dynamically adjust the amount and/or type of compression applied to a captured frame buffer so as to achieve a desired performance level.

Figure 9:
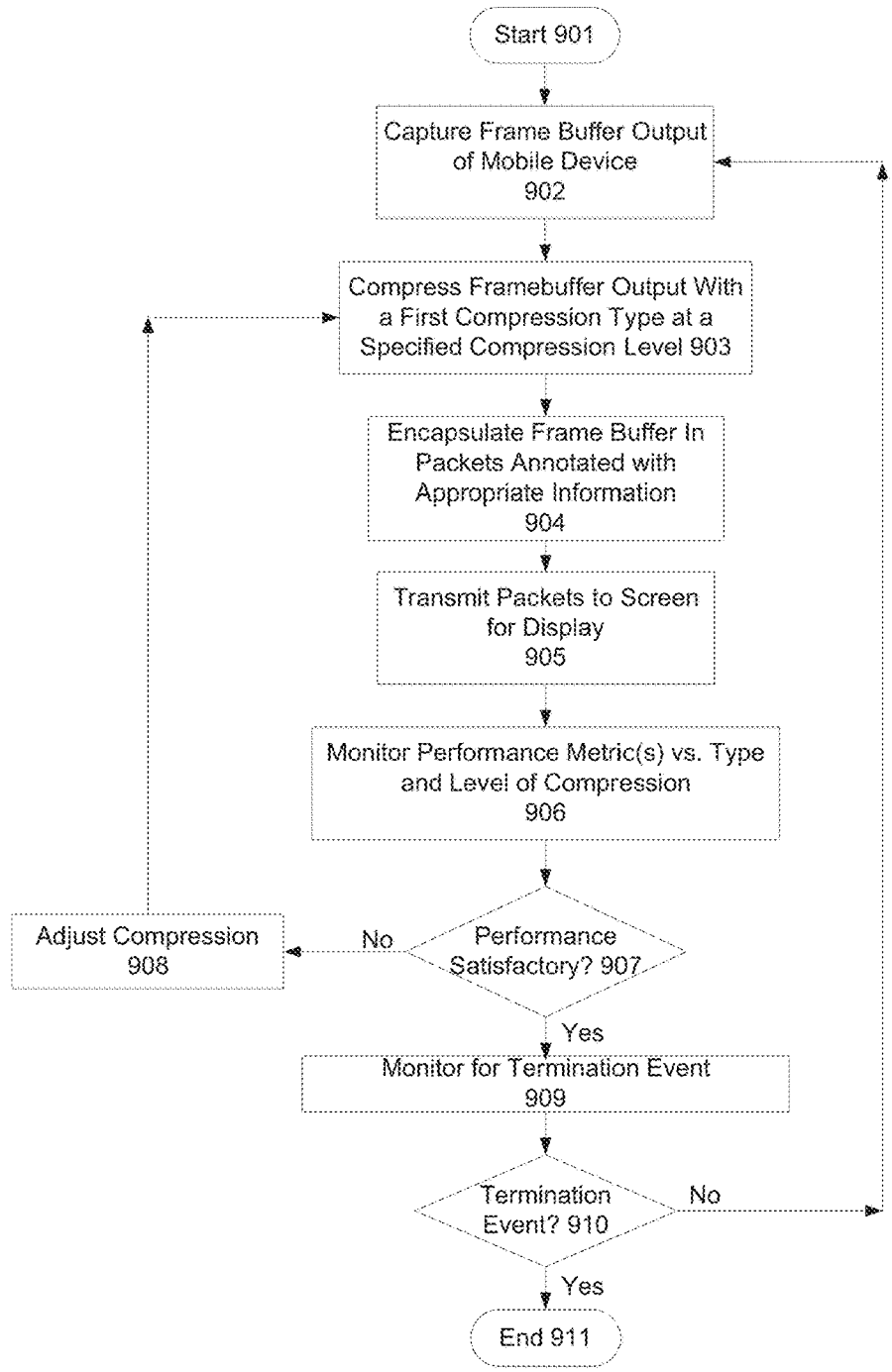
FIG. 9 is a flow diagram of an exemplary framethrower protocol that includes a compression optimization component consistent with the present disclosure.

Reference is now made to FIG. 9, which depicts a flow diagram of an exemplary framethrower protocol that includes a compression optimization component to dynamically adjust the compression applied to frames of a captured frame buffer. As shown, the method begins at block 901. At block 902, framethrower module instructions when executed by a processor of a mobile computing device may cause the device to capture the frame buffer of the device at the kernel level, as described above in connection with block 802 of FIG. 8.

At block 903, the framethrower instructions when executed may cause the mobile computing device to compress frames of the captured frame buffer using a specified type of compression and at a specified compression level. At initial execution, the frames of the captured frame buffer may be uncompressed or compressed at an initial (first) compression level with a first compression type. Compression of the frames may be performed in the same or similar manner as described above for block 803 of FIG. 8. In some embodiments, the initial type and compression level applied to each frame may be determined during the pairing of a mobile computing device with a compatible smart/dumb screen, e.g., during the execution of one of the pairing protocols discussed above. This may be important in instances where a smart/dumb screen is capable of decompressing data that has been compressed with only certain types of compression algorithms.

The method may then proceed through blocks 904 and 905, wherein compressed frames of the captured frame buffer are encapsulated in packets and transmitted to a paired screen for display. The operations performed pursuant to these blocks are substantially the same as those described above in connection with blocks 804 and 805 of FIG. 8, and so will not be reiterated. Because the type of compression and compression level applied to each frame of the captured frame buffer may differ in this method however, the compression optimization instructions when executed may cause the mobile computing device to annotate each packet produced pursuant to block 904 with information regarding the type and/or level of compression applied to the frame encapsulated in such packet. This information may be used by a paired screen to appropriately decode and/or decompress packets it receives from a mobile computing device.

At block 906, one or more performance metrics may be monitored versus the type and level of compression applied to frames of the captured frame buffer. That is, compression optimization instructions (integral to or separate from the framethrower instructions) when executed by a processor of the mobile computing device may cause the device to monitor one or more performance metrics versus the type and/or level of compression applied pursuant to block 903.

The type and nature of the performance metrics that may be monitored can vary widely, and may include metrics that are intrinsic and/or extrinsic to the mobile computing device. Non-limiting examples of suitable performance metrics intrinsic to the mobile computing device include processor load, processor cycles/time required to complete compression of a frame, power usage, battery level, combinations thereof, and the like. Non-limiting examples of suitable performance metrics extrinsic to the mobile computing device include display frame rate, signal strength/bandwidth of the communications channel between the mobile computing device and a paired screen, combinations thereof, and the like.

At block 907 a decision may be made as to whether the monitored performance metrics are acceptable in view of one or more preset performance thresholds. In this regard, the compression optimization instructions when executed may cause the mobile computing device to compare one or more of the monitored performance metrics against one or more corresponding performance thresholds. The performance thresholds may be set by a user of a mobile computing device (e.g., based on user preference) or may be preset by a manufacturer or service provider to define the characteristics of acceptable performance (e.g., quality of service).

If the monitored performance metrics do not meet or exceed relevant performance thresholds the method may proceed to block 908, wherein the type and/or level of compression applied to frames of the captured frame buffer may be adjusted. The type of compression may be varied from one type to another, and the compression level applied with a type of compression may be adjusted upwards (increased compression) or downwards to address identified performance deficiencies and or to achieve a desired balance of performance.

For example, a mobile computing device may configured to perform proactive air management. In such embodiments, the mobile computing device may be configured to monitor bandwidth available in an established connection with a paired screen, as well as the processor load/CPU cycles expended to compress frames using a particular frame compression technique and/or level. Information obtained through such monitoring may be used to dynamically adjust various parameters such as compression type, video resolution, video content, etc., so as to obtain a desired level of display performance.

By way of example, a mobile computing device consistent with the present disclosure may be equipped with a relatively slow processor but may have established a high bandwidth connection with a paired screen. In that case, the type and level of compression initially applied to frames of the captured frame buffer may impose a load on the processor that exceeds a predetermined processor load threshold, while leaving some bandwidth available in the connection between the device and the paired screen. To compensate, the compression optimization instructions when executed may cause the mobile computing device to lower the level of compression applied to frames of a captured frame buffer, to change to a less processor intensive type of compression, to alter the resolution of the thrown video, to otherwise modify the thrown video, combinations thereof, and the like.

Any of those alterations may reduce the load on the processor, potentially to a point where the processor load is within a predetermined processor threshold. In some embodiments, such adjustments may come at the expense of elevated bandwidth consumption, as reducing the level of compression and/or adjusting to a less intensive compression type may result in the need to transmit larger and/or additional packets, relative to instances where a higher level of compression and/or more intensive compression type is used.

In another example, a mobile computing device may include a relatively fast processor but may have established a relatively low bandwidth connection with a paired screen. In such instances, the processor load imposed by an initial compression type and level may be within an acceptable processor load threshold, but the bandwidth required to transmit sufficient packets may not be available in the communications channel. To address this issue, the compression optimization instructions when executed may cause the mobile computing device to switch to a more processor intensive compression type that is capable of increasing frame compression, and/or to increase the compression level applied to frames of the captured frame buffer. Either or both of such adjustments may reduce the size and/or number of data packets transferred over the communications channel, potentially to within an acceptable bandwidth threshold. In some embodiments, such adjustments may come at the expense of elevated processor load, as increasing the level of compression and/or adjusting to a more intensive compression type may result in the need for additional processor cycles to perform the compression, relative to instances where a lower level of compression and/or less intensive compression type is used.

Once an adjustment to the type and/or level of compression is made pursuant to block 908, the method may proceed back to block 903, wherein the adjusted type and/or level of compression is applied to additional frames of the captured frame buffer. The method may then repeat through blocks 903 to 907 until a satisfactory performance level is achieved.

One a satisfactory performance level is achieved; the method may proceed to block 909, wherein flamethrower instructions when executed may cause the mobile computing device to monitor for a termination event. If no termination event is detected, the method may loop back to block 902 and repeat. If a termination event is detected, the method may proceed to block 911 and end.

Another aspect of the present disclosure relates to a mobile computing device that is configured to transmit video information to a smart/dumb screen using a streamthrower protocol. As will be described below, such devices may utilize video streaming technology to transmit video information to a paired screen over a wired or wireless connection. This is in contrast to devices that employ a framethrower protocol, wherein individual frames of a frame buffer may be captured and output to a paired screen.

Mobile computing devices configured to utilize a streamthrower protocol may include any or all of the elements of device 101 as described above with respect to FIG. 2. In particular, such devices may include a processor, memory, wireless communications interface (WCOMMS), media interface, one or more sensors, a power source, and optionally one or more input devices. The processor of the mobile computing device may execute an operating system, which may be stored in the memory. In addition, a streamthrower module may be stored in the memory of the mobile computing device. The streamthrower module may include computer readable streamthrower instructions that when executed by the processor may cause the mobile computing device to transmit video and/or other data to a paired smart/dumb screen via a media (wired) interface or a wireless communications interface using a streamthrower protocol. In addition, the device may be equipped with an optional video compression engine (not shown), which may be in the form of hardware, software, or a combination thereof.

Figure 10:
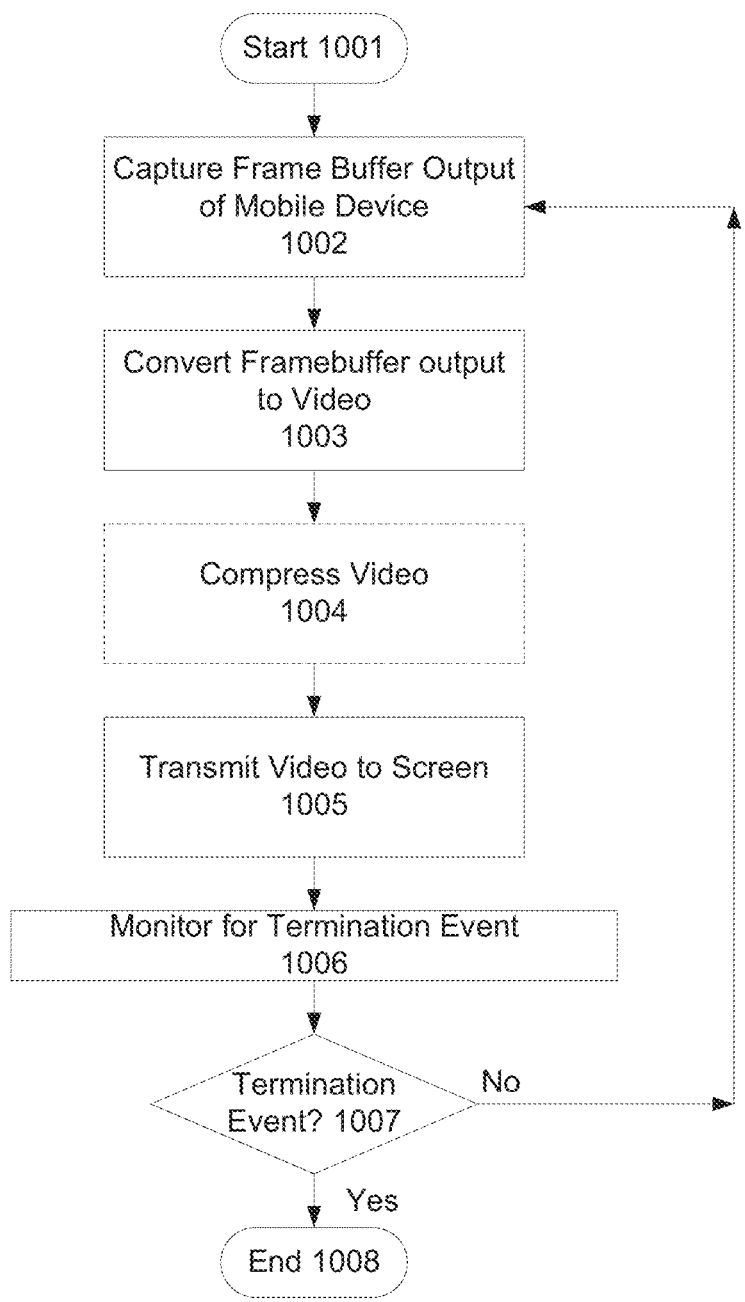
FIG. 10 is a flow diagram of an exemplary streamthrower protocol consistent with the present disclosure.

Reference is now made to FIG. 10, which depicts a flow diagram of an exemplary streamthrower protocol consistent with the present disclosure. For the sake of discussion, the protocol of FIG. 10 is described with the assumption that it is being executed by a processor of a mobile computing device from within the context of an operating system. It is also assumed that the method is executed after successful pairing of a mobile computing device and a screen. It should be understood that this description is exemplary only, and that the streamthrower protocol may be executed by a mobile computing device in another context.

In the embodiment of FIG. 10, the streamthrower protocol beings at block 1001. At block 1002, streamthrower module instructions when executed by a processor of a mobile computing device may cause the device the capture the frame buffer of the device at the kernel level. Accordingly, the streamthrower module instructions may be understood as including one or more privileged OS operations that capture graphics frames at the kernel level. The method may then proceed to block 1003, wherein the captured frame buffer may be converted to video.

Conversion of the captured frame buffer to a video may be performed using software, hardware, or a combination thereof, so as to produce a video output of a desired format. Any suitable video format may be used, such as but not limited to any of the moving picture experts group (MPEG) formats (e.g., MPEG-2, MPEG-4 (MP4), etc.), Apple QUICKTIME® file format, flash video format, an M4V format, a windows media video (WMV) format, an html5 video format, combinations thereof, and the like. Conversion of the captured frame buffer to one or more of such formats may be accomplished using known conversion protocols, which may be executed in hardware, software, or a combination thereof.

Once the captured frame buffer is converted to video, the method may proceed to optional block 1004, wherein the streamthrower instructions when executed may cause the mobile computing device to compress the video. In this regard, the mobile computing device may include a hardware and/or software compression engine (not shown) configured to compress the video produced pursuant to block 1003. Without limitation, the mobile computing devices of the present disclosure preferably include a hardware compression engine for this purpose. Non-limiting examples of suitable compression engines that may be used include H.264, red green blue (RGB) to U'UV420, other compression engines, combinations thereof, and the like.

Once the video has been compressed or if the video is not compressed, the method may proceed to block 1005, wherein the streamthrower instructions when executed may cause the mobile computing device to transmit the video to a paired screen over an established communications channel. That is, the streamthrower instructions when executed may cause video produced pursuant to blocks 1002 and optionally 1003 to be transmitted to a paired smart/dumb screen over an established wired or wireless connection. Transmission of the video may be accomplished using any suitable video transmission protocol, such as a video streaming protocol. Non-limiting examples of suitable video streaming protocols that may be used include RTSP, other video streaming protocols, combinations thereof and the like.

The type of video produced pursuant to block 1002, the type of compression applied (if any) pursuant to block 1003, and/or the type of video streaming protocol may be selected based on the capabilities of the mobile computing device and the paired screen. In this regard, the mobile computing device and the paired screen may negotiate a compatible video format, compression type/level, and streaming protocol during any of the pairing processes discussed above.

Once video transmission to a screen has commenced, the method may proceed to block 1006, wherein the mobile computing device may monitor for the occurrence of a termination event. At block 1007, a determination is made as to whether a termination event has occurred. If a termination event has not occurred, the method may loop back to block 1002 and repeat. Upon the occurrence of a termination event, the method may proceed to block 1008, whereupon capture and transmission of video information ceases and the method ends.

With the foregoing in mind, the screens described herein may be configured to receive signals containing video information produced with a framethrower and/or streamthrower protocol executed by a mobile computing device, decode such signals to obtain the video information contained therein, and to cause such information to be rendered/displayed on a display. In this regard, the screens described herein may include a video decode module stored in a memory thereof. The video decode module may include computer readable decode instructions (e.g., JAVA or other code) that when executed by a processor or application specific integrated circuit of the screen cause the screen to decode signals containing video and other information received from a mobile computing device. In some embodiments, the decode instructions are configured to enable the screen to interpret and/or decode packets containing video information, to decompress such video information, and/or to cause such video information to be displayed on a screen. Accordingly, the decode instructions may be configured to support the packet format, video format, and compression type/amount used by a paired mobile computing device.

Performance of the display thrown to a screen may be impacted by numerous factors, including mobile computing device performance, available bandwidth in the communications link between the mobile computing device and the screen, the processing capabilities of the screen (if any), and combinations thereof. For example, a wireless communications link between a mobile computing device and a screen may have limited bandwidth. In such instances, the communications link may not be able to convey video information from the mobile computing device to the screen at a rate that is sufficient to produce an adequate user experience (as may be defined by quality of service).

To address this issue, the mobile computing devices and/or screens may be configured to support multiple forms of wireless communication, and may leverage all or a portion of such forms to obtain desired performance of a thrown display. More specifically, the mobile computing devices and/or screens described herein may support multiple forms of communication over one or more channels, and may utilize any or all of such forms to achieve a desired level of display performance.

The mobile computing devices and screens described herein may therefore each include a multichannel video transmission module (MVTM) stored in a memory thereof. As will be described below, the MVTM may include computer readable multichannel instructions that when executed by a mobile computing device and/or a screen cause the mobile computing device and/or screen to communicate video and/or other information over multiple communications channels and/or with multiple different communication modes.

Figure 11:
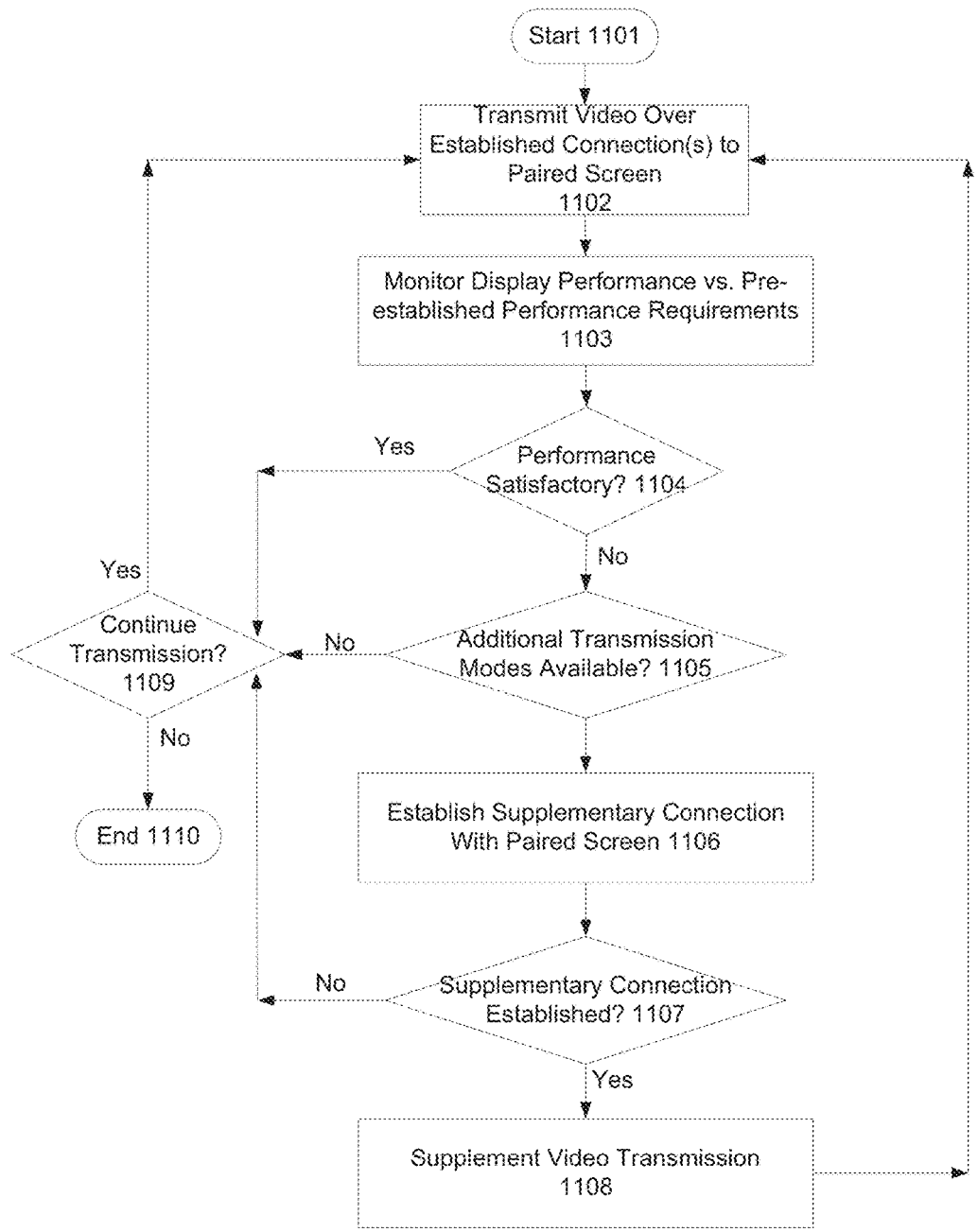
FIG. 11 depicts an example method of transmitting video information from a mobile computing device using one or more communications channels/modes, consistent with the present disclosure.

Reference is now made to FIG. 11, which depicts an exemplary method of transmitting video information from a mobile computing device using one or more communications channels/modes. For the sake of this discussion, it is assumed that the mobile computing device is wirelessly paired to a compatible screen and that a single communications channel has been established prior to the execution of the method, such as described above.

As shown, the method begins at block 1101. At block 1102, a mobile computing device may transmit video and/or other information over an established connection/channel to a paired screen. That is, the mobile computing device may throw its display to a paired screen over an established wireless communications channel. The method may then proceed to block 1103, wherein the mobile computing device and/or screen may monitor the performance of the thrown display and compare it to pre-established display performance requirements. Monitoring of the performance of the thrown display may be performed in any suitable manner. By way of example, the mobile computing device may monitor reports of display performance (e.g., frames per second) that are received from a paired screen over an established backchannel. Alternatively or additionally, the mobile computing device may monitor the rate and/or speed with which video data is transmitted from its wireless communication interface to a paired screen, and compare it to pre-established rate/speed requirements. Other metrics may include the number of dropped frames, frames displayed per second, max time between frame updates, combinations thereof, and the like. Likewise, a screen may be configured to monitor the frames per second at which a thrown display is rendered/displayed, and/or the speed/rate at which video data is received from a mobile computing device.

The method may then proceed to block 1104, wherein a determination may be made as to whether the performance of the thrown display is adequate. Such determination may be based upon a comparison by the mobile computing device and/or screen of the monitored performance of the thrown display against pre-determined performance requirements, as may be set by quality of service. If the monitored performance is determined to be adequate, the method may proceed to block 1109, wherein a determination may be made as to whether transmission of video information is to continue. If so, the method may loop back to block 1102 and repeat. If not, the method may proceed to block 1110 and end.

If the performance of the thrown display is determined to be inadequate, the method may proceed to block 1105, wherein a determination may be made by the mobile computing device and/or screen as to whether additional communication modes are available and supported. If no additional communication modes are available and supported by the mobile computing device and screen, the method may proceed to block 1109 and potentially to block 1110. If additional communication modes are available and supported by the mobile computing device and screen however, the method may proceed to block 1106 wherein a supplementary connection is established between the devices using one or more of the additional communication mode(s)

For example, the mobile computing device and screen may each support communication over WiFi and NFC. In such instance, pairing of the mobile computing device and screen may establish an initial connection between them using only NFC. Pursuant to the method shown in FIG. 9, the screen and/or mobile computing device may monitor the performance of the display that is thrown from the mobile computing device to the screen using the NFC connection. If the performance of the thrown display is determined to be inadequate (pursuant to block 1104), the mobile computing device and/or screen may determine pursuant to block 1105 that WiFi communication is available and supported by both of them. Then, pursuant to block 1106, the mobile computing device and/or screen may negotiate and establish a supplementary wireless connection with one another using a mutually supported WiFi protocol.

The method may then proceed to block 1107, wherein a determination may be made as to whether a supplementary connection has been established. If not, the method may proceed to block 1109 and from there to blocks 1102 or 1110. If so, the method may proceed to block 1108, wherein the mobile computing device may supplement the transmission of video information to the screen using the supplementary connection. For example, the mobile computing device may split or otherwise allocate transmission of packets containing video information between the initial connection (e.g., NFC) and the supplementary connection (e.g., WiFi), so as to obtain a composite connection having bandwidth that exceeds the bandwidth of the initial connection, and/or which exhibits other benefits relative to the initial connection, such as increased stability. The method may then loop back to block 1102 and repeat until the transmission of video information is terminated.

As discussed above, the mobile computing devices described herein may be configured to transmit video to one or more paired screens over a wired or wireless connection. In some instances this capability may be leveraged such that programs (e.g., an operating system and/or applications executed in the context of the operating system) are executed on the mobile computing device, and the display output produced by the execution of such programs is transmitted to a paired screen that is not integral to the device for display.

By way of example, the mobile computing devices described herein may be configured to execute an operating system such as a Microsoft WINDOWS® operating system, Google ANDROID® operating system, the Apple® iOS and/or OS X® operating systems, a Linux operating system, another operating system or a combination thereof. Such operating systems when executed produce a graphical user interface (GUI) that facilitates user interaction with the operating system and applications executed from within the environment of the operating system. In a traditional device, the GUI may be displayed on a screen that is integral with the device or which is connected to the device with a wired connection.

Like a traditional device, the mobile computing devices of the present disclosure may also execute operating systems such as those mentioned above. Unlike traditional devices however, the mobile computing devices described herein may lack an integral display and may be configured to transmit or "throw" the display output produced during the execution of an operating system or application (e.g., a GUI) to a non-integral display, as discussed above. The result may be a disaggregated computing system wherein processing and execution of an operating system and applications occurs on the mobile computing device, but the video output resulting from such processing and execution is transmitted to a non-integral screen for display, e.g., using a wireless connection between the mobile computing device and the screen.

Many screens (e.g., laptop displays, televisions, smart phone displays, etc.) are configured to optimally display images and video in a certain orientation (landscape/portrait) and with a certain aspect ratio (16:9; 16:10; 4:3; etc.). As a result, management of the orientation and/or aspect ratio of the video output transmitted from a mobile computing device may be desired, particularly if the mobile computing device is capable of producing a video output that is in a different orientation or at a different aspect ratio than the orientation and aspect ratio of a screen with which it is paired.

It is noted that many applications intended for execution on mobile device operating systems (e.g., ANDROID®, Apple OS®, etc.) are coded such that the video output of the application can rotate or switch in response to a change in the orientation of the underlying device. For example, if a mobile device is rotated from a portrait orientation to a landscape orientation, applications run within the context of a mobile operating system executed on such device may be configured to change their demanded video output orientation accordingly. This change in orientation may be predicated on the receipt of "change of screen orientation" update messages received from the operating system. Of course, an application need not be coded in this manner. Indeed, some applications may be coded such that their video output remains in a fixed orientation, whether or not the device executing that application is rotated.

With the foregoing in mind, the mobile computing devices described herein may pair with various different screens that have different preferred orientations, scale and/or aspect ratios. As a result, the video output transmitted from the mobile computing device may be oriented and/or scaled in a manner that is inconsistent with the preferred orientation and aspect ratio of a paired screen. For example, the display output from a mobile computing device may have a first orientation (e.g., landscape), whereas a screen paired with the mobile computing device may have a second orientation (e.g., portrait) that is different from the first orientation. This difference in orientation may cause the video output from the mobile computing device to be awkwardly or improperly displayed on the screen.

Reorientation of the mobile computing device may also cause the orientation of the video output to switch and hence, cause the orientation of the video displayed on a paired screen to switch. This may be problematic, particularly if the mobile computing device is not held stationary. For example, if the mobile computing device is stored in a pocket of a user, its orientation (e.g. as reported by one or more gyroscopes within the mobile computing device) may switch repeatedly as the user moves. With each reorientation of the device, the orientation of the display output from the device may change. This change in orientation may be translated through to paired screen. That is, it may cause the orientation of the video displayed on a paired screen to change repeatedly, potentially resulting in an annoying user experience.

Some applications executed within an operating system may demand a video output that is oriented in a particular manner, regardless of the orientation of the device on which the application is executed. For example, some applications may be coded to demand a video output with a landscape orientation, regardless of whether the device executing the application is oriented in portrait or landscape. As a result, video information transmitted to a paired screen from the mobile computing device may have the demanded orientation, even if that orientation is not consistent with a preferred orientation of the paired screen.

Finally, some applications may be intrinsically designed with one display orientation in mind, but may be coded as if they are in the opposite orientation. In these cases, input device information (e.g. mouse and/or touch coordinates) sent from a paired screen a mobile device (e.g., over a back channel as described below) may be opposite to the coded orientation. For example, an application may be designed with landscape orientation in mind, but may be coded as though it was to run in a portrait orientation. In such instances, the video output transmitted from a mobile computing device to a screen may be displayed by the screen in a landscape orientation. This may cause a screen to report received inputs (e.g., from input devices coupled thereto) to a mobile computing device in a manner that is inconsistent with the designed orientation of the application.

For example, an application executed by a mobile computing device may be designed with a landscape orientation in mind, but may be coded as though it were to run in a portrait orientation. In such instances, the video output from the mobile computing device may be thrown to a paired screen and displayed in landscape orientation. As will be described later, input devices coupled to the screen may be used to interact with the application executed on the mobile computing device. This interaction may be facilitated by the reporting of events (e.g., mouse clicks, swipes, touches, etc.) by the screen to the mobile computing device, e.g., over a backchannel. In this instance, because the screen has no knowledge of the coded orientation of the application, it may report pixel/location coordinates corresponding to an event generated by an input device (e.g., a click, swipe, etc.) in a manner consistent with the coded orientation. In this instance, the screen may report pixel/location coordinates consistent with a landscape orientation, which may be opposite to the coded portrait orientation.

In sum, various factors related to orientation may impact the display of applications executed on a mobile computing device on a paired screen, and/or interaction with those applications using input devices coupled to the paired screen. One aspect of the present disclosure relates to systems and methods for addressing one or more of these issues by enabling the management of the orientation of the video output transmitted from a mobile computing device consistent with the present disclosure.

In this regard the mobile computing devices described herein may include an orientation control module stored within a memory. The orientation control module may include orientation instructions that when executed by a processor of a mobile computing device enable management and/or control of the orientation of the video output produced by the execution of an operating system and/or applications on the mobile computing device. Management of the orientation may occur on the mobile computing device, the paired screen, or a combination thereof.

In some embodiments, the orientation instructions when executed cause the mobile computing device to disable "change of screen orientation" notifications that may be sent from an operating system to an application executed within the context of the operating system. That is, the orientation instructions when executed may cause the operating system to report to an application that the mobile computing device is in a fixed orientation, even when the physical orientation of the mobile computing device may change. By disabling the production of change of screen orientation notifications, applications executed within the context of the operating system may demand a video output with an orientation that is consistent with the fixed orientation reported by the operating system. As a result, the video thrown to a paired screen from the mobile computing device may remain in a fixed orientation.

Alternatively or additionally, the orientation instructions when executed may enable automatic control over the orientation of the image produced on a paired screen by informing the screen how to orient itself and/or otherwise configure the display to stay consistent with the demands of an application executed on the mobile computing device. In this regard, reference is now made to FIG. 12, which depicts an exemplary orientation control method consistent with the present disclosure. For the sake of the discussion of this method, it is assumed that a mobile computing device has been previously paired with a compatible screen, that the mobile computing device is throwing its display to a screen, and that the display correlates to a graphical user interface of an application executed on the mobile computing device from within the context of an operating system.

Figure 12:
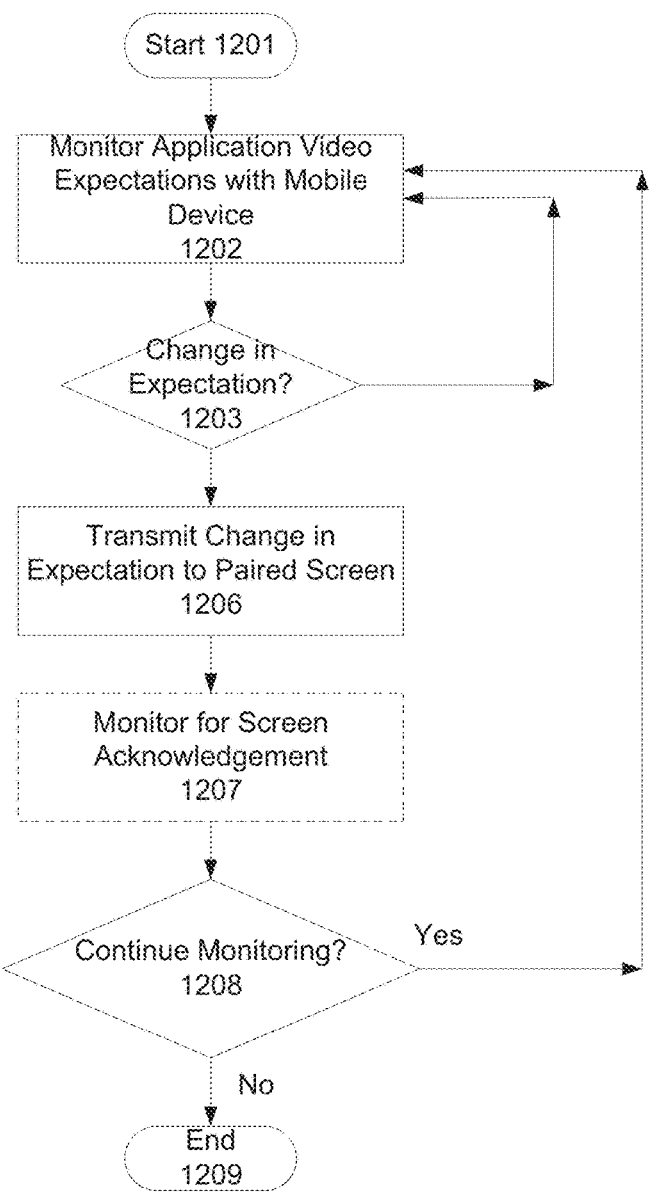
FIG. 12 depicts an exemplary orientation control method consistent with the present disclosure.

As shown, the method of FIG. 12 begins at block 1201. At block 1202, orientation instructions executed by a processor may cause the mobile computing device to monitor the expectations of an application executed thereon with respect to the orientation and/or other parameters (resolution, scale, etc.) of its display output. As may be appreciated, application expectations with respect to display orientation and/or other parameters may change in response to change of screen orientation notifications received from an operating system.

The method may then proceed to block 1203, wherein a determination is made as to whether a change in application expectations with respect to orientation and/or other parameters of its display output have been detected. If no change has been detected, the method may loop back to block 1202, wherein the orientation instructions when executed further cause the mobile computing device to monitor for a change in application expectations. If a change in expectations is detected however, the method may proceed to block 1206, wherein the orientation instructions when executed may cause the mobile computing device to transmit the change in expectations to a paired screen. The change in expectations may be transmitted to the screen I any suitable message format. For example, the change in expectations may be transmitted in a message format having a header that defines the change in expectation at issue (e.g., change in orientation, scale, resolution, etc.), and a data/body portion identifying the newly expected value.

With this in mind, a paired screen may include an orientation control module having computer readable orientation instructions thereon, which when executed by a processor cause the screen to adjust the parameters of the thrown display to remain consistent with the expectations of an application executed on the mobile computing device. For example, in response to receiving a signal conveying a change in display expectations from a mobile computing device, the orientation instructions when executed by a processor of the screen may cause the screen to change characteristics of the thrown display such that they are consistent with the new expectations conveyed in the signal. In some embodiments the orientation instructions when executed may cause the screen to terminate an existing window in which the thrown display is rendered/displayed, and open a new window rendering/displaying the thrown display in accordance with the modified expectations. The orientation instructions when executed may then optionally cause the screen to message the mobile computing device and acknowledge the change in expectations and/or the production of the new window.

Returning to FIG. 12, once the mobile computing device has transmitted a signal containing change in expectation information to a paired screen, the method may proceed to optional block 1207, wherein the mobile computing device may monitor for receipt of an acknowledgement from the screen. Whether or not such monitoring is performing, the method may proceed to block 1208, wherein a determination is made as to whether the mobile computing device will continue to monitor for changes in application expectations with respect to screen orientation and other factors that may impact the appearance of the thrown display. If monitoring is to continue, the method may loop back to block 1202 and repeat. If not, the method may proceed to block 1209 and end.

Another aspect of the present disclosure relates to technology for selectively offloading the decoding of certain content from a mobile computing device to a non-integral display. In this regard, the mobile computing devices described herein may be used to perform general computing task, such as but not limited to web browsing, word processing, and the like. In the case of web browsing, a mobile computing device consistent with the present disclosure may execute one or more web browsers, such as Google Chrome, Microsoft Internet Explorer, Apple Safari, or the like. The user interface for such web browsers may be thrown by the mobile computing device to non-integral display. As discussed elsewhere herein, a user may utilize interface devices coupled to the screen or the mobile computing device to interact with applications executed on the mobile computing device, in this case a web browser. Thus, a user may input a web address with an input device attached to the screen, which may cause the mobile computing device to access a web page associated with the address and throw the result display to the screen.

With the foregoing in mind, the mobile computing devices described herein may be configured in some embodiments to offload the decoding of encoded video information received from a wide area network (e.g., a streaming video) to a paired non-integral screen. In this regard, mobile computing device may include an offload module including computer readable offload instructions which when executed by a processor may cause the mobile computing device to route or otherwise transmit encoded video information received from a wide area network to a paired non-integral screen.

Information associated with the encoded video (e.g., information appearing around the encoded video on a website) may be processed by a web browser application executed on the mobile computing device. The mobile computing device may then capture the resulting frame buffer output produced by that processing and throw it to the paired screen.

The paired screen may include a decode module including computer readable decode instructions that when executed cause the screen to decode encoded video data received from a mobile computing device (including encoded video offloaded by that mobile computing device). This may reduce the processing load on the mobile computing device, which may in turn potentially increase its battery life. In addition the decode instructions when executed by a processor for the screen may cause the screen to reproduce the information around the received offloaded video (e.g., associated web information) on a display, and to render/display the decoded offloaded video at an appropriate location within the displayed information. In this way, the mobile computing technology described herein may enable a mobile computing device to offload encrypted video data decoding operations to a remote screen, while potentially providing a seamless user experience with respect to the video data and associated information (e.g., web information) surrounding the encoded video frame as it appears on a website.

Another aspect of the present disclosure relates to technology for executing and interacting with applications that are executed by a mobile computing device consistent with the present disclosure. More particularly, aspects of the present disclosure relate to systems and methods for executing and/or interacting with applications executed by a mobile computing device that lacks an integral screen. As will be described in detail below, these systems and methods may enable a user to initiate and/or interact with applications executed on a mobile computing device consistent with the present disclosure when the mobile computing device is and is not paired with a compatible screen.

By way of example, the mobile computing devices described herein may be configured to enable application initiation/interaction in response to motions or gestures made with the mobile computing device. In such embodiments, the mobile computing devices may include one or more sensors configured to produce a detectable output in response to motion of the mobile computing device. Non-limiting examples of such sensor(s) include gyroscopes, accelerometers, combinations thereof, and the like. Such sensors may produce an output indicative of one or more characteristics of a motion made with a mobile computing device. For example, such sensors may produce an output indicative of a mobile computing device's velocity, acceleration, tilt, direction of motion, or a combination thereof.

The mobile computing devices described herein may further include logic such as a processor and a memory including a gesture module that is configured to monitor the output (data) from sensors within the mobile computing device, and compare such data to a gesture database correlating certain sensor data to one or more gestures. The gesture database may further correlate one or more gestures to one or more applications, and/or one or more actions that may be taken within a specific application. The gesture module may therefore be understood as an intelligent agent that may be executed by a processor of a mobile computing device to observe sensor and/or input device data, correlate such data to associated actions, and to cause the performance of such actions by the mobile computing device.

More specifically, the gesture module may include computer readable gesture instructions that when executed by a processor of the mobile computing device cause the mobile computing device to perform sensor data monitoring operations, gesture correlation operations, and application execution/interaction operations consistent with the present disclosure. In particular, the gesture instructions when executed may cause the mobile computing device to monitor sensor data, correlate the sensor data to a gesture in a gesture database, and execute one or more actions (e.g., application initiation/interaction) associated with the correlated gesture.

Figure 13:
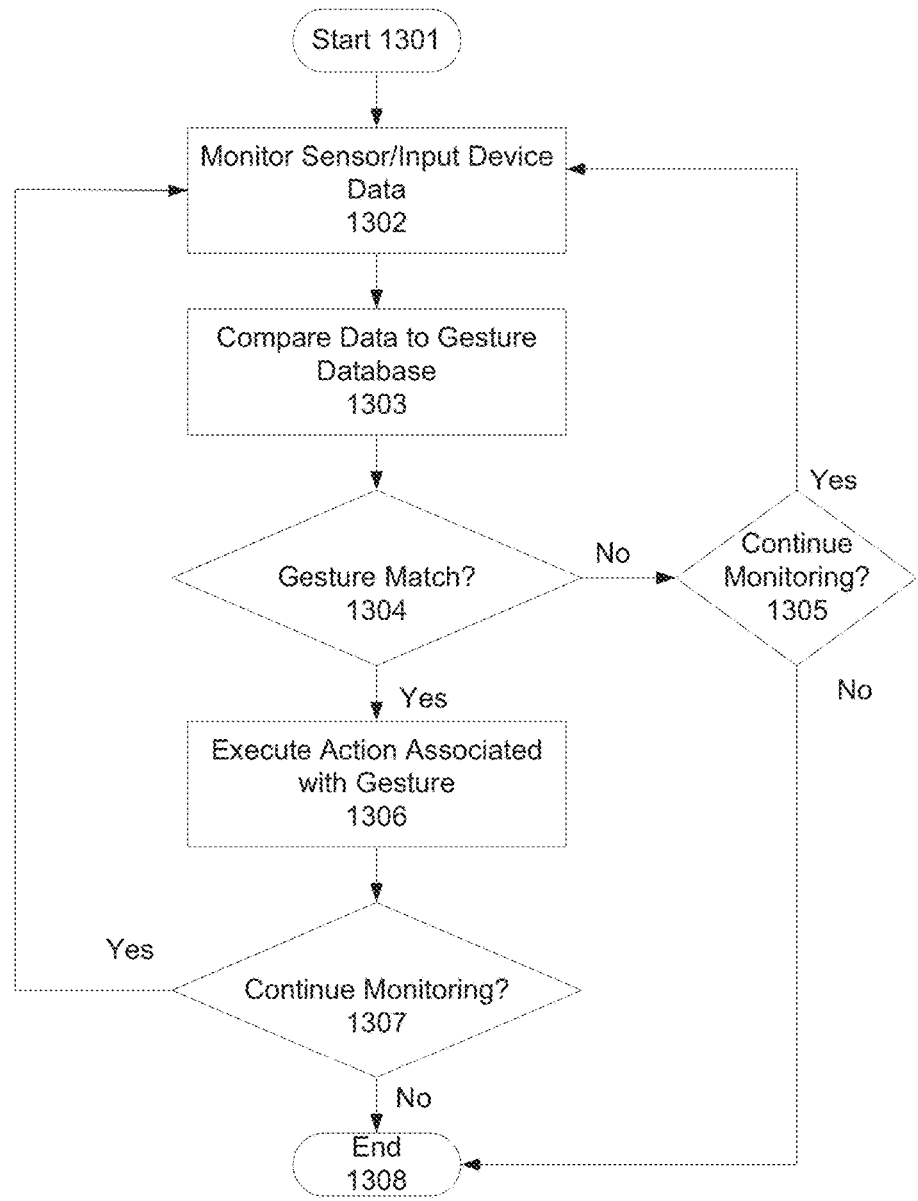
FIG. 13 illustrates example operations of a gesture module including gesture instructions consistent with the present disclosure.

Reference is now made to FIG. 13, which illustrates one example of the operation of a gesture module including gesture instructions consistent with the present disclosure. As shown, the method begins at block 1301. At block 1302, the gesture instructions when executed may cause a mobile computing device to monitor sensor data produced by one or more sensors, such as an accelerometer, gyroscope, or a combination thereof. The method may then proceed to block 1303, wherein the gesture instructions when executed may cause the mobile computing device to compare the monitored sensor data to a gesture database. At block 1304, the gesture instructions when executed may cause the mobile computing device to determine whether monitored sensor data corresponds to one or more gestures included in the gesture database.

If the monitored sensor data does not correlate to a gesture in the gesture database, the method may proceed to block 1305, wherein the gesture instructions when executed cause the mobile computing device to determine whether monitoring of sensor data is to continue. This outcome of this decision may in some embodiments be predicated on whether a pre-determined time frame has expired for the receipt of sensor data corresponding to a gesture. In any case, if monitoring is not to continue, the method may proceed to block 1308 and end. If monitoring is to continue however, the method may proceed back to block 1302 and repeat.

If the monitored sensor data correlates to a gesture in the gesture database, the method may proceed from block 1304 to block 1306, wherein the gesture instructions may cause the mobile computing device to execute an action correlated to the gesture. The nature of the action may depend on various contextual factors and other parameters, such as but not limited to what applications (if any) are currently executed on the mobile computing device, whether any default actions control, characteristics of the gesture made with the mobile computing device (e.g. sensor data indicating a relatively large motion/gesture may be associated with one type of action, whereas sensor data indicating a relatively small motion may be associated with another action), combinations thereof, and the like. Similarly, a gesture in the gesture database may be correlated with the initiation of an application (if the application is not running), as well as a specific actions within the application (if the application is running). Thus for example, a gesture indicating a left-ward motion of a mobile computing device may initiate a first application, if the application is not running. If the first application is running however, the same left-ward motion of the mobile computing device may be correlated to a specific action within the application, e.g., audio controls, social media updates, etc.

Returning to block 1302, the gesture instructions when executed may also cause the mobile computing device to also monitor for inputs made through one or more input devices coupled to the mobile computing device. For example, in addition to monitoring for sensor data (e.g., from accelerometers, gyroscopes, etc.), the gesture instructions when executed may monitor for inputs made using one or more buttons or other input devices coupled to the mobile computing device. The combination of such inputs with the monitored sensor data may then be compared by the mobile computing device pursuant to block 1303 to a gesture database. In such instances, the gesture database may include one or more inputs as modifiers to a correlated action, thus enhancing the number of actions that may be correlated to a particular motion. For example, the gesture database may correlate a left-ward motion of a mobile computing device with a first action, e.g., execution of a first application or a first action within the first application, etc. The gesture database may correlate a combination of the same left-ward motion and a button press (or other input received from an input device) with a second action, e.g., the execution of a second application, execution of a second action within the first application, etc.

Once the action associated with a gesture (or combination of gesture and input) is performed, the method may continue to block 1307, wherein the gesture instructions when executed cause the mobile computing device to make a determination as to whether sensor/input device monitoring is to continue. If monitoring is to continue, the method may loop back to block 1302 and repeat. But if not, the method may proceed to block 1308 and end.

As described above, the mobile computing devices of the present disclosure may enable a user to initiate and/or interact with applications on a mobile computing device, even if the mobile computing device does not include an integral display. While FIG. 13 and the foregoing description focuses on application initiation and/or interaction using a gesture based protocol, the use of gestures is not required. Indeed, the mobile computing devices described herein may be configured such that application initiation and/or execution of actions within an application may be correlated to one or more inputs made through input devices (e.g., buttons, touchpads, etc.) and/or non-motion sensors (e.g., microphones, cameras, etc.) coupled to the mobile computing device. The nature and operation of such methods may similar to that described in FIG. 13, except insofar as the gesture database may be replaced and/or augmented with an input database correlating specific inputs (e.g. button presses, touchpad presses, voice information, image information, etc.) with one or more actions such as application initiation and/or interaction.

As a non-limiting use case consistent with the methodology of FIG. 13, the mobile computing devices describes herein may include a processor that is configured to execute an operating system (e.g., ANDROID®; IOS, etc.), one or more social media applications, and one or more gesture modules, each of which may be stored in a memory of the device. In addition, the mobile computing devices may include one or more sensors (e.g., gyroscopes, accelerometers, etc.), and a wireless communications interface that is capable of close or long range communication using one or more wireless networks. The gesture module may correlate sensor and/or input device with one or more gestures, and correlate such gestures with one or more actions. Such actions may include for example initiation of the social media application and automatic execution of status updates within the social media application. For example, sensor data indicative of a left-ward motion of the mobile computing device may be correlated in the gesture database to a left-ward gesture, which in turn may be correlated with initiation of the social media application. Likewise, sensor data indicative of a right-ward motion of the mobile computing device may be correlated in the gesture database with a right-ward gesture, which in turn may be correlated with the execution of automatic status updates from within the social media application.

In operation, a user of the mobile computing device may initiate execution of the social media application by making a left-ward motion with the mobile computing device, optionally in conjunction with depressing one or more buttons and/or with an input from another input device and/or non-motion sensor. In such instances, gesture instructions within the gesture module may cause the mobile computing device to detect the sensor data associated with the left-ward motion, and correlate such data to the left-ward gesture in the gesture database. The gesture instructions when executed may further cause the mobile computing device to execute the action associated with the left-ward gesture, in this case the execution of the social media application.

The user may then cause the mobile computing device to automatically update his/her status within the social media application by making a right-ward motion with the mobile computing device, optionally in conjunction with a button press (or other input device element). The gesture instructions when executed may cause the mobile computing device to detect sensor data associated with the right-ward motion and correlate such data to a right-ward gesture in the gesture database. In addition, the gesture instructions when executed may cause the mobile computing device to perform the action associated with the right-ward gesture in the gesture database, in this case the automatic updating of the user's status within the social media application.

In another non-limiting use case, the gesture module may correlate sensor and/or input device inputs with alphanumeric characters, which may be output to a paired screen. This enables interesting opportunities in which a user of a mobile computing device may "write" in the air, e.g., while holding the mobile computing device or an input device coupled thereto, and the mobile computing device may translate the user's writing motions into alphanumeric characters for display on a paired screen.

In some embodiments, the mobile computing devices described herein may be configured to enter a secured mode, e.g., in response to user input (e.g., a gesture, button press, voice command, etc.), and/or after the expiration of a pre-determined time frame. In secured mode, access to resources within the mobile computing device may be prevented until the identity of a potential user is verified. Verification of user identity may be performed using any suitable authentication protocol, such as a password authentication protocol, a biometric authentication protocol (in instances where the mobile computing device is equipped with appropriate sensors and has access to appropriate biometric templates), combinations thereof, and the like.

Alternatively or in addition to password and/or biometric authentication, the mobile computing devices may be configured to perform a gesture based authentication protocol to verify the identity of a user. In general, the gesture based protocol monitors for sensor data (alone or in combination with input device data), and compares that data to security database that correlates certain sensor inputs with authenticated users of the mobile computing device. For example, the security database may correlate a first motion (optionally in combination with one or more button presses or another input from an input device) with a first authenticated user, a second-motion (optionally in combination with one or more button presses or another input from an input device) with a second authenticated user, and so forth. If sensor and/or input device data detected by the mobile computing device correlates with an authenticated user, the mobile computing device may enter an unlocked state, wherein the user is permitted access to resources within the device. If the detected sensor and/or input device data does not correlate with an authenticate user however, access to resources within the mobile computing device may be denied.

Execution of the gesture based authentication protocol may be facilitated by the gesture module discussed above, or another module stored in a memory of the mobile computing device. For example, gesture instructions when executed may cause the mobile computing device to perform gesture based authentication operations consistent with the present disclosure when the mobile computing device is in a secured state.

Figure 14:
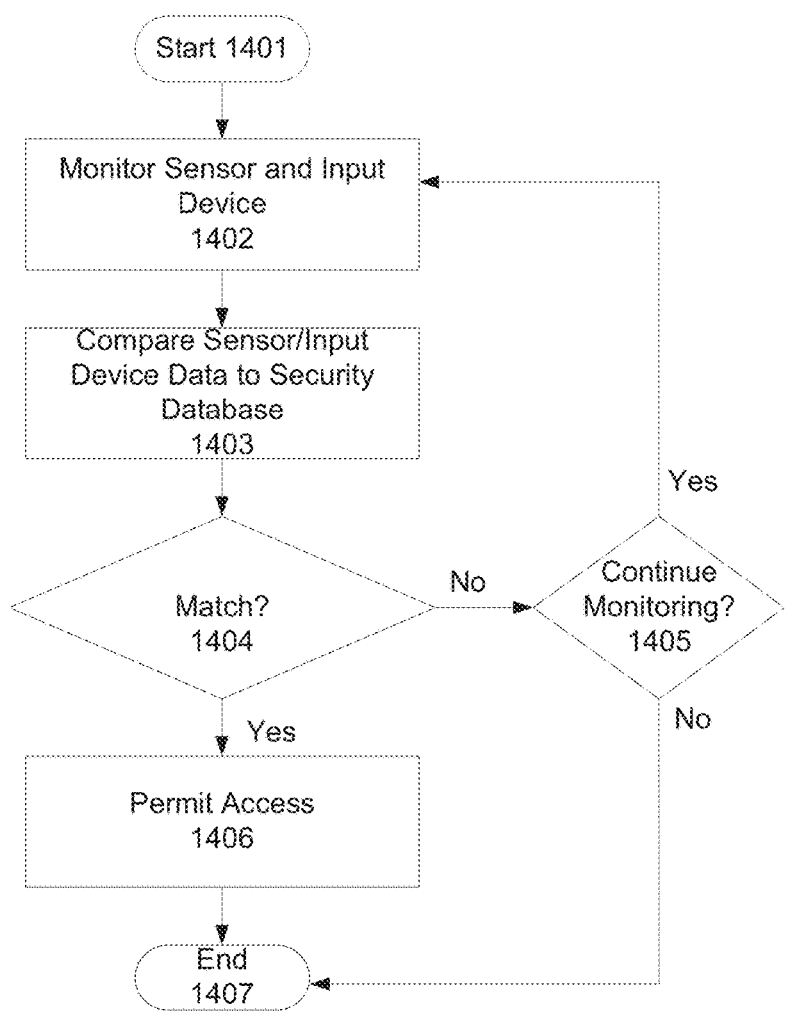
FIG. 14 depicts one example of gesture based authentication operations consistent with the present disclosure.

Reference is now made to FIG. 14, which depicts one example of the gesture based authentication operations that may be performed or caused by the execution of gesture instructions when a mobile computing device is in a secured state. As shown, the method begins at block 1401. At block 1402, the gesture instructions when executed may cause the mobile computing device to monitor for sensor data (associated with motion of the mobile computing device or otherwise) and optionally for data produced by one or more input devices (e.g., buttons) in response to a user input.

The method may then proceed to block 1403, wherein the gesture instructions when executed may cause the mobile computing device to compare the detected sensor and/or input device data with a security database stored in a memory of the mobile computing device. As noted previously, the security database may correlate sensor and/or input device data with one or more authenticated users of the mobile computing device. In some embodiments, the security database may be an independent database that is maintained independently of other databases on the mobile computing device. For example, the security database may be stored in memory within a protected environment within the mobile computing device.

The term "protected environment" is used herein to refer to an execution environment within a mobile computing device and/or non-integral screen, and which includes memory and processing resources that are isolated or otherwise protect from other components of the authentication device via hardware, firmware, software or a combination thereof.

Memory enclave technology is one example of a protected environment that may be used in the mobile computing devices and non-integral screens of the present disclosure. Generally, a memory enclave may be made up of at least one memory page that has a different access policy than the access policy imposed by traditional ring boundaries of a computing system (in this case, an authentication device). The memory page(s) within a memory enclave may have associated read/write controls, which may be configured such that the read/write controls have exclusivity over certain operating modes or privilege "rings", such as system management mode or virtual machine monitors of an associated processor. Information stored and operations conducted within a secure enclave of an authentication device may therefore be isolated from other information, operations, and components of a mobile computing device and/or non-integral screen. In some embodiments of the present disclosure, a mobile computing device includes one or more memory enclaves that are configured to temporarily store one or more encrypted or unencrypted security databases.

Another example of a protected environment that may be used in the mobile computing devices and/or non-integral screens of the present disclosure is a trusted execution environment (TEE). Generally, a TEE is a secure environment that may run alongside an operating system and which can provide secure services to that operating system. More information regarding TEEs and the implementation thereof may be found in the TEE client application programming interface (API) specification v1.0, the TEE internal API (application programming interface) specification v1.0, and the TEE system architecture v1.0 issued by GlobalPlatform. In some embodiments, the mobile computing devices and/or non-integral screens described herein include a TEE that was provided using one or more of virtualization technology, uCode enhanced memory page protection, CPU cache as memory page protection and security co-processor technology. Non-limiting examples of such technology include INTEL® VT-x virtualization technology, INTEL® VT-d virtualization technology, INTEL® trusted execution technology (TXT), Xeon internet security and acceleration (ISA) "cache as RAM", converged security engine (CSE) technology, converged security and manageability engine (CSME) technology, a security co-processor, manageability engine, trusted platform module, platform trust technology, ARM TRUSTZONE® technology, combinations thereof, and the like. The nature, advantages and limitations of each of these technologies are well understood and are therefore not described herein.

In some embodiments the security database may be integral with the gesture database noted above. In the latter instance, the performance of gesture based security operations vs. other operations by the gesture instructions may be conditioned on the existence of relevant contextual factors, such as whether the mobile computing device is or is not in a secured mode.

In any case, the method may proceed to block 1404, wherein the gesture instructions when executed cause the mobile computing device to determine whether the detected sensor and/or input device data correlates to an authenticate user in the security database. If there detected data does not match an authenticated user, the method may proceed to block 1405, wherein the gesture instructions when executed may cause the mobile computing device to determine whether it should continue to monitor for sensor and/or input device data. If monitoring is to continue, the method may loop back to block 1402 and repeat. If monitoring is to cease, the method may proceed to block 1407 and end. In some embodiments, the determination made pursuant to block 1405 may be conditioned on whether or a not a predetermined time period has expired.

Returning to block 1404, if detected sensor and/or input device data matches an authenticated user, the method may proceed to block 1406, wherein the gesture instructions when executed may cause the mobile computing device to enter an unlocked state, whereupon access to resources within the mobile computing device may be granted. The method may then proceed to block 1407 and end.

Another aspect of the present disclosure relates to technology for facilitating user interaction with an application that executed on a mobile computing device, wherein the video output of the application is thrown by the mobile computing device to a non-integral screen for display. As will be described below, such technology includes systems and methods that enable interaction with user interface elements produced by the mobile computing device (e.g., a digital pointer), with input devices coupled to the mobile computing device, with input devices coupled to a screen paired with the mobile computing device, and combinations thereof.

In some embodiments, the mobile computing devices of the present disclosure may be configured to cause the production of a digital pointer (e.g. a cursor) on a local or remotely paired screen. The mobile computing device may further be configured to enable control over the digital pointer in any suitable manner. For example, motion of the digital pointer and the execution of events (e.g. "clicks, drags, swipes, etc.) with the digital pointer may be executed in response to motions made with the mobile computing device. In sum, the mobile computing device may be configured to execute a mobile and/or gesture based protocol to enable control over a digital pointer, for the purpose of enabling and/or facilitating user interaction with applications executed on the mobile computing device and displayed on a non-integral screen.

In this regard, the mobile computing devices described herein may include an input device module stored in a memory thereof. The input device module may include input device instructions that when executed by the mobile computing device cause the mobile computing device to produce a digital pointer such as a mouse cursor on a non-integral screen. For example, the input device module when executed may cause the mobile computing device to insert a digital pointer into the video output of an operating system or other application executed by the mobile computing device. As a result, display of the digital pointer may be thrown to the non-integral screen along with the display associated with the operating system and/or application.

In some embodiments, the input device instructions when executed may cause the insertion of a digital pointer into the frame buffer of an application and/or OS executed on a mobile computing device. As a result, the digital pointer may be captured along with the frame buffer, e.g., when the mobile computing device executes a framethrower and/or streamthrower protocol to throw the display associated with the application and/or operating system to a non-integral screen. Because the mobile computing device (or the OS and/or applications executed thereon) may have knowledge of the position of the digital pointer, this control method may be particularly suitable for use when the mobile computing device is paired with a dumb screen having little or no capability to provide input device reports (described below) back to the mobile computing device, e.g., over an established backchannel.

The input device instructions when executed may further cause the mobile computing device to monitor for sensor data and/or inputs made with one or more input devices (e.g., buttons) coupled to the mobile computing device to update the position of the digital pointer and/or perform an action. For example, the input device instructions may cause the mobile computing device to monitor sensors associated with motion (accelerometers, gyroscopes, etc.) of the mobile computing device or inputs made with input devices coupled the mobile computing device. The input device instructions may further cause the mobile computing device to correlate such data with factors relevant to the motion of a digital pointer, such as but not limited to acceleration, velocity, and tilt. The input device instructions may further cause the mobile computing device to convert such factors into two-dimensional screen surface coordinates (e.g., horizontal and/or vertical pixel coordinates), which may be bounded or otherwise defined by the dimensions and/or resolution of the thrown display. The input device instructions may also cause the mobile computing device to update the two-dimensional screen coordinates in response to a detected change in sensor and/or input device data, and move the digital pointer accordingly.

The input device instructions may also cause the mobile computing device to correlate certain motions and/or inputs (represented by corresponding data) to one or more input device actions, such as a left/right click, double left/right click, drag, swipe, combinations thereof, and the like. In this way, the input device instructions may convert motion and/or inputs made with the mobile computing device into actions simulating traditional operations of a computer mouse, potentially resulting in a familiar user experience.

Figure 15:
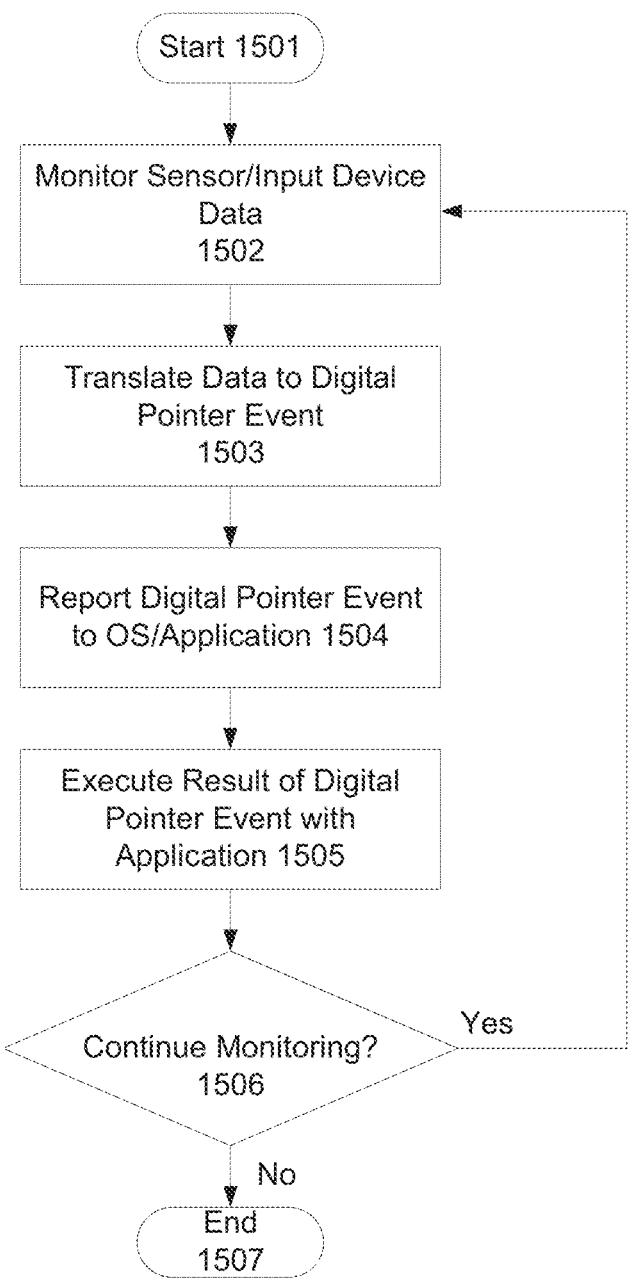
FIG. 15 depicts exemplary operations in response to the execution of input device instructions within an input device module consistent with the present disclosure.

Reference is now made to FIG. 15, which depicts exemplary operations that may be performed or caused by the execution of input device instructions within an input device module consistent with the present disclosure. As shown, the method begins at block 1501. At block 1502, the input device instructions when executed by the mobile computing device may cause the mobile computing device to monitor sensor(s) and/or input devices (e.g., buttons, touch pads, etc.) coupled to the mobile computing device for data that may be correlated to factors relevant to the motion of a digital pointer, as discussed above. At block 1503, the input device instructions may cause the mobile computing device to translate (i.e., convert) the data to a digital pointer event, position (e.g., coordinates on a two dimensional display), a left, right, up, down, and/or diagonal motion, as well as various types of clicks, drags, swipes, etc. At block 1504, the input device instructions when executed may cause the mobile computing device to report the digital pointer event to an application/OS executed on the mobile computing device. This may cause the application/OS to insert an image of the digital pointer within its frame buffer output such that it appears at an appropriate location in the thrown display.

Pursuant to block 1505, the input device instructions when executed may cause an applications/OS to execute the result of a digital pointer event reported pursuant to block 1504. In this regard, the application/OS may be configured to execute the result of digital pointer event reported by input device instructions so as to effect a corresponding action within the application and/or OS.

By way of example, the input device instructions may report input device events to an OS/application that correlate to a motion of the digital pointer. Such reports may be configured to cause the application/OS to insert the digital pointer into its frame buffer at an appropriate location or locations, such that the digital pointer appears to move in the correct manner in the thrown display. If the input device instructions report the occurrence of an input device event such as a double click to an application/OS, such reports may be configured to cause the application/OS to execute operations consistent with that event in view of the contextual location of the digital pointer. For example, when the digital pointer is above an icon shortcut of an operating system that is linked to an application and the input device instructions report a double click event to the OS, the OS may execute a double click operation on the icon shortcut. This may result in the execution of the application linked to the shortcut by the mobile computing device.

The method may then proceed to block 1506, wherein the input device instructions when executed may cause the mobile computing device to make a determination as to whether monitoring of sensor/input device data is to continue. If monitoring is to continue, the method may loop back to block 1502 and repeat. If monitoring is to cease, the method may proceed to block 1507 and end.

Figure 16A:
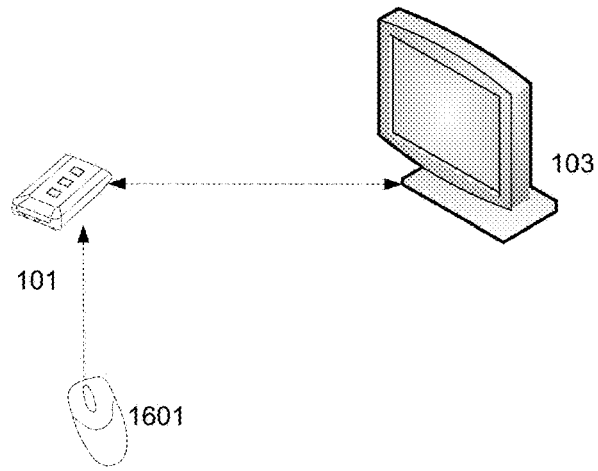
FIGS. 16A and 16B illustrate a method including example operations performed in connection with user interaction with a mobile computing device through an input device coupled to the mobile computing device, consistent with present disclosure.

The mobile computing devices described herein may also be configured to enable user interaction with an operating system and or application via one or more input devices that are wired or wirelessly coupled to the mobile computing device. This concept is illustrated in FIG. 16A, wherein input device 1601 is coupled to mobile computing device 101, which is throwing its display to a non-integral screen 103. As non-limiting examples of suitable input devices, mention is made of wireless and wired computer mice, keyboards, trackpads, touch screens, trackballs, combinations thereof, and the like. Without limitation, the input devices are preferably wirelessly coupled to a mobile computing device, using a wireless communications protocol such as BLUETOOTH®, near field communication, WiFi, radio frequency communication, infrared communication, or a combination thereof. Such communication modes and protocols are well understood in the art, and thus are not described in detail herein.

Figure 16B:
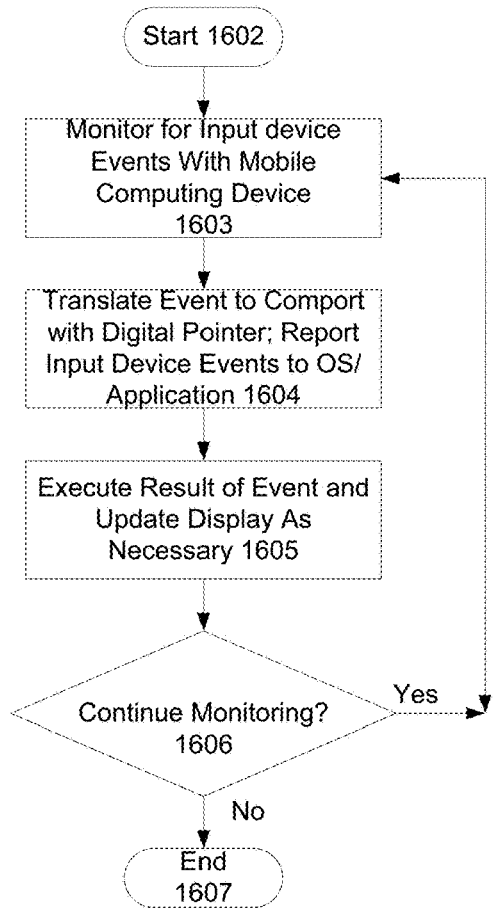

Interaction with an application/OS using an input device may occur in much the same manner as described above in connection with FIG. 15, except that conversion of monitored sensor data may not be required. For example, the mobile computing devices described herein may include an input device module including input device instructions which when executed by a processor cause the mobile computing device to performing input device operations consistent with the present disclosure. In this regard, reference is made to FIG. 16B, which illustrates an exemplary method of interacting with an OS/application using an input device coupled to a mobile computing device consistent with the present disclosure.

As shown, the method begins at block 1602. At block 1603, the input device instructions when executed may cause the mobile computing device to monitor for input device events received from an input device coupled to the mobile computing device. For example, the instructions when executed may cause mobile computing device to monitor for input device elements received from input device 1601 in FIG. 16A. Input device events include but are not limited to motion of the input device, a left/right click, a left/right double click, a touch, a swipe, a drag, combinations thereof, and the like.

The method may then proceed to block 1604, wherein the input device instructions may cause the mobile computing device to report detected input device events to an OS and/or application executed. For example, the input device instructions may cause information related to the input device events to be made available to the OS and/or an application with access to such information. In some embodiments, the input device instructions may cause the mobile computing device to translate detected events to factors that may be relevant to the motion and/or operation of a digital pointer, such as such as cursor location (e.g., pixel coordinates correlating to a two dimensional screen), motion (i.e., change in pixel coordinates), and interaction events such as clicks, drags, etc. The factors obtained from the input device events may then be reported to the OS/application, which may utilize such factors to insert a digital pointer into a relevant frame buffer.

The method may then proceed to block 1605, wherein the input device instructions cause the mobile computing device to execute the result of the input device event. For example, if the input device event is indicative of the motion of a coupled input device, the input device instructions may cause the OS/application to insert a digital pointer at an appropriate location and update its position such that it moves in a manner consistent with the movement of a coupled input device. Similarly, if the input device instructions report the occurrence of an input device event such as a double click to an application/OS, such reports may be configured to cause the application/OS to execute operations consistent with that double click event in view of the contextual location of the digital pointer. For example, the digital pointer is above an icon shortcut of an operating system that is linked to an application and the input device instructions report a double click event to the OS, the OS may execute a double click operation on the icon shortcut.

At block 1606, the input device instructions when executed may cause the mobile computing device to make a determination as to whether monitoring for input device events from a coupled input device is to continue. If monitoring is to continue, the method may loop back to block 1603 and repeat. If monitoring is not to continue, however, the method may proceed to block 1607 and end.

Another aspect of the present disclosure relates to technology for enabling interaction with an operating system and/or application executed on a mobile computing device using one or more input devices coupled to a non-integral screen that is paired with the mobile computing device. As will be described in detail below, the non-integral (e.g., smart/dumb) screen may be configured to monitor for input device events generated by an input device that is wired or wirelessly coupled to the screen. After optionally adjusting the detected events to compensate for differences between the size and resolution of the screen and the expectations of an OS/application executed on mobile computing device (e.g., a reflected by the size/resolution of the thrown display), the screen may report detected input device events to the mobile computing device. Communication of the input device events may occur over a backchannel established between the non-integral screen and the mobile computing device, as described above. The mobile computing device may be configured to receive such reports (e.g., via the backchannel) and make the information contained therein available to an OS/application executed thereon. The OS/application may use such information to execute one or more operations correlating to the detected event.

Figure 17A:
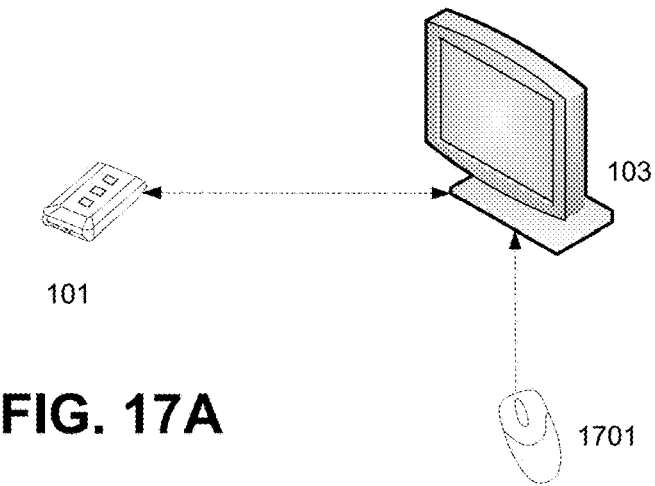
FIGS. 17A and 17B illustrate a method including example operations performed in connection with user interaction with a mobile computing device through an input device coupled to a screen, consistent with present disclosure.

As a non-limiting illustration of this concept, reference is now made to FIG. 17A, wherein mobile computing device 101 is illustrated as paired to a non-integral screen 103. Screen 103 and mobile computing device 101 may be paired in any suitable manner, including any of the previously described pairing protocols. In this instance, mobile computing device 101 and screen 103 are illustrated as being paired such that communication between them is bidirectional. For example, mobile computing device 101 may transmit video information to screen 103 via forward channel (e.g., socket). Screen 103 may receive the video information and render/display it on its display, as described above. Likewise, screen 103 may transmit information to mobile computing device 101 via a backchannel established during the pairing process.

As further shown in FIG. 17A, screen 101 may be wired or wirelessly coupled to input device 1701. Input device 1701 may be any suitable input device, such as those described above. For the sake of illustration and ease of discussion, input device 1701 is illustrated in FIG. 17A as a computer mouse.

To enable a user to interact with an OS and/or application with input device 1701, screen 103 may be configured as a smart or dumb screen that includes a memory with an input device module stored thereon, as well as sufficient processing capability (in the form of a general or application specific processor) to execute computer readable input instructions in the input device module. In addition, screen 103 may have wired/wireless communications capabilities that enable it to send and receive data signals over the communications channels (forward and backchannel) established between it and mobile computing device 101. The input device instructions when executed by a processor may cause screen 103 to perform input device monitoring and reporting operations consistent with the present disclosure. In some embodiments, the input device module may include or be in the form of computer readable code, which may be in JAVA or another computer programming language. Although the present disclosure envisions embodiments wherein a screen is pre-provisioned with an appropriate input device module, such pre-provision is not required. Indeed in some embodiments, the input device module may be transmitted from a mobile computing device to a screen. For example, the input device module may be transmitted from the mobile computing device to the screen during or after they are paired.

Figure 17B:
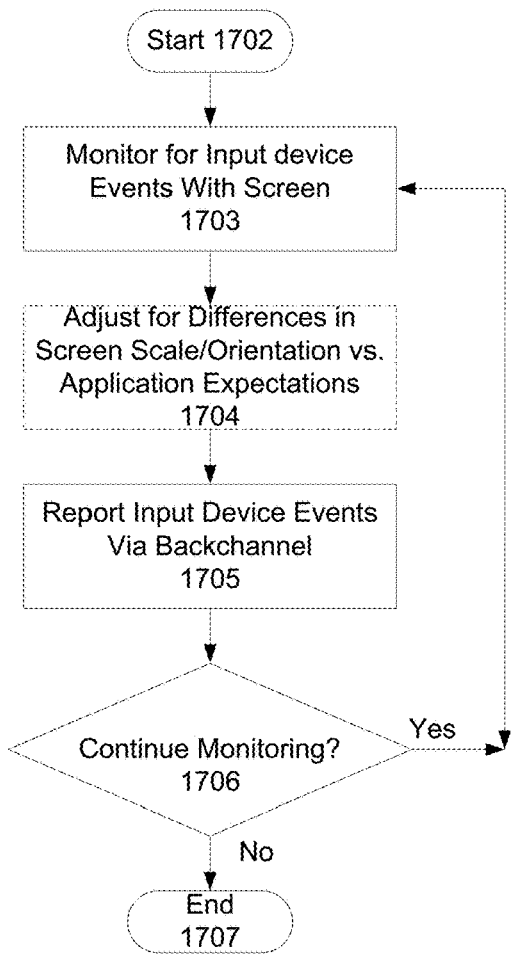

Reference is now made to FIG. 17B, which depicts an exemplary method of detecting and reporting input device events with a non-integral screen. Such method may be considered exemplary of the operations that may be performed or caused by the execution of input device instructions by a processor of a non-integral screen that is paired to a mobile computing device.

As shown, the method begins at block 1702. At block 1703, input device instructions when executed by a processor of a screen may cause the screen to monitor for input device events generated by one or more input devices coupled thereto. The type and nature of the input device events may depend on the type of input device(s) coupled to the screen. For example, where the input device(s) coupled to the screen include a computer mouse, such the input device events may include events generated by motion of the mouse, a left/right click, a double click, a swipe, a drag, combinations thereof, and the like. Alternatively or additionally, if the screen includes a touch screen, the input device events may correlate to a single or multi touch, a swipe, a drag, combinations thereof, and the like. Likewise if the input device is a keyboard, the input device events may correlate to one or more key presses.

Monitoring for input device events by the screen may occur once, at any suitable interval, or continuously. For example, the input device instructions when executed may cause the screen to monitor for device input events at a predetermined interval, such as about once every five seconds, about once every 2.5 seconds, about once every 1 second, about once every 0.5 seconds, about once every 0.1 seconds, etc. Of course, the interval may be longer or shorter, depending on the capabilities of the screen and the need for continuous or periodic updates.

Monitoring of input device events may include determining the location of the event on the screen. In instances where the input device coupled to the screen is a mouse for example, the input device instructions may cause the screen to determine the pixel coordinates of a digital pointer on a display of the screen as the event occurs. If the event is a mouse click for example, the input device instructions may cause the screen to determine the pixel coordinates of a digital pointer on a display of the screen at the time the mouse click was detected. A range of pixel coordinates may be determined for more complex events, such as a click and drag operation, a click, hold and release operation, combinations thereof, and the like. For example, the input device instructions when executed may cause the screen to monitor the pixel coordinates of a digital pointer on a display of the screen corresponding to the initiation of the event (e.g., an initial click and hold) and the pixel coordinates of the digital pointer at the end of the event (e.g., a release).

Similarly where the input device coupled to the screen is a touch screen, the input device instructions when executed may cause the screen to determine the pixel coordinates of one or more touches made on the touch screen. For example, the input device instructions may cause the screen to determine the pixel coordinates on a display of the screen that correlate to a touch event. For relatively simple touch events (such as a single touch), the input instructions may cause the screen to determine the pixel coordinates of the single touch on the display of the screen. For relatively complex touch events (e.g., multi touches, swipes, pinches, drags, etc.), the input device instructions may cause the screen to determine a series of pixel coordinates corresponding to the event). In the case of a swipe for example, the input device instructions may cause the screen to determine the pixel coordinates at the beginning and end of the swipe, and optionally between the beginning and end of the swipe.

In any case, the method may then proceed to optional block 1704, wherein the input device instructions when executed may cause the screen to adjust pixel coordinates associated with an input device event to compensate for differences in the size and/or resolution of a display of the screen and the size and/or resolution of the display that is thrown to the screen from a mobile computing device. In other words, the input device instructions may cause the screen to apply a scalar or other mathematical device to adjust the determined pixel coordinates such that they are consistent with the native resolution of the thrown display from a mobile computing device.

By way of example, a mobile computing device may throw a display having 640 pixels by 480 pixel resolution to a screen. The screen may include a display that is double the resolution of the thrown display, i.e., 1280 pixels by 960 pixels. In some embodiments, the thrown display may be scaled up by the screen to fill the entire area of its display. The screen may then monitor for input device events and record pixel coordinates associated with those events, as described above. Because the resolution of the screen is double that of the native resolution of the thrown display however, the determined pixel coordinates may be double the value of the corresponding pixel coordinates of the thrown display. To compensate for this, the screen may divide the determined pixel coordinates by two, such that they are scaled to the native resolution of the thrown display.

Once the determined pixel coordinates are adjusted or if no adjustment is made, the method may proceed to block 1705. Pursuant to this block, the input device instructions when executed may cause the screen to transmit data signals containing input device information to a mobile computing device via a backchannel. In general, the data signals are configured to report input device events and associated information to the mobile computing device. The mobile computing device may be configured to receive such signals and provide the information contained therein to an OS and/or application executed on the mobile computing device.

In some embodiments, the input device instructions when executed may cause a screen to packetize information relevant to detected input device events, and to transmit those packets to a mobile computing device in a data signal sent over the backchannel. The packets may information relevant to an input device event detected by the screen. For example, the packets included in the data signal may include a header identifying the origin of the signal, i.e., the screen in question. The packets may further include a command identifier. The command identifier may include the identity of the type of input device (e.g., a mouse, touch screen, keyboard, etc.), the nature of the detected input device event (e.g., a click, a touch, a swipe, a key press, etc.), other relevant information, or a combination thereof. The packets may also include a payload portion, the content of which may differ depending on the nature and type of input device event that is being reported.

In instances where a detected input device event was produced by a mouse or touch screen coupled to the screen, the payload portion of the packets may include information relevant to the starting, ending, or other pixel coordinates of a cursor produced by the screen, potentially as adjusted pursuant to block 1704. In instances where the input device event is a key press from a keyboard coupled to the screen, the payload portion of the packet may include the identity of the key that was pressed.

As noted previously, the mobile computing devices described herein may be configured to receive data signals from a screen, such as those described above. In such instances, the mobile computing device may include an input device module having input device module instructions, which when executed by a processor of the mobile computing device cause the mobile computing device to decode packets contained in the received data signal. More specifically, the input device instructions when executed by the mobile computing device may cause the mobile computing device to analyze packets in a received data signal to determine the type of input device event and the location of the event (e.g., the pixel coordinates of the event, potentially as normalized by the screen to the native resolution of the thrown display).

The obtained information may then be provided to an OS and/or application executed on the mobile computing device, as described above. The OS and/or application may treat input device information provided in this manner as normal input device data, i.e., a data that may be traditionally obtained from an input device coupled to the mobile computing device. That is, the OS and/or applications executed on the mobile computing device may apply the input device event information provided by a screen to cause a result that correlates to the detected input device event.

Returning to FIG. 17B, once the screen has transmitted a data signal containing input device events to a mobile computing device, the method may proceed to block 1706. Pursuant to this block, input device instructions when executed by a processor of the screen may cause the screen to make a determination as to whether monitoring of input device events is to continue. If such monitoring is to continue, the method may loop back to block 1703 and repeat. If such monitoring is not to repeat however, the method may proceed to block 1707 and end.

As may be appreciated from the foregoing, input devices integral with and/or coupled to a screen may be used to interact with and/or control resources executed on a mobile computing device paired with the screen. In some embodiments, input devices paired to a screen may be used to input commands, textual inputs, and perform input device operations. Such commands, inputs, and operations may be transferred by the screen to the mobile computing device over an established backchannel, as described above. Upon receipt the mobile computing device may be configured to execute the result of such commands, inputs, and operations. This capability may be leveraged to enable several interesting use cases in which a user may control and/or access resources on a mobile computing device via a non-integral screen paired with the mobile computing device.

As one exemplary use case, a mobile computing device may include a memory having a photo sharing application thereon. The photo sharing application may have access to photos and optionally other media stored on the mobile computing device or otherwise accessible to the mobile computing device (e.g., stored in cloud/internet storage). The photo sharing application may include instructions that when executed a processor of a mobile computing device cause the mobile computing device to output video corresponding to a graphical user interface of the application to a frame buffer. The mobile computing device may be configured (as previously described) to capture the frame buffer and transmit it to a non-integral screen, e.g., over a wired or wireless connection. This may cause the graphical user interface to be displayed on the non-integral screen. An input device coupled to the screen may then be used to interact with the graphical user interface. These interactions may be recorded by the screen as input device events and reported to the mobile computing device via a backchannel. The mobile computing device may make such events available to the photo sharing application, which may apply them to perform an appropriate action. In this way, a user of non-integral screen may control and/or access the photo sharing application using an input device that is coupled to the screen.

As explained previously, the mobile computing devices described herein may be configured to pair with a non-integral screen, and transmit video information the paired screen over a data channel established with the screen during the pairing process. For the sake of clarity and ease of understanding, this concept was described under the assumption that the mobile computing device is to pair with a single non-integral screen. While such embodiments are useful, the technology of the present disclosure may enable a single mobile computing device to pair with multiple non-integral screens at the same time. Pairing with each of the screens may occur using any of the pairing protocols stated above, modified as necessary to permit the mobile computing device to accept multiple connections from different non-integral screens. In this way, the mobile computing device may concurrently pair with a first screen, second screen, and third screen, and throw its video information to those screens for display.

The nature and capabilities of such screens may be the same or different. For example, the first screen may be a television (e.g., a dumb screen), the second screen may be a mobile communications device (e.g. a smart phone display, cell phone display, etc.), and the third screen may be a desktop computer monitor. Alternatively, the first, second and third screens may be the same. For example, the first, second and third screens may each be a desktop computer display. Of course, the number of concurrently paired screens is not limited to three, and may be any suitable number. Likewise, the nature of the types of screens that may be concurrently paired with a mobile computing device is also not limited. Indeed, the mobile computing device may be configured to pair with any suitable type of non-integral screen, such as those previously described.

Figure 18A:
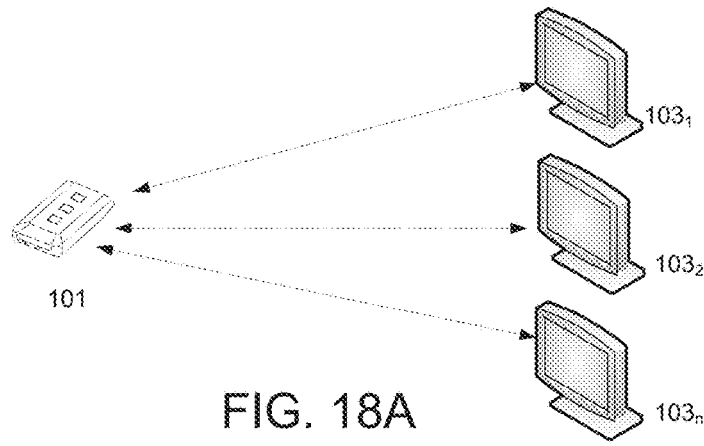
FIGS. 18A and 18B illustrate an example method of concurrently pairing a mobile computing device to multiple screens, consistent with the present disclosure.

In embodiments wherein multiple screens are concurrently paired with a mobile computing device, the mobile computing device may optionally be configured to allocate control over its resources to one or more of the paired screens. With reference to FIG. 18A, mobile computing device 101 may be concurrently paired with three screens, screen $103_1$, $103_2$, and $103_n$. In some embodiments, each of screens $103_1$, $103_2$, $103_n$ may be capable of accessing or otherwise controlling resources on mobile computing device 101, e.g., using one or more input devices. Alternatively or additionally, mobile computing device 101 may limit control and/or access to its resources to a subset (e.g., 1 or more) of screens $103_1$, $103_2$, $103_n$. For example, mobile computing device 101 may permit screen $103_1$ to control and access its resources, but may deny such access and/or control to screens $103_2$, $103_n$.

In this regard, mobile computing device may include a memory having an access control module stored thereon, wherein the access control module includes access instructions that when executed cause the mobile computing device to perform access management operations consistent with the present disclosure. Consistent with the foregoing discussion, access management operations may include allocating and/or limiting access and/or control over resources within the mobile computing device to one or more paired screens. For example, the access instructions when executed may cause the mobile computing device to transmit or otherwise allocate an access token to all, some or none of the non-integral screens with which it is paired. In some embodiments, allocation of the token to a paired screen may be initiated in response to a gesture or other input made with/through the mobile computing device. For example, the mobile computing device may be configured such that a user may allocate an access token to a particular paired screen by making a gesture towards the screen in question.

The access token may be configured to specify the degree of access that is given to a paired screen. For example, the token may be configured to limit a screen's access to certain system resources of the mobile computing device (e.g., system critical resources, OS settings, etc.), while providing unrestricted access to resources associated with a particular application (e.g., the photo sharing application noted above). The nature and configuration of the access token may differ between screens, thus enabling the mobile computing device to individually control the degree to which concurrently paired screens may access and/or control its resources.

Figure 18B:
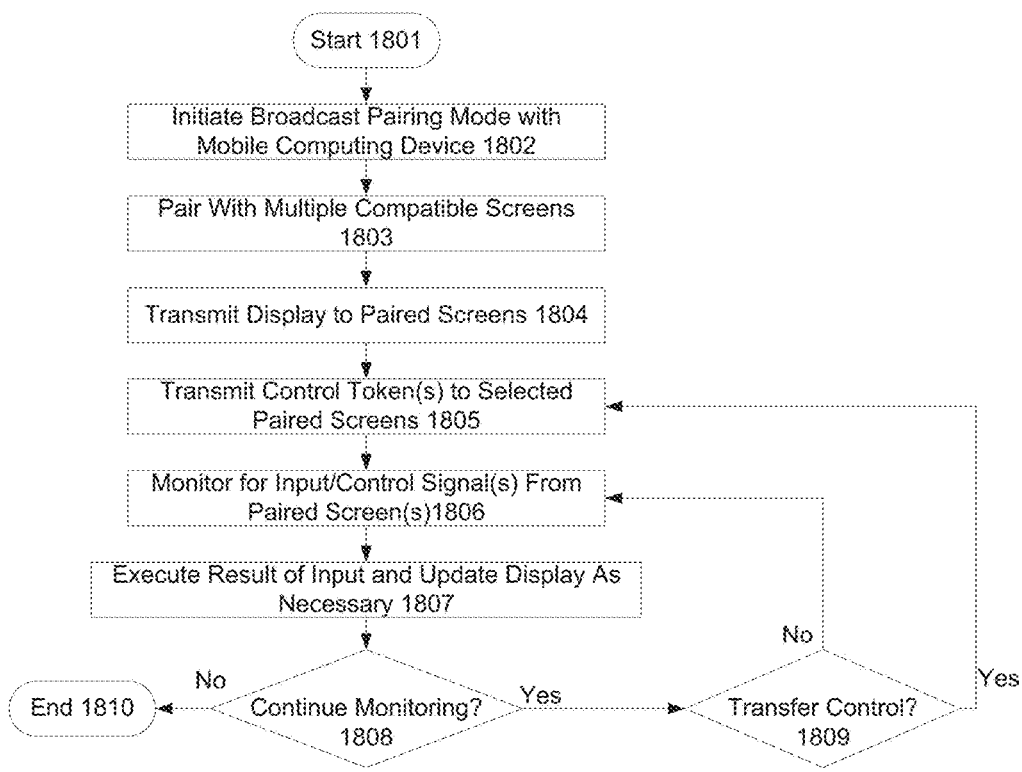

Reference is now made to FIG. 18B, which illustrates a non-limiting method of pairing a mobile computing device with multiple non-integral screens and managing access to and/or control of resources on the mobile computing device with one or more control token(s). As shown, the method begins at block 1801. At block 1802, a mobile computing device may be placed into a broadcast pairing mode. In this mode, the mobile computing device may be available for pairing with multiple non-integral screens. The method may then proceed to block 1803, wherein the mobile computing device is paired with multiple non-integral screens. Pairing of the mobile computing device with each screen may be performed using any suitable pairing method, including the pairing methods described above in connection with FIGS. 5A-7B. Thus for the sake of brevity a detailed description of the process of pairing each screen with the mobile computing device is not reiterated.

Once the mobile computing device is paired with multiple non-integral screens, the method may proceed to block 1804, wherein the mobile computing device may transmit or "throw" its display to the paired screens. Transmission of video to each screen from the mobile computing device may occur using any suitable method, including the methods previously described above in connection with the transmission of a display from a mobile computing device to a single screen. Thus for the sake of brevity the manner in which the mobile computing device transmits a display to each screen pursuant to block 1804 is not described in detail.

The method may then proceed to block 1805, wherein the mobile computing device may transmit control token(s) to all, some, or none of the paired screens. As noted previously, the control token(s) may be configured to limit or otherwise specify the degree of access and/or control the paired screens have to resources within the mobile computing device. For example, the mobile computing device may transmit a control token to a first paired screen, but may not transmit a control token to a second paired screen. In such instance, the first paired screen may access and/or control resources in the mobile computing device, to the extent specified by the control token. Because the second paired screen lacks a control token, it may be denied access to and/or control of resources on the mobile computing device. As may be appreciated, this may enable a user of the first paired screen to control applications and other resources on the mobile computing device and hence, control the content of the video that is thrown to the second (and first) screens from the mobile computing device.

Once the mobile computing device has transmitted one or more control tokens, the method may proceed to block 1806, wherein the mobile computing device monitors for the receipt of input/control signals from paired screens that have a control token. In some embodiments, the input/control signals may be in the form of data signals containing input device event reports from a paired screen, such as described above. Of course, the input/control signals need not correlate to data signals containing input device event reports, and may be configured in any suitable manner. For example, the input/control signals may include one or more commands dictating the execution of specified operations on the mobile computing device.

The method may then proceed to block 1807, wherein mobile computing device may execute the result of the input/control signals within an appropriate application and/or OS executed on the mobile computing device. For example, if an input/control signal dictates the opening of an application, the mobile computing device may open the application, provided the screen that issued the input/control signal has been granted sufficient access to/control over relevant resources on the mobile computing device.

At block 1808, the mobile computing device may be configured to make a determination as to whether monitoring for input/control signals from one or more paired screens is to continue. If such monitoring is to continue, the method may proceed to block 1809, wherein a determination is made as to whether the mobile computing device will transfer or alter control over its resources with respect to one or more paired screens. If not, the method may proceed to block 1806 and repeat. If a transfer/modification of control is to occur, however, the method may proceed back to block 1805, wherein previous control tokens may be revoked, and one or more (potentially updated) control tokens may be transferred all, some, or none of the paired screens. Returning to block 1808, if monitoring for input/control signals is not to continue, the method may proceed to block 1810 and end.

Figure 19A:
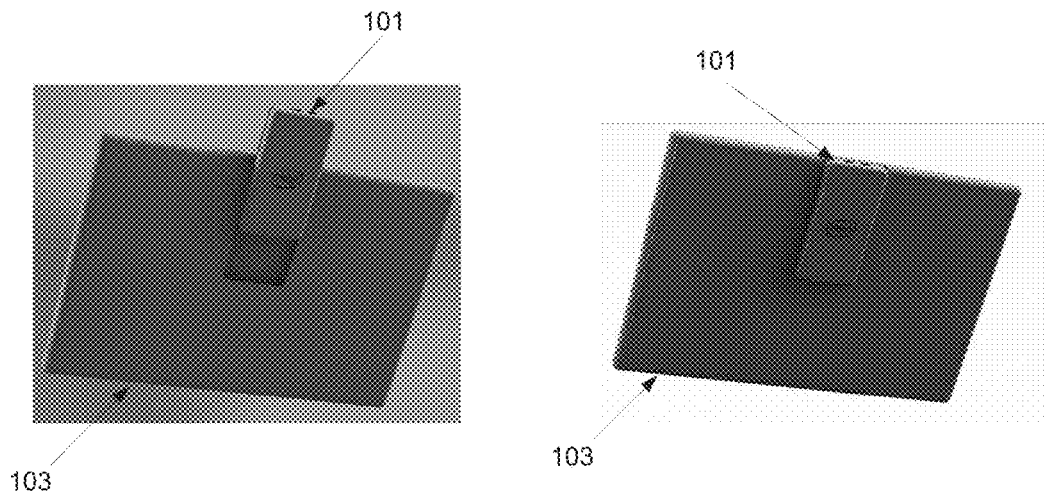
FIGS. 19A and 19B depict example use cases wherein a mobile computing device is docked with a screen, consistent with the present disclosure.
Figure 19B:
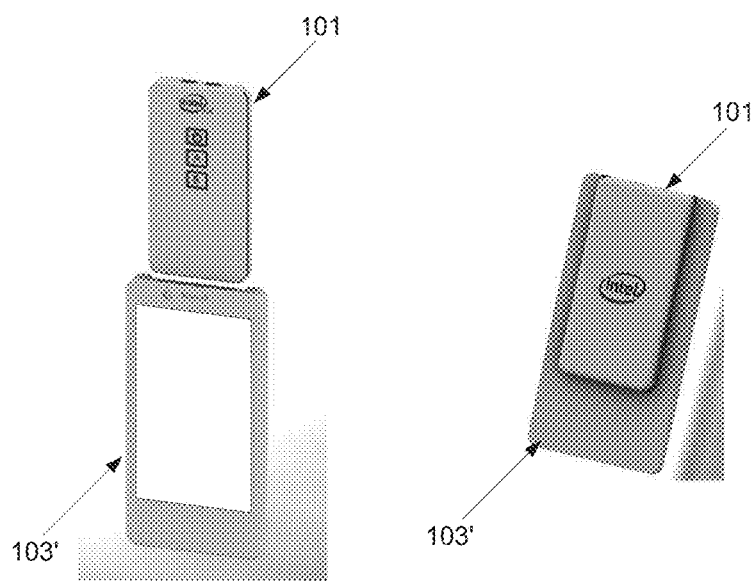

The foregoing description has largely focused on technology in which a mobile computing device may wirelessly pair with one or more non-integral screens, and transmit ("throw") its video output to the paired screen(s) for display. With this in mind, another aspect of the present disclosure relates to technology wherein a mobile computing device may physically and reversible dock with a non-integral screen, so as to form an integrated computing system. This concept is illustrated in FIGS. 19A and 19B, which depict exemplary systems that include a mobile computing device that may be interchangeably docked with different non-integral screens, so as to form an integrated computing system having different capabilities and/or features. In the embodiment of FIG. 19A for example, mobile computing device may include a docking connector that may mate with a corresponding docketing connector of a non-integral screen, such as screen 103. In this case, screen 103 is in the form of a relatively large and flat display, such as may be consistent with a display of a table personal computer. The docking connector of mobile device 101 may allow it to dock with non-integral screens in other form factors as well. As shown in FIG. 19B, mobile computing device 101 may dock with non-integral screen 103', which in this case is in the form of a relatively small screen, such as may be consistent with the screen of a mobile and/or smart phone. Of course, the form factors of screens 103, 103' in FIGS. 19A and B are exemplary only, and screens 103, 103' may have any suitable form factor, including those mentioned described above.

Pairing of the mobile computing device with a docked non-integral screen may occur using any suitable method, including the wireless and wired pairing protocols noted above. Without limitation, the mobile computing device preferably pairs with a docked non-integral screen using a wired pairing protocol.

In some embodiments, non-integral screens that are configured to dock with a mobile computing device may provide one or more additional resources to the mobile computing device upon successful pairing. For example, a docked non-integral screen may include one or more sources of electric power (e.g., batteries), which may be used to supplement the integral power supply of the mobile computing device, potentially lengthening the time the mobile computing device may be used without being recharged. Likewise, a docked non-integral screen may include communications, memory, processing, input devices, other resources, etc. which may be leveraged to enhance or supplement the operation of the mobile computing device. In the case of FIG. 19B for example, screen 103' may include a cellular radio that is not included in mobile computing device 101. In such instances, mobile computing device 101 may take control of the cellular radio when it docks with screen 103'. This may enable mobile computing device 101 to communicate via a cellular network using the cellular radio in screen 103'. The nature and type of additional resources and components in the screen may depend on the form factor of the screen and its intended purpose. For example, where the screen is included in an automobile, it may include or be coupled to GPS, camera, and other sensors which may be controlled by a docked mobile computing device to perform desired functions, such as GPS navigation operations, parking camera operations, driver authentication operations, combinations thereof and the like.

Another aspect of the present disclosure relates to technology for controlling the retention of data by a non-integral screen that may be paired or docked with a mobile computing device. As may be appreciated, a mobile computing device may transmit significant quantities of video and/or other information to a non-integral screen with which it has paired and/or docked. A security concern may therefore arise with respect to the retention of such data and information by the non-integral screen after it ceases to be paired with a mobile computing device. Indeed, all or a portion of the video and other information transmitted to a non-integral screen from a mobile computing device may remain in memory or other resources. Similarly, if a mobile computing device transfers one or more applications to a screen (e.g., to enable pairing or for another purpose), those applications may remain on the non-integral screen after it is no longer paired with a mobile computing device. As a result, such applications and data may be susceptible to acquisition by malware, a hacker, or another unauthorized third party targeting a non-integral screen.

To address this issue, the non-integral screens described herein may be configured to delete information received from a mobile computing device upon the occurrence of a termination event. Non-limiting examples of terminating events include termination of the connection between a mobile computing device and the screen, receipt by the screen of a termination signal, expiration of a specified time period, communications latency that exceeds a predetermined threshold (man in the middle attack, cloning attack), combinations thereof, and the like.

The non-integral screens described herein may also be configured to store or otherwise maintain applications and other information received from a mobile computing device in a protected environment, such as a secure memory enclave, a trusted execution environment, or a combination thereof. The protected environment may further store a temporary storage module including computer readable temporary storage instructions which when executed by a processor cause the screen to delete applications and other information received from a mobile computing device upon the occurrence of a terminating event, e.g., from memory within the secure environment and/or other locations within the non-integral screen.

For example, the non-integral screens described herein may be paired with a mobile computing device, as described above. Once a communications channel is established with the mobile computing device, the screen may monitor the communications channel for receipt of video and other information (e.g., applications) from the mobile computing device. Information received from the mobile computing device may be stored in a memory of the screen, such as a video buffer, a data store, another type of memory, combination thereof, and the like. Such memory may be within a protected environment maintained on the screen, or in another location. In any case, the screen may then display video information and/or execute applications received from the mobile computing device.

Concurrently, a processor of the screen may execute temporary storage instructions in a temporary storage module stored on the display. The temporary storage instructions when executed may cause the screen to monitor for the occurrence of a terminating event, such as those described above. Upon the occurrence of a terminating event, the temporary storage instructions when executed may cause the screen to delete any or all information received from the mobile computing device, including video information, applications, and/or other information.

The screens described herein may store video and other information received from a mobile computing device in encrypted or unencrypted form. In the former case, the screens described herein include an encryption module, which may be stored in a memory. The encryption module may be pre-provisioned on the screen's memory, or it may be pushed to the screen from a mobile computing device, e.g., as part of a pairing protocol. In any case, the encryption module may include computer readable instructions that when executed by a processor of the screen cause the screen to encrypt video data and other information and applications received from a mobile computing device. In some embodiments the encryption instructions when executed may also cause the screen to maintain the encrypted video and other information in an encrypted state until use of such information is needed, e.g., to render/display an image on a display of the screen. When the information is needed, the encryption instructions when executed may cause the screen to decrypt the encrypted information. In some embodiments, the information may remain in a decrypted state for as long as it is necessary to perform an action calling upon such information. Once the action is complete or at another time, the encryption instructions when executed may cause the screen to re-encrypt the information. Alternatively or additionally, temporary storage instructions on the screen when executed may cause the screen to delete decrypted information that is no longer being used by the screen.

As described above, the mobile computing devices of the present disclosure may be configured to transmit their display output to one or more non-integral screens. In addition to this capability, the mobile computing devices in some embodiments may also be configured to include advanced network connectivity. For example, the mobile computing devices described herein may be configured such that may communicate using one or more forms of short range communication, one or more forms of long range communication, combinations thereof, and the like. In this regard, reference is again made to FIG. 2, wherein WCOMMS is illustrated as including hardware and/or software that is capable of communicating via WiFi, NFC, RFID, BLUETOOTH®, a cellular network, a TV white space network, or a combination thereof. Of course, these forms of communication are exemplary only, and WCOMMS 204 need not include the illustrated combination of communication forms. Indeed, WCOMMS 204 may be configured to enable mobile computing device 101 to communicate with any desired communication mode or combination of communications modes.

In some embodiments, the mobile computing devices described herein may be capable of communicating with a wide area network (e.g., the internet) using one or a combination of different communications modes, such as those described above and illustrated in FIG. 2. In instances where a mobile computing device is within communications range of an access point a wide area network, it may communicate directly with the access point using an appropriate mode of communication. If an access point to a wide area network is not within communication range however, the mobile computing devices described herein may be configured to communicate with other devices within range in an attempt to establish communication with the wide area network. In other words, the mobile computing devices described herein may attempt to establish and/or support a mesh network that enables a mobile computing device to transmit and receive data signals to a wide area network through one or more intervening devices.

For example, a first mobile computing device may be capable of WiFi communication and communication via NFC, which the first mobile computing device may use in an attempt to communicate with a wide area network such as the internet. If an access point to the wide area network is not within communication range however, the first mobile computing device may be configured to communicate with other devices within range, and which may be leveraged by the first mobile computing device to establish a communications pathway to the wide area network. For example, the first mobile computing device may transmit data signals to a second mobile computing device that is within communications range. The second mobile computing device may be substantially the same as the first mobile computing device, or it may be different. In any case, the second mobile computing device may be configured to relay data signals received from other mobile computing devices, e.g., to a wide area network (if the network is within communication range of the second computing device), or to other mobile computing devices within range. This process may continue until the data signal sent from the first mobile computing device reaches an access point to the wide area network. Data signals from the wide area network may be similarly relayed to the first mobile computing device, e.g., if the first mobile computing device remains out of communication range of an access point of the wide area network.

Figure 20:
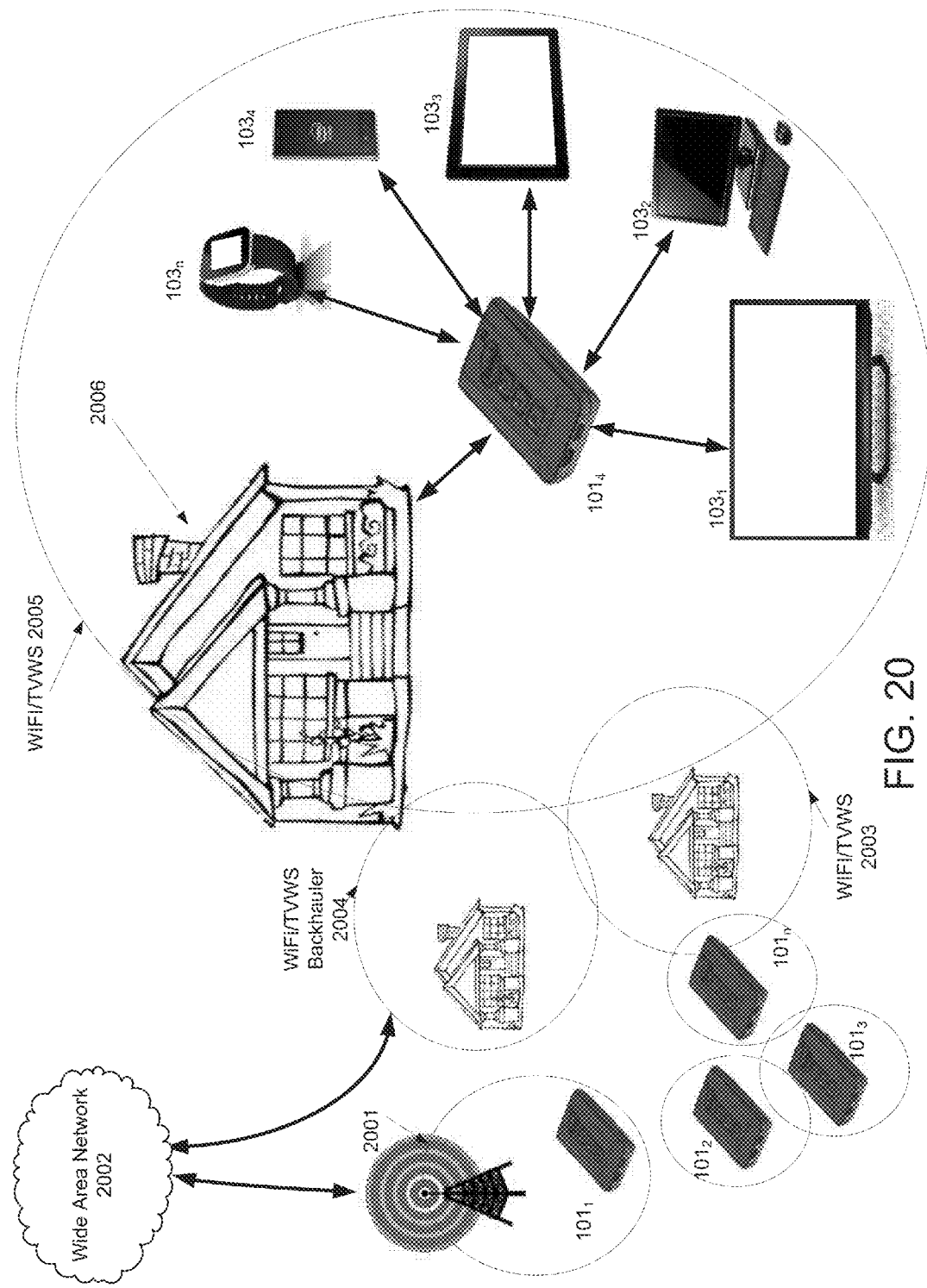
FIG. 20 depicts an example mesh network including one or more mobile computing devices consistent with the present disclosure.

The foregoing concepts are generally illustrated in FIG. 20, which depicts an exemplary mesh network including one or more mobile computing devices consistent with the present disclosure. As shown, FIG. 20 includes mobile computing device $101_1$. In the illustrated embodiment, mobile computing device $101_1$ wireless communications circuitry that is capable of utilizing a long range communications network such as cellular network to communicate with wide area network 2002 (e.g., the internet).

As further shown, the illustrate mesh network includes mobile computing device $101_2$. In the illustrated embodiment, mobile computing device $101_2$ is not capable of communicating with cellular network 2001, either because it is out of range, lacks cellular network connectivity, or is has been configured to limit or avoid cellular network use (as will be described below). However, mobile computing device $102_2$ may leverage other communication modes to communicate with wide area network 2002. For example, mobile computing device $101_2$ may send data signals to mobile computing device $101_3$. Because mobile computing device $101_3$ may not be capable of directly communicating with wide area network 2002 in the illustrated embodiment, it may relay the data signals received from mobile computing device $101_2$ to other devices/networks within range, in this case mobile computing device $101_n$. Mobile computing device $101_n$ may forward the data signals received from mobile computing device $101_3$ to other devices/networks within its communications range, in this case WiFi/television whitespace (TVWS) network 2003. Because the WiFi/TVWS network may also be incapable of directly communicating with wide area network 2002, it may relay the data signals received from mobile computing device $101_2$ to other devices/networks within range, in this case WiFi/TVWS backhauler network 2004. In the illustrated embodiment, TVWS backhauler 2004 may communicate directly with wide area network 2002, and thus may forward the received data signals from WiFi/TVWS network 2003 to wide area network 2002. In this way, device $101_2$ may leverage other devices in a mesh network to transmit and receive data signals to and from wide area network 2002.

The embodiment of FIG. 20 further includes mobile computing device $101_4$, which may be paired with one or more non-integral screens $103_1$-$103_n$, as discussed above. Inputs made through the non-integral screen(s) may be transmitted to mobile computing device $101_4$, e.g., through an established backchannel. These inputs may cause mobile computing device to attempt to communicate with wide area network 2002. In the illustrated embodiment, mobile computing device $101_4$ is incapable of directly communicating with wide area network 2002, either because it is out of communication range, lacks the necessary connectivity, or is otherwise configured to avoid direct communication with the wide area network (for reasons discussed below). Like mobile computing device $101_2$ however, mobile computing device $101_4$ may use mesh networking to communicate with wide area network 2002. In this case mobile computing device may relay data signals though WiFi/TVWS network 2005 of home 2006 to WiFi/TVWS backhauler 2004, and ultimately to wide area network 2002. Likewise, mobile computing device $101_4$ may be configured to receive data signals from wide area network 2002 that are routed through the same or other elements of the mesh network.

One challenge with mesh networks is quality of service. That is, it may be difficult to keep user cost low while maintaining reliable connectivity and bandwidth (i.e., quality of service) over a mesh network. One aspect of the present disclosure relates to systems and methods for incentivizing mesh network use. One feature of such systems and methods is the use of network management module which may be resident on each device within a mesh network. The network management module may include network management (NM) instructions which when executed by a device in a mesh network cause the device to monitor the amount of data relayed by the device through the mesh network. The NM instructions when executed may also correlate the relative amount of data to a reward, such as bandwidth credits, currency, or another incentive for providing network bandwidth to other users of the mesh network. Such reward may be leveraged by a user to purchase connectivity, bandwidth reservations for quality of service needs, or another good or service.

As the number of available communication options/channels increases, it may become increasingly important for people to actively manage their needs against the expense, capabilities, and cost of those various forms of communication. For example, communication over a cellular network can be expensive, particularly if a user has exceeded an allotted minute and/or data pool. In such instances, it may be desirable for the user to use less expensive (though potentially less capable) forms of communication over more expensive (though potentially more capable) forms of communication. For example, a user may find it desirable to preferentially use mesh networking, WiFi, and/or other relatively inexpensive forms of communication for certain actions, instead of relatively expensive forms of communication such as communication over a cellular network.

With the foregoing in mind, another aspect of the present disclosure relates to technology for managing the form of communication employed by a mobile computing device, including those described herein and other mobile devices such as cell phones, smart phones, tablet PCs, combinations thereof, and the like. As described previously, such devices may be equipped with wireless communications interfaces that enable various forms of communication, including but not limited to WiFi, NFC, Cellular, television whitespace, combinations thereof, and the like. As will be described below, the mobile computing devices described herein may be configured to manage the form of communication utilized to communicate a data signal so as to achieve a desired goal. For example, the mobile computing devices may be configured to manage communication forms so as to limit the cost of communicating a data signal and/or to facilitate reception of the data signal (e.g., in the case of an urgent message or emergency situation).

In this regard, the mobile computing devices described herein may include a communications management module (CMM) stored in a memory thereof. The CMM may include computer readable communications management (CM) instructions which when executed by a processor cause the mobile computing device to perform communications management operations consistent with the present disclosure. For example, the CM instructions when executed may cause the mobile computing device to transmit a data signal using one or more communications modes available to the mobile computing device. Selection of the type of communications modes may be based on various factors, such as the type of communication, its urgency, the user's location, contextual information detected by the mobile computing with one or more sensors, quality of service requirements, combinations thereof, and the like.

For example, in response to a request to send a data signal, the CM instructions when executed may cause the mobile computing device to analyze such factors and assign an urgency level to the data signal. If the factors analyzed by the mobile computing device suggest that the data signal is not urgent (e.g., is below a first urgency threshold), the CM instructions when executed may cause the mobile computing device to transmit the data signal using one or more relatively inexpensive communication modes, such as WiFi, NFC, another form of short range communication, combinations thereof, and the like. If the mobile computing device determines that the urgency of the data signal is somewhat urgent (e.g., exceeds the first urgency threshold), the CM instructions when executed may cause the mobile computing device to send the data signal using one or more communication modes that may be relatively more expensive, such as a TV whitespace network, a pay the byte cellular network, satellite communication, combinations thereof, and the like. If the mobile computing device determines that the urgency of the data signal is very high (e.g., above the second urgency threshold), the CM instructions when executed may cause the mobile computing device to transmit the data signal using all communication modes available to it, regardless of cost.

Similarly, the CM instructions when executed may cause a mobile computing device to monitor bandwidth requirements of an application executed on the mobile computing device and compare such requirements to bandwidth that may be available/obtained with various communications modes available to the mobile computing device. Based on this comparison, the CM instructions when executed may cause the mobile computing device to utilize communication modes that can meet (or are capable of meeting) the bandwidth requirements of the application. In this regard, the mobile computing devices described herein may be configured to maintain quality of a service, e.g., for video and other data streams that may be specified by an application or another entity.

With current electronic mail, information streams, social streams, photos, music, movies etc., individuals may claim large quantities (e.g. gigabytes or even terabytes) of personal data. In many instances, all or a portion of this data may be maintained in mass storage or other memory that is not maintained on an individual's mobile devices. For example, an individual may store many gigabytes of photographs, applications, etc. on systems other than their mobile devices. To enable access to such information on a mobile device, services such as Box, Dropbox, iCloud and the like have been developed, and generally operate to provide central aggregation of data files "in the cloud." While these existing services are useful, the user experience they provide may be limited. For example, many existing services ignore or segregate certain digital data types, or force a user to select which data should be cached on the portable device. As a result, user intervention may be required to ensure that desired data is stored on a desired mobile device. This can be inconvenient, particularly if a user does have ready access to the mechanisms for controlling data distribution.

In some embodiments, the mobile computing devices of the present disclosure may be configured to intelligently cache certain portions of a user's personal data, files, streams, and other digital content in memory local to the fob, while providing network access to other data stored in a remote location. As will be described below, the mobile computing device may use heuristics (e.g., machine learning) and/or contextual information to determine what information to cache in local memory of a mobile computing device. This may enable to device to intelligently cache data that a user wants on the mobile computing device, while reducing, minimizing, or even eliminating the need for use interaction.

Figure 21:
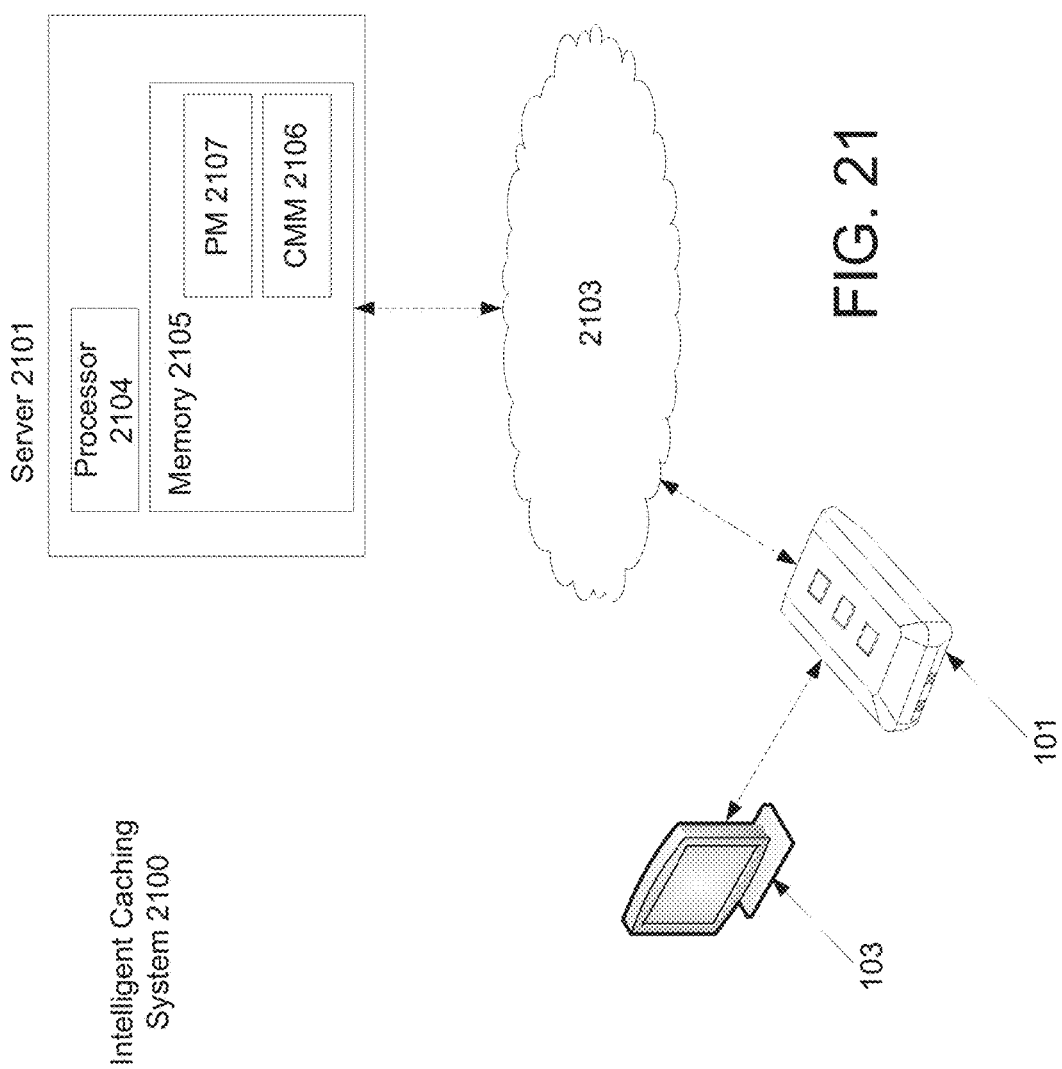
FIG. 21 depicts an example intelligent caching system consistent with the present disclosure.

In this regard, reference is made to FIG. 21, which depicts an exemplary intelligent caching system consistent with the present disclosure. As shown, intelligent caching system 2100 includes mobile computing device 101 and server 2101. For the sake of illustration, mobile computing device 101 is illustrated in FIG. 21 as paired with a non-integral screen, however the intelligent caching operations described herein may be performed without pairing of mobile computing device 101 to screen 103.

Server 2101 may be a remote computing system that is configured to send and receive data transmissions over one or more wired or wireless communications links. In particular, server 2101 may be configured to receive user data, e.g., from mobile computing device 101 or another source, and store such data in a memory thereof, such as memory 2105. In this regard, user data may be transmitted to and from server 2101 over one or more networks such as network 2103, or via another means such as a direct connection with a mobile computing device. This concept is illustrated in FIG. 21, wherein mobile computing device 101 is illustrated as being in bidirectional communication with server 2101 via network 2103.

Network 2103 may be any network that carries data. As examples of suitable networks that may be used as network 2103 in accordance with the present disclosure, non-limiting mention is made of the internet, private networks, virtual private networks (VPN), public switch telephone networks (PSTN), integrated services digital networks (ISDN), digital subscriber link networks (DSL), wireless data networks (e.g., cellular phone networks), combinations thereof, and other networks capable of carrying data. In some non-limiting embodiments, network 102 includes at least one of the internet, at least one wireless network, and at least one cellular telephone network.

Server 2101 may be in the form of a single server machine or a number of server machines, which may be co-located or distributed geographically. As noted previously, server 2101 may operate to receive user data from one or more sources, such as mobile computing device 101.

Server 2101 may store user data in memory 2105, e.g., as one or more files. Memory 2105 may be any suitable type of memory, such as the memory types noted above for the mobile computing devices and screens described herein. In some embodiments, memory 2105 is in the form of magnetic recording memory, non-volatile (flash) memory, or a combination thereof.

Mobile computing device 101 and server 2102 may each include a cache management module (CMM) in the form of one or more computer readable media having cache management instructions (CMI) stored thereon. The CMI when executed by a processor (e.g., processor 2102) may cause the processor to perform intelligent caching operations consistent the present disclosure. The CMM and associate instructions may be stored in a memory that is local or external to server 2101, such as memory 2105. This concept is illustrated in FIG. 21, wherein memory 2105 is illustrated as including CMM 2106. In some embodiments, the CMI when executed by processor 2104 may cause server 2101 to facilitate the distribution (e.g., downloading) of settings information stored on network storage 106 by one or more mobile or other electronic devices. The CMI when executed may cause the server to store user information in memory 2105, e.g., as a user data file. The CMI instructions when executed may also cause server 2101 to associate that file with a user profile (not shown) corresponding to a user of mobile computing device 101. In some embodiments, network server 105 may populate a database with user information uploaded from one or more sources in associated with a specific user profile.

In some embodiments, the CMI instructions when executed may cause server 2101 to transmit or "push" all or a portion of user data stored in memory 2015 in association with a user profile to mobile computing device 101. In some instances, execution of data push operation may depend or be governed by information in the user profile. For example, the user profile may store information regarding a user's data preferences, usage patterns, employments, personal activities, other contextual information, combinations thereof, and the like. The CMI instructions when executed may cause server 2101 to monitor contextual information received from mobile computing device 101 (e.g., from one or more sensors thereof), and use such information (alone or in conjunction with information in the user profile) to determine the type and nature of data stored in memory 2015 to push to mobile computing device 2101.

In this way, server 2101 may intelligently determine which data in memory 2107 to push to mobile computing device 101, e.g., using heuristics, machine learning, or the like. This may also enable server 2101 to serve as a caching agent for a secure digital persona of a user of mobile computing device 101. Specifically, in addition to user personal data, server 2101 may store information regarding user accounts, mobile equipment identifiers, combinations thereof, and the like. As a result, server 2101 may be used to restore a user's data and account information to a new device, in the event that mobile computing device 101 is lost. Likewise, server 2101 may be configured to initiate a remote delete operation. That is, in the event that mobile computing device 101 is lost, server 2101 may be configured to transmit a remote delete signal to the device, e.g., via network 2103. In response to receiving a remote delete signal, mobile computing device 101 may delete user data and optionally other data from its memory.

In recent times, retailers, service providers and other entities have engaged in the aggregation of large quantities of user data (hereinafter, "big data"). Big data may be used by those entities for various purposes, such as to predict consumer purchase patterns, tack buying habits of specific individuals, or even to track the location of specific individuals in time. Much or all of this information may be considered personal private information of a consumer. Control over access to that information may therefore be desired.

Several services have been developed to aid users to prevent third parties from tracking their activities on a computer. As one example, a user may attempt to anonymize his or her activities on the internet by using one or more proxy services. In general, a proxy service requires a user to login to a proxy server portal, which may be operated by the user or a third party. Queries to the internet from the user's computer are routed through the proxy server portal, which routes the query through one or more proxy servers and ultimately to its intended destination. During the course of such routing, the association of the query with the user is lessened or removed, and is replaced with an association with the proxy server. As a result, the party receiving the query may not be able to associate the query with the user that generated it.

Although existing proxy services may effectively anonymize a user, proxy servers are often untrusted by commercial entities such as e-commerce retailers. As a result, communications from a proxy server to commercial websites (e.g., for the purpose of making purchases or otherwise) may be ignored or declined. Existing proxy services may therefore be unable to enable a user to perform desirable activities such as online shopping, which retaining control over their big data.

With the foregoing in mind, another aspect of the present disclosure relates to technology for enabling trusted proxy operations to occur between a mobile computing device, a proxy server, and a service provider. As will be described below, the proxy server may be trusted by both the computing device and the service provider. As a result, the service provider may permit anonymous inquiries routed through the proxy server to reach it, and to act on such inquiries as though they were traditional (i.e., user identifiable) queries.

Figure 22:
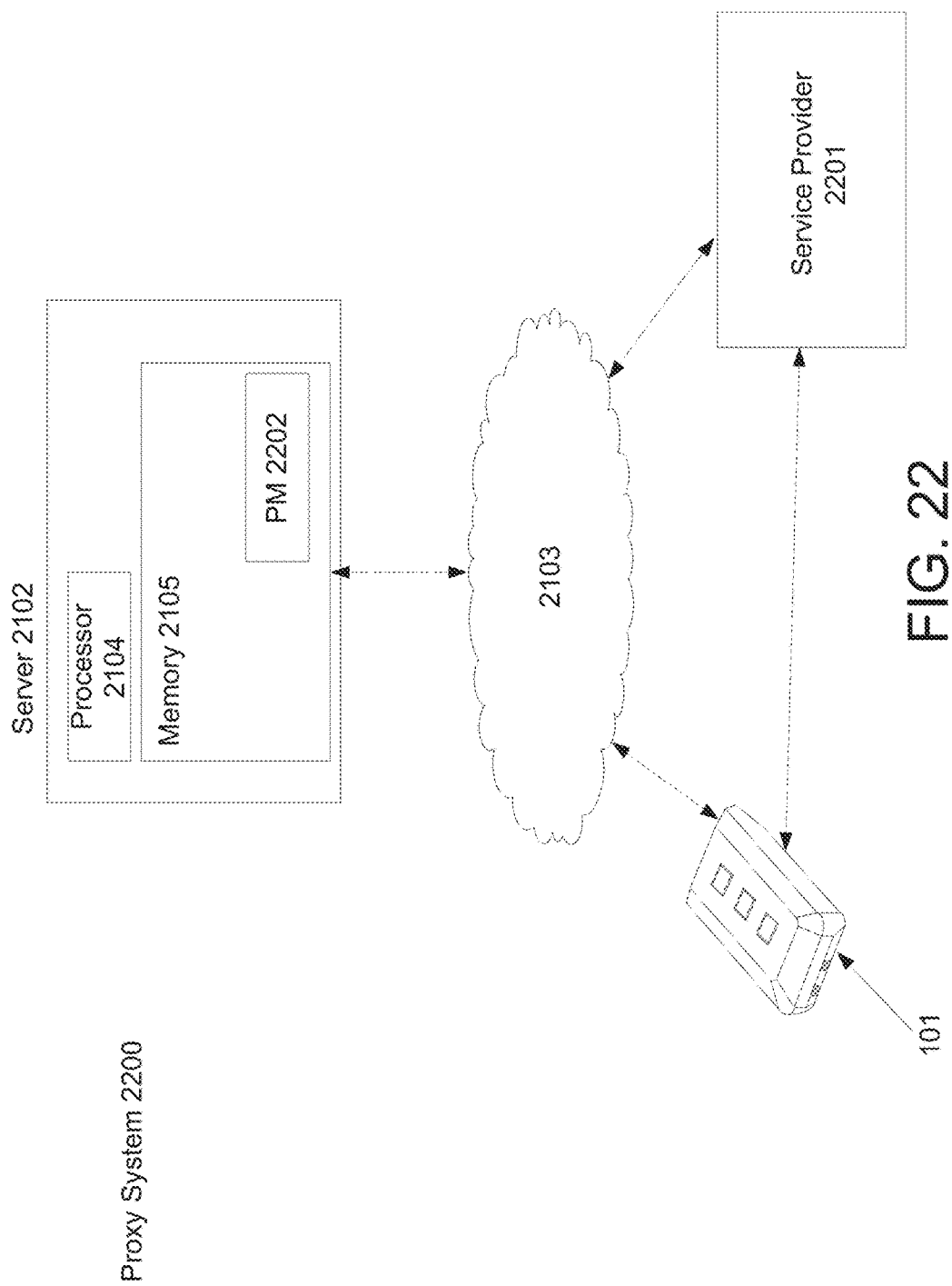
FIG. 22 depicts an example proxy system consistent with the present disclosure.

In this regard, reference is made to FIG. 22, which depicts an exemplary proxy system consistent with the present disclosure. As shown, proxy system 2200 includes mobile computing device 101, server 2102, and service provider 2201. Mobile computing device 101, server 2102 and service provider 2201 may be in direct or indirect communication with one another. For example, these components may uni- or bi-directionally communicate with one another through network 2103, as shown in FIG. 22. Service provider 2201 may be any type of service provider, such as a commercial or non-commercial website, a remote resource, combinations thereof, and the like.

Server 2102 may operate to receive queries targeting resources on service provider 2201 from mobile computing device 101, to anonymize such queries, and to route such queries to service provider 2201. For example, service provider 2201 may be an e-commerce website that offers products for sale through the web. In such instances, mobile computing device 101 may transmit a query targeting service provider 2201 to server 2102. The query may include for example a request to purchase items offered for sale by the service provider. Server 2102 in response to receiving such query may anonymize the query, e.g., by removing identifying indicia (e.g., an IP address of mobile computing device 101) from the query and replacing such indicia with corresponding indicia of server 2102. Server 2102 may then transmit the anonymized query to service provider 2201.

Before, during, or after transmission of the anonymized query, server 2102 may attest its identity to service provider 2201, e.g., using one or more attestation protocols. Non-limiting examples of such protocols include direct autonomous attestation (DAA), enhanced privacy identification (EPID), remote attestation, combinations thereof, and the like. Server 2102 may perform such attestation by transmitting an attestation signal signed by an appropriate private key to service provider 2201. Service provider 2201 may verify the authenticity of the private key using a corresponding public key. If the attestation succeeds, a root of trust may be established between service provider 2201 and server 2102. Once a root of trust is established, service provider 2201 may be configured to trust anonymized transmissions received from server 2102, such as the anonymous query discussed above.

Returning to the purchase example discussed above, upon establishing a root of trust with service provider 2201, server 2102 may transmit the anonymized query from mobile computing device 101 to service provider 2201. Service provider 2201, having established a root of trust with server 2102, may be configured to treat the anonymized query as a traditional query. That is, service provider 2201 may service the query, and route the reply back to server 2102. Server 2102 may then route the reply back to mobile computing device 101. Prior to transmitting the reply back to mobile computing device 101, server 2102 may be configured to perform one or more operations on the reply. For example, server 2102 may analyze the reply for malware, viruses, other malicious code, combinations thereof and the like, prior to transmitting it to mobile computing device 101.

As shown in FIG. 22, server 2102 may include a proxy module (PM) 2202 stored in memory 2105 or in another memory. PM 2202 may include computer readable proxy instructions (PI) that when executed by a processor (e.g., processor 2104) cause server 2102 to perform proxy (and optionally attestation) operations consistent with the present disclosure. Such operations are generally consistent with the operations of server 2102 described above, and thus will not be repeated. Service provider 2201 may similarly include a proxy module that includes computer readable instructions that when executed cause it to accept proxy instructions from proxy servers with which it has established a root of trust.

In some embodiments, mobile computing device 101 may be configured to route communications directed over a network such as network 2103 to server 2102 or another trusted proxy server. For example, mobile computing device 101 may include a database of proxy servers and a proxy browsing module in a memory thereof. The proxy browsing module may include computer readable proxy browsing instructions (PBI) which when executed by a processor cause the mobile computing device to route communications targeting one or more service providers through a trusted proxy server in the database, such as server 2102.

For the sake of discussion, the systems illustrated in FIGS. 21 and 22 have been described in association with a mobile computing device, i.e., mobile computing device 101. It should be understood that the use of mobile computing device 101 in such systems is exemplary only, and that such systems may be executed with any suitable mobile or other electronic device.

Another non-limiting use case for the technologies described herein involves the use of a mobile computing device and screen consistent with the present disclosure in a vehicle, such as a car, train, plane, or other automobile. In this context, a screen consistent with the present disclosure may be integrated with vehicle, and a mobile computing device may be configured to establish a paired connection with the screen, over a wired interface, wireless interface, or a combination thereof, as described above. For example, the mobile computing device may be configured to establish a paired connection with the screen at least in part by docking with a docking connector that is located in the vehicle and which is coupled to the screen. Alternatively or additionally, the mobile computing device may establish a paired connection with the screen wirelessly. In such instances, useful applications such as navigation applications, audio streaming applications, etc., may be executed on the mobile computing device, with their respective media outputs thrown to the screen.

Another non-limiting sued case for the technologies described herein involves the use of a mobile computing device consistent with the present disclosure in a health care context. In such context, a mobile computing device may include a memory storing the user's medical records, or may have access to such records (which may be stored in a remote location). In either case, a user wishing to transfer or grant access to his medical records may, through the mobile computing device, "throw" a display of his medical records and other information to a non-integral screen, such as a doctor's computing device. Due to the sensitivity of the information involved, display of the medical records on the doctor's computing device may be conditioned on establishing a root of trust with the doctor's computing device. In any case, once the display of the medical records is "thrown," the doctor or other user of the non-integral screen may view and/or update the records through the screen. Updates may be saved to a copy of the records that are stored on the mobile computing device or in a remote location (e.g., a remote server). Once the doctor is finished viewing the records, the mobile computing device may transmit a termination signal, causing the non-integral screen (i.e., the doctor's computing device) to delete any copies of the user's medical records stored on the screen.

The mobile computing devices described herein may enable interesting usage cases in other medical contexts as well. For example, mobile computing devices consistent with the present disclosure may be equipped with sensors configured to monitor patient identification, vital signs, pharmaceutical delivery, patient movement, patient visitors, length of doctor visits, etc. and "throw" such information (e.g., in audio and/or visual form) to a non-integral screen.

Another non-limiting use case for the technologies described herein involves the use of a mobile computing device consistent with the present disclosure in the financial services context. In this context, a mobile computing device may be used as a computing platform for financial transactions. For example, the mobile computing devices described herein may be issued to bank customers for use in financial transactions. Banking applications executed on the mobile computing device may be stored in one or more protected environments, and may be executed in a malware resistant manner, such as in a virtual machine executed on the mobile computing device. The media output from those applications (audio, video, etc.) may be thrown by the mobile computing device to a non-integral screen (e.g., an automated teller machine), allowing users to interact with them, e.g., to perform financial transactions. When a user is finished with the application/transaction, the mobile computing device may transmit a termination signal to the screen, causing the screen to delete information that may have been stored thereon in connection with the application and/or user inputs. This can enable highly secure financial transactions, wherein no trace of a user's financial records or activity may be left on a screen.

Another non-limiting use case for the technologies described herein involves the use of a mobile computing device to manage access to one or more services and/or shared resources. This use case may be of particular interest where large numbers of individuals may wish to have access to a limited resource at the same time, such as a restroom, restaurant, vendor, and the like. In this context, the mobile computing devices described herein may be used to remotely register for a service or shared resource. Registration may be triggered by the mobile computing device in response to a gesture, an output of an input device, sensor data, etc. Registration may involve transmitting a signal to a third party system (e.g., a server) that manages a queue for the service/shared resource. The mobile computing device may then alert a user when it is his or her turn to use the service/resource, e.g., in response to one or more signals from the third party system. Similarly, the mobile computing device may be used to direct a user to the location of the service/share resource.

Another non-limiting use case for the technologies described herein involves the use of a mobile computing device in public or mass transit, such as on a bus, a train, a shuttle, and the like. In such instances, a mobile computing device consistent with the present disclosure may be aware of one or more of a user's location, destination, and itinerary. With the in mind, the mobile computing device may, in response to an input (e.g., a gesture, sensor input, etc.) track the user's location relative to the destination. Upon detecting that the user has arrived at the destination, the mobile computing device may alert the user. By way of example, the mobile computing device may alert the user by throwing video information containing an alert to a non-integral screen, such as eyewear of the user, a watch worn by the user, or another non-integral screen.

Another non-limiting use case for the technologies described herein involves the use of a mobile computing device with a kiosk. In such instances, the kiosk may be a non-integral screen with which the mobile computing device may pair. This may be particularly useful in instances where a user is on vacation. In such instance, the kiosk may be provided at a location of interest to a user (e.g., a tourist attraction). The mobile computing device in such instance may have a virtual tour application stored thereon. Upon pairing with the kiosk, the mobile computing device may execute the virtual tour application and throw the audio/visual output thereof to the kiosk. As may be appreciated, this may enable a user to receive and interact with a virtual tour of the tourist attraction via the kiosk and the mobile computing device. Similarly when the kiosk is in the airport, the mobile computing device may include an air travel management application. Upon pairing with the kiosk, the mobile computing device may execute the air travel management application and throw the audio/visual output thereof to the kiosk. This may allow a user to obtain air travel services (e.g., boarding pass issuance, gate directions, flight departure reminders, notification of user's estimated arrival time to a gate, etc.) through the kiosk.

Another non-limiting use case for the technologies described herein involves the use of a mobile computing devices described herein in an enterprise context. In many instances employees wish to bring personal computing and other electronic equipment to their workplace, and use such equipment in the performance of their work. This raises security concerns, particularly if an employee is work is of a sensitive or confidential nature, and his equipment is poorly secured against threats such as malware. The mobile computing devices described herein may be capable of addressing all or a portion of this concern by utilizing employee provided equipment as a non-integral screen.

More specifically, the mobile computing device may be configured to establish a paired connection with employee provided equipment (e.g., tables, monitors, etc.), as generally described above. The mobile computing device may then execute enterprise applications and "throw" the audio/visual output thereof (and potentially other data) to the employee's equipment. At some later point in time, the mobile computing device may transmit a termination signal to the employee's equipment, wherein the termination signal is configured to cause the employee's equipment to delete data and other information received from the mobile computing device. Because enterprise applications are executed on the mobile computing device and all or a portion of the information in connection with that execution is deleted from the employee's equipment, security of enterprise resources may be enhanced.

Moreover in the enterprise context, the mobile computing device may be equipped with sensors and other resources that enable employee location and communication services. In this regard, the mobile computing device may be equipped with a global positioning sensor, telephony capability, and/or messaging services, which may be used to locate and/or contact an employee. Similarly, the mobile computing devices may be configured to throw (distribute) data and other information to other employees, e.g., in connection with a meeting, presentation, or the like.

EXAMPLES

The following examples pertain to further embodiments. The following examples of the present disclosure may comprise subject material such as a system, a device, a method, a computer readable storage medium storing instructions that when executed cause a machine to perform acts based on the method, and/or means for performing acts based on the method, as provided below.

Example 1

According to this example there is provided a mobile computing device including a processor and a memory, the memory including at least one module including computer readable instructions which when executed by the processor cause the mobile computing device to perform the following operations including: establish a paired connection with at least one target screen via at least one of a wired and wireless communication interface, wherein the target screen is a screen that is not integral to the mobile computing device; transmit at least video information generated by at least one of an application executing on the mobile computing device and an operating system (OS) executing on the mobile computing device to the target screen over at least the paired connection; wherein the mobile computing device lacks an integral display.

Example 2

This example includes any or all of the features of example 1 wherein the target screen is at least one of a dumb screen and a smart screen.

Example 3

This example includes any or all of the features of example 1, wherein the mobile computing device is one of a cellular phone, electronic reader, eyewear, mobile game console, netbook computer, notebook computer, internet device, personal digital assistant, portable media player, portable media recorder, smart phone, tablet personal computer, ultra-mobile personal computer, and wearable computing device.

Example 4

This example includes any or all of the features of example 1, wherein the mobile computing device is configured to dock with the target screen.

Example 5

This example includes any or all of the features of example 4, wherein the mobile computing device includes at least one docking connector configured to mate with a corresponding connector of the target screen.

Example 6

This example includes any or all of the features of example 1, wherein the mobile computing device includes a wired media interface, wherein the paired connection is established using the wired media interface and the mobile computing device is configured to transmit at least video information to the target screen over the paired connection.

Example 7

This example includes any or all of the features of example 6, wherein the wired media interface includes at least one of high definition multimedia interface, a digital video interface, a universal serial bus interface, and combinations thereof.

Example 8

This example includes any or all of the features of example 1, and further includes at least one sensor.

Example 9

This example includes any or all of the features of example 8, wherein the at least one sensor includes at least one of an optical sensor, location sensor, orientation sensor, tactile sensor, motion sensor, biometric sensor, and combinations thereof.

Example 10

This example includes any or all of the features of example 9, wherein the at least one sensor includes at least two of the optical sensor, location sensor, orientation sensor, tactile sensor, motion sensor, and biometric sensor.

Example 11

This example includes any or all of the features of example 1, and further includes a power source.

Example 12

This example includes any or all of the features of example 11, wherein the power source includes a battery.

Example 13

This example includes any or all of the features of example 12, wherein the battery is rechargeable by at least one of corded AC power, corded DC power, a wireless charging technique, and combinations thereof.

Example 14

This example includes any or all of the features of example 13, wherein the battery is rechargeable by a wireless charging technique, the mobile computing device further including a receiver for receiving electromagnetic radiation and converting that electromagnetic radiation to electric power.

Example 15

This example includes any or all of the features of example 1, and further includes at least one input device.

Example 16

This example includes any or all of the features of example 15, wherein the at least one input device includes at least one of a button, a touch panel, a trackball, a trackpad, a keyboard, a mouse, and a motion sensor.

Example 17

This example includes any or all of the features of example 1, including a wireless communication interface wherein the at least one module comprises an input device module, the input device module including computer readable instructions which when executed by the processor cause the mobile computing device to wirelessly pair with the at least one input device via the wireless communication interface.

Example 18

This example includes any or all of the features of example 1, wherein the mobile computing device includes both a wireless communications interface and a wired communication interface.

Example 19

This example includes any or all of the features of example 1, said at least one module further includes a device pairing module including computer readable pairing instructions which when executed by the processor cause the mobile computing device to establish the paired connection at least by the performance of pairing operations including: causing the processor to determine an identity of the target screen.

Example 20

This example includes any or all of the features of example 19, wherein the pairing instructions when executed by the processor cause the processor to determine the identity of the target screen at least in part by identifying an internet protocol address of the target screen.

Example 21

This example includes any or all of the features of example 20, wherein the pairing operations further include: causing the mobile computing device to transmit a request message to the target screen, the request message configured to cause the target screen to transmit an identifier to the mobile computing device; and causing the mobile computing device to determine the identity of the target screen from at least the identifier.

Example 22

This example includes any or all of the features of example 20, wherein mobile computing device includes a wired communication interface, and the pairing instructions when executed by the processor cause the mobile computing device to determine the identity of the target screen at least in part using the wired communication interface.

Example 23

This example includes any or all of the features of example 20, wherein mobile computing device includes a wireless communication interface capable of at least short range communication, and the pairing instructions when executed by the processor cause the mobile computing device to determine the identity of the target screen at least in part using the short range communication.

Example 24

This example includes any or all of the features of example 23, wherein the short range communication includes at least one of near field communication and bluetooth communication.

Example 25

This example includes any or all of the features of example 21, wherein the target screen stores the identifier in a radio frequency identifier (RFID), the wireless computing device includes at least a RFID communication device, and the pairing instructions when executed by the processor cause the processor to monitor for the receipt of the identifier with the RFID communication device, and to determine the identity of the target screen at least in part from the identifier.

Example 26

This example includes any or all of the features of example 21, wherein the pairing instructions when executed by the processor further cause the processor to perform the following operations including: in response to receiving the identifier, storing the identifier in the memory.

Example 27

This example includes any or all of the features of example 20, wherein the pairing instructions when executed by the processor cause the mobile computing device to determine the identity of the target screen at least in part by: transmitting a request message to a third party system having knowledge of the target screen, the request message configured to cause the third party system to transmit the identity of the target screen to the mobile computing device.

Example 28

This example includes any or all of the features of example 1, wherein the target screen is in proximity to the mobile computing device.

Example 29

This example includes any or all of the features of example 20, wherein the pairing operations further include causing the mobile computing device to exchange a pairing key with the target screen.

Example 30

This example includes any or all of the features of example 29, wherein the pairing key is unique to the mobile computing device.

Example 31

This example includes any or all of the features of example 29, wherein the pairing instructions when executed by the processor further cause mobile computing device to established the paired connection at least in part by establishing a pairing session and a communications channel with the target screen.

Example 32

This example includes any or all of the features of example 31, wherein the communications channel is bidirectional.

Example 33

This example includes any or all of the features of example 31, wherein the communications channel is unidirectional.

Example 34

This example includes any or all of the features of example 31, wherein the pairing instructions when executed by the processor cause the mobile computing device to establish the pairing session and the communications channel using a wireless communications protocol.

Example 35

This example includes any or all of the features of example 34, wherein the wireless communications protocol includes at least one of a transmission control protocol (TCP) and a user datagram protocol (UDP).

Example 36

This example includes any or all of the features of example 33, wherein the pairing operations further include: causing the mobile computing device to establish a communications backchannel with the target screen.

Example 37

This example includes any or all of the features of example 31, wherein the pairing instructions when executed by the processor cause the mobile computing device to establish the communications channel using at least a first socket of the mobile computing device.

Example 38

This example includes any or all of the features of example 37, wherein the first socket is a real time streaming protocol socket.

Example 39

This example includes any or all of the features of example 36, wherein the memory further includes a backchannel module including computer readable backchannel instructions, wherein the backchannel instructions when executed by the processor cause the mobile computing device to establishing the communications backchannel at least in part by negotiating a mutually supported socket with the target screen.

Example 40

This example includes any or all of the features of example 19, wherein the pairing operations further include: causing the mobile computing device to monitor for a terminating event; maintaining the paired connection when the terminating event is not detected; and terminating the paired connection in response to detection of the terminating event.

Example 41

This example includes any or all of the features of example 19, wherein the pairing operations further include causing the processor to place the mobile computing device in a public domain.

Example 42

This example includes any or all of the features of example 19, wherein the pairing operations further include causing the mobile computing device to broadcast a public connection request.

Example 43

This example includes any or all of the features of example 42, wherein the mobile computing device is configured to initiate broadcasting of the public connection request in response to at least one input.

Example 44

This example includes any or all of the features of example 43, wherein the at least one input includes at least one of a button press and a gesture.

Example 45

This example includes any or all of the features of example 42, wherein the pairing operations further include causing the mobile computing device to monitor for the receipt of a connection key from the target screen.

Example 46

This example includes any or all of the features of example 45, wherein the pairing operations further include causing, in response to receiving the connection key, causing the mobile computing device to validate the authenticity of the connection key and terminate the pairing operations if validation of the authenticity of the connection key fails.

Example 47

This example includes any or all of the features of example 19, wherein the mobile computing device includes a wired communication interface, wherein the pairing operations further include causing the mobile computing device to establish the paired connection over the wired communication interface.

Example 48

This example includes any or all of the features of example 19, wherein the mobile computing device includes a wireless communication interface, wherein the pairing operations further include causing the mobile computing device to establish the paired connection over the wireless communication interface.

Example 49

This example includes any or all of the features of example 1, wherein the paired connection is a peer to peer connection between the mobile computing device and the target screen.

Example 50

This example includes any or all of the features of example 1, wherein the video information includes frames of a frame buffer of at least one of the application executing on the mobile computing device and the operating system (OS) executing on the mobile computing device, and the at least one module a framethrower (FT) module including computer readable FT instructions, wherein the FT instructions when executed by the processor cause the mobile computing device to perform the following operations including: capture the frames; encapsulate the frames into packets; and transmit the packets to the target screen over the paired connection.

Example 51

This example includes any or all of the features of example 50, wherein the FT instructions when executed by the processor further cause the mobile computing device to compress the frames prior to encapsulating the frames into the packets.

Example 52

This example includes any or all of the features of example 51, wherein the FT instructions when executed by the processor further cause the mobile computing device to compress the frames using at least one of inter frame compression, infra frame compression, color space compression, and data reduction.

Example 53

This example includes any or all of the features of example 51, further including a hardware compression engine configured to compress the frames.

Example 54

This example includes any or all of the features of example 50, wherein the FT instructions when executed by the processor further cause the mobile computing device to: monitor for a termination event; continue transmitting the packets to the target screen if the termination event is not detected; and terminate transmission of the packets to the target screen in response to detection of the termination event.

Example 55

This example includes any or all of the features of example 51, wherein the FT instructions when executed by the processor further cause the mobile computing device to: monitor at least one monitored performance metric; and dynamically adjust at least one of a level and type of compression applied to the frames at least in part on the at least one monitored performance metric.

Example 56

This example includes any or all of the features of example 55, wherein the at least one monitored performance metric includes at least one of processor performance, processor load, performance of the target screen, bandwidth consumption of the paired connection, power consumption of the mobile computing device, power consumption of the target screen, and battery level of the mobile computing device.

Example 57

This example includes any or all of the features of example 55, wherein the FT instructions when executed by the processor further cause the mobile computing device to: annotate each packet of the packets with information specifying at least one of the type and level of compression applied to the frames.

Example 58

This example includes any or all of the features of example 55, wherein the FT instructions when executed by the processor further cause the mobile computing device to: compare the monitored performance metric against a predetermined performance threshold; dynamically adjust or maintain the at least one of a level and type of compression applied to the frames based at least in part on whether the monitored performance metric meets or exceeds the predetermined performance threshold.

Example 59

This example includes any or all of the features of example 55, wherein the monitored performance metric includes the bandwidth usage of the paired connection and a load imposed on the processor of the mobile computing device, and the FM instructions when executed by the processor further cause the mobile computing device to: dynamically adjust at least one of the type and level of compression applied to the frames to achieve a desired balance between the load imposed on the processor of the mobile computing device and the bandwidth usage of the paired connection.

Example 60

This example includes any or all of the features of example 1, wherein the video information includes frames of a frame buffer of the at least one of the application executing on the mobile computing device and the operating system (OS) executing on the mobile computing device, and the at least one module includes a streamthrower (ST) module including computer readable ST instructions which when executed by the processor cause the mobile computing device to perform the following operations including: capture the frames; convert the frames into video; and transmit a signal containing the video to the target screen over the paired connection consistent with a predetermined video transmission protocol.

Example 61

This example includes any or all of the features of example 60, wherein the ST instructions when executed by the processor further cause the mobile computing device to convert the frames to video using a predetermined video conversion protocol.

Example 62

This example includes any or all of the features of example 60, wherein the predetermined video transmission protocol is a video streaming protocol.

Example 63

This example includes any or all of the features of example 62, wherein the video streaming protocol is a real time streaming protocol (RTSP).

Example 64

This example includes any or all of the features of example 60, wherein the ST instructions when executed by the processor further cause the mobile computing device to compress the video prior to transmitting the signal to the target screen.

Example 65

This example includes any or all of the features of example 64, further including a hardware compression engine configured to compress the video.

Example 66

This example includes any or all of the features of example 60, wherein the ST instructions when executed by the processor further cause the mobile computing device to: monitor for a termination event; continue transmitting the signal containing the video to the target screen if the termination event is not detected; and terminate transmission of the signal containing the video to the target screen in response to detection of the termination event.

Example 67

This example includes any or all of the features of example 1, wherein the at least one module includes a multichannel video transmission (MVT) module including computer readable multichannel (MC) instructions which when executed by the processor cause the mobile computing device to perform the following operations including: monitor a display performance characteristic of the target screen; compare the display performance characteristic against a predetermined performance threshold to determine whether performance of the target screen is satisfactory; when the performance of the target screen is satisfactory, continue transmitting the video information to the target screen without modification; when the performance of the target screen is unsatisfactory, establish a supplementary connection with the target screen using an additional transmission mode, the additional transmission mode being other than a first transmission mode upon which the paired connection is established; and transmit the video information to the target screen using the paired connection and the supplementary connection.

Example 68

This example includes any or all of the features of example 67, wherein the display performance characteristic includes at least one of frames per second of the video information that are displayed by the target screen, a number of frames of the video information that are dropped by the target screen, and a time between frame updates of the target screen.

Example 69

This example includes any or all of the features of example 67, wherein the first transmission mode is a short range communication mode, and the additional transmission mode is a long range communication mode.

Example 70

This example includes any or all of the features of example 67, wherein the first transmission mode includes a wireless connection between the mobile computing device and the target screen, and the additional transmission mode includes a wired connection between the mobile computing device and the target screen.

Example 71

This example includes any or all of the features of example 67, wherein the first transmission mode includes a first type of wireless communication, and the second transmission mode includes a second type of wireless communication that is different from the first type of wireless communication.

Example 72

This example includes any or all of the features of example 1, wherein the video information has a first orientation and the mobile computing device has a second orientation, and the at least one module includes an orientation control (OC) module including computer readable OC instructions which when executed by the processor cause the mobile computing device to manage the first orientation relative to the second orientation.

Example 73

This example includes any or all of the features of example 72, wherein the OC instructions when executed by the processor cause the mobile computing device to manage the first orientation at least in part by causing the operating system to report to the application that the second orientation is fixed.

Example 74

This example includes any or all of the features of example 72, wherein the video information is produced at least in part by the application, and the OC instructions when executed by the processor further cause the application to demand that the video information is consistent with the second orientation.

Example 75

This example includes any or all of the features of example 72, wherein the video information is produced at least in part by the application, and the OC instructions when executed by the processor cause the mobile computing device to manage the first orientation at least in part by: monitoring for changes in one or more expected parameters of the application's display output; and in response to a detection of a change in the one or more expected parameters, transmitting a message conveying the change in one or more expected parameters of the application's expected display output to the target screen.

Example 76

This example includes any or all of the features of example 75, wherein the message includes a header defining the change in the one or more expected parameters of the application's display output.

Example 77

This example includes any or all of the features of example 76, wherein the message further includes a body portion defining a newly expected value for the one or more expected parameters.

Example 78

This example includes any or all of the features of example 75, wherein the one or more expected parameters of the application's display output include at least one of an orientation expected by the application for the display output, a scale expected by the application for the display output, and a resolution expected by the application for the display output.

Example 79

This example includes any or all of the features of example 77, wherein the message is further configured to cause the target screen to terminate an existing window in which the video information is displayed and to open a new window for displaying the video information consistent with the changes in one or more expected parameters of the application's display output.

Example 80

This example includes any or all of the features of example 75, wherein the OC instructions when executed by the processor further cause the mobile computing device to monitor for receipt of an acknowledgement message from the target screen that acknowledges the change in one or more expected parameters.

Example 81

This example includes any or all of the features of example 1, wherein the at least one module includes an offload (OL) module including computer readable OL instructions which when executed by the processor cause the mobile computing device to perform the following operations including: in response to the receipt of encoded information, route the encoded information to the target screen for decoding.

Example 82

This example includes any or all of the features of example 81, wherein the encoded information includes encoded video.

Example 83

This example includes any or all of the features of example 81, wherein the OL instructions when executed by the processor further cause the mobile computing device to process information affiliated with the encoded information to produce a frame buffer output.

Example 84

This example includes any or all of the features of example 83, wherein the memory further includes a framethrower (FT) module stored therein, the FT module including computer readable FT instructions, wherein the FT instructions when executed cause the mobile computing device to perform the following operations including: capture frames of the frame buffer output; encapsulate the frames into packets; and transmit the packets to the target screen.

Example 85

This example includes any or all of the features of example 83, wherein the memory further includes a streamthrower (ST) module stored therein, the ST module including computer readable ST instructions, wherein the ST instructions when executed cause the mobile computing device to perform the following operations including: capture frames of the frame buffer output; convert the frames to video; and transmit the video to the target screen over the paired connection consistent with a predetermined video transmission protocol.

Example 86

This example includes any or all of the features of example 1, and further includes: a first database correlating one or more input device outputs with one or more actions; wherein the at least one module includes a gesture module including computer readable gesture instructions, wherein the gesture instructions when executed by the processor cause the mobile computing device to perform the following operations including: monitor for receipt of an input device output from least one input device so as to determine a detected input device output; compare the detected input device output to input device outputs in the first database; and when the detected input device output matches or correlates to an input device output in the input device database, perform the one or more actions correlating to the input device output in the first database.

Example 87

This example includes any or all of the features of example 86, wherein the at least one input device includes at least one of a mouse, a keyboard, a trackball, a trackpad, and a motion sensor.

Example 88

This example includes any or all of the features of example 86, wherein the gesture instructions when executed by the processor further cause the processor to perform the following operations including: determine whether a predetermined time period has expired when a detected input device output correlating to an input device output in the first database is not detected; continue monitoring for a detected input device output correlating to a input device output in the data base when the predetermined time period has not expired; and terminate monitoring for the detected input device output when the predetermined time period has expired.

Example 89

This example includes any or all of the features of example 86, wherein the first database further includes at least one contextual modifier modifying the at least one action associated with at least one input device output in the first database, and the gesture module instructions when executed by the processor further cause the mobile computing device to: determine whether the at least one contextual modifier is present when a detected input device output matches or correlates to a input device output in the first database; and perform an action consistent with the input device output in the first database and the contextual modifier.

Example 90

This example includes any or all of the features of example 89, wherein the contextual modifier includes at least one of a status of an application executed on the mobile computing device, a magnitude of the detected input device output, an input action reported by the at least one input device, and combinations thereof.

Example 91

This example includes any or all of the features of example 90, wherein the at least one input device includes a button and a motion sensor, the input action includes a press of the button, the contextual modifier including a combination of the input action and an output from the motion sensor.

Example 92

This example includes any or all of the features of example 86, wherein:
the application includes a social media application; the first database correlates a first input device output with initiation of the execution of the social media application and a second input device output with performance of an action within the social media application; the gesture instructions when executed by the processor cause the mobile computing device to execute the social media application when the detected input device output matches or correlates to the first input device output, and to perform the action within the social media application when the detected input device output matches or correlates to the second input device output.

Example 93

This example includes any or all of the features of example 86, and further includes a security database correlating one or more input device outputs with one or more authenticated users of the mobile computing device, wherein the gesture instructions when executed by the processor cause the mobile computing device to perform the following operations including: compare the detected input device output to input device outputs in the security database; and grant access to the mobile computing device when the detected input device output matches or correlates to an input device output in the security database.

Example 94

This example includes any or all of the features of example 93, and further includes a protected environment, wherein the security database is stored in the protected environment.

Example 95

This example includes any or all of the features of example 94, wherein the protected environment includes at least one of a memory enclave and a trusted execution environment.

Example 96

This example includes any or all of the features of example 93, wherein the first database includes the security database.

Example 97

This example includes any or all of the features of example 96, and further includes a protected environment, wherein the first database is stored in the protected environment.

Example 98

This example includes any or all of the features of example 50, wherein: the memory further includes an input device (ID) module stored therein, the ID module including computer readable ID instructions which when executed by the processor cause the mobile computing device to insert a digital pointer into the frame buffer at a position based at least in part on an output of an input device; the video information includes the digital pointer.

Example 99

This example includes any or all of the features of example 98, wherein the ID module instructions when executed by the processor further cause the mobile computing device to perform the following operations including: change the position of the digital pointer at least in part based on a detected change in the output of the input device.

Example 100

This example includes any or all of the features of example 99, wherein the ID module instructions when executed by the processor further cause mobile computing device to perform the following operations including: convert the output of the input device to two-dimensional screen surface coordinates; insert the digital pointer into the frame buffer at a position based at least in part on the two-dimensional screen surface coordinates; and change the position of the digital pointer based at least in part on a detected change in the two-dimensional screen surface coordinates.

Example 101

This example includes any or all of the features of example 98, wherein the at least one input device includes at least one of a mouse, a keyboard, a trackball, a trackpad, and a motion sensor.

Example 102

This example includes any or all of the features of example 98, wherein the ID instructions when executed by the processor further cause the mobile computing device to perform the following operations including: monitor the output of the input device for a detected input device event; and report the detected input device event to at least one of the application and the operating system, so as to cause the application, the operating system, or a combination thereof to execute an action consistent with the detected input device event.

Example 103

This example includes any or all of the features of example 102, wherein the application includes at least one social media application.

Example 104

This example includes any or all of the features of example 102, wherein the detected input device event includes at least one of motion of the at least one input device, a gesture with the at least one input device, a drag with the at least input device, and a press of a button on the at least one input device.

Example 105

This example includes any or all of the features of example 98, wherein the input device is coupled to the mobile computing device via a wired connection, wireless connection or combination thereof.

Example 106

This example includes any or all of the features of example 98, wherein the ID instructions when executed by the processor cause the mobile computing device to: monitor for receipt of the output of the input device from the target screen; and insert a digital pointer into the frame buffer at a position based at least in part on the output of the input device.

Example 107

This example includes any or all of the features of example 106, wherein the paired connection is bidirectional and the ID instructions when executed by the processor further cause the mobile computing device to monitor for receipt of the output of the input device via at least the paired connection.

Example 108

This example includes any or all of the features of example 106, wherein the ID instructions when executed by the processor further cause the mobile computing device to monitor for receipt of the output of the input device via at least a backchannel established between the mobile computing device and the target screen, the backchannel being different than the paired connection.

Example 109

This example includes any or all of the features of example 106, wherein the ID instructions when executed by the processor further cause the mobile computing device to scale pixel coordinates corresponding to the output of the input device to a native resolution of at least one of the operating system and the application.

Example 110

This example includes any or all of the features of example 106, wherein the ID instructions when executed by the processor further cause the mobile computing device to perform the following operations including: monitor for receipt of a data signal from the target screen, the data signal including packets in which the output of the input device is encoded; and in response to receipt of the data signal, decode the packets to obtain the output of the input device.

Example 111

This example includes any or all of the features of example 1, wherein the computer readable instructions of the at least one module when executed by the processor further cause the mobile computing device to: establish an additional paired connection with at least one additional non-integral target screen; and transmit the video information to the target screen and the at least one additional non-integral target screen.

Example 112

This example includes any or all of the features of example 111, wherein the at least one module includes an access control (AC) module including computer readable AC instructions, wherein the AC instructions when executed by the processor cause the mobile computing device to limit a degree to which the target screen and the at least one additional non-integral target screen have access to resources on the mobile computing device, control over the mobile computing device, or a combination thereof.

Example 113

This example includes any or all of the features of example 112, wherein computer readable AC instructions when executed by the processor cause the mobile computing device to limit access to resources on the mobile computing device, control over the mobile computing device, or a combination thereof to one of the target screen and the at least one additional non-integral target screen.

Example 114

This example includes any or all of the features of example 112, wherein the computer readable AC instructions when executed by the processor cause the mobile computing device to transmit an access control token to one or more of the target screen and the at least one additional non-integral target screen, the access control token configured to enable a specified degree of access to resources on the mobile computing device, a specified degree of control over the mobile computing device, or a combination thereof.

Example 115

This example includes any or all of the features of example 114, wherein the at least one module includes a gesture module including computer readable gesture instructions, wherein the gesture instructions when executed cause the mobile computing device to transmit the access control token in response to a gesture made with the mobile computing device.

Example 116

This example includes any or all of the features of example 113, wherein the access control token is configured to control a content of the video information that is transmitted to the target screen and the at least one additional non-integral target screen.

Example 117

This example includes any or all of the features of example 111, wherein the computer readable AC instructions when executed by the processor further cause the mobile computing device to perform the following operations including: monitor for the receipt of a signal from one or more of the target screen and the at least one additional non-integral target screen, the signal specifying the performance of at least one operation; and execute the at least one operation in response to receipt of the signal.

Example 118

This example includes any or all of the features of example 114, wherein the computer readable AC instructions when executed by the processor further cause the mobile computing device to perform the following operations including: issue the access control token to one or more of the target screen and the at least one additional non-integral target screen; monitor for receipt of a signal from one or more of the target screen and the at least one non-integral target screen, the signal specifying at least one operation for execution on the mobile computing device; and in response to receipt of the signal: ignore the operation when the signal is received from a target screen that does not possess the access control token; and execute the operation with the mobile computing device when the signal is received from a target screen that possesses the access control token.

Example 119

This example includes any or all of the features of example 118, wherein the operation involves resources on the mobile computing device, and the computer readable AC instructions when executed by the processor further cause the mobile computing device to perform the following operations including: prior to executing the operation, determining whether a target screen that possesses the access control token has been granted sufficient access or sufficient control over the resources to perform the operation.

Example 120

This example includes any or all of the features of example 114, wherein the computer readable AC instructions when executed by the processor further cause the mobile computing device to perform the following operations including: modify the specified degree of access to resources on the mobile computing device, the specified degree of control over the mobile computing device, or a combination thereof by altering an access control token issued to one or more of the target screen and the at least one additional non-integral target screen, revoking an access control token issued to one or more of the target screen and the at least one additional non-integral target screen, or a combination thereof.

Example 121

This example includes any or all of the features of example 4, wherein the at least one target screen includes a plurality of target screens, and the mobile computing device is configured to interchangeably dock with each of the plurality of target screens.

Example 122

This example includes any or all of the features of example 121, wherein the mobile computing device includes at least one docking connector configured to mate with a corresponding connector of each of the plurality of target screens.

Example 123

This example includes any or all of the features of example 121, wherein the mobile computing device is configured to be receivably engaged within a docking recess of each of the plurality of target screens.

Example 124

This example includes any or all of the features of example 1, wherein at least one application executed by the processor causes the mobile computing device to generate the video information.

Example 125

This example includes any or all of the features of example 1, wherein the target screen includes one or more resources, and wherein the computer readable instructions of the at least one module when executed by the processor cause the mobile computing device to assert control over the resources.

Example 126

This example includes any or all of the features of example 125, wherein the one or more resources include at least one of a supplemental power source, an input device, a sensor, and a cellular radio.

Example 127

This example includes any or all of the features of example 125, wherein the one or more resources include at least one sensor selected from the group consisting of a camera, a global positioning sensor, a biometric scanner.

Example 128

This example includes any or all of the features of example 1, wherein the computer readable instructions of the at least one module when executed by the processor cause the mobile computing device to perform the following operations including: attempt to establish a direct wired or wireless connection to a wide area network; when a direct connection the wide area network cannot be achieved, send a data signal to at one or more elements of a mesh network, the data signal configured to cause the one or more elements to route the data signal to the wide area network, either directly or by routing the data signal through at least one additional element of the wide area network.

Example 129

This example includes any or all of the features of example 128, wherein the elements of a mesh network include at least one of an additional mobile computing device, a target screen, a WiFi network, and a television white space network.

Example 130

This example includes any or all of the features of example 128, wherein the mobile computing device is configured to receive data signals from the wide area network directly or via one or more of the elements of the mesh network.

Example 131

This example includes any or all of the features of example 128, wherein the computer readable instructions of the at least one module when executed by the processor further cause the mobile computing device to establish a communications channel with the at least one element of the mesh network.

Example 132

This example includes any or all of the features of example 128, wherein the at least one module includes a network management (NM) module including computer readable NM instructions, which when executed by the processor cause the mobile computing device to perform the following operations including: monitor at least one of an amount of data sent by the mobile computing device through the mesh network and an amount of data received by the mobile computing device through the mesh network; and correlate the amount of data sent by the mobile computing device through the mesh network, the amount of data received by the mobile computing device, or a combination thereof to a reward.

Example 133

This example includes any or all of the features of example 1, further including a plurality of wireless communications interfaces supporting a plurality of communication modes, wherein said at least one module includes a communication management (CM) module including computer readable CM instructions which when executed by the processor cause the mobile computing device to perform the following operations including: in response to receiving a request to transmit a data signal, cause the mobile computing device to analyze the request and assign an urgency level to the data signal; and select one or more of the communication modes based at least in part on the urgency level.

Example 134

This example includes any or all of the features of example 133, wherein the plurality of communication modes includes a relatively expensive communication mode and a relatively inexpensive communication mode, and the CM instructions when executed by the processor cause the mobile computing device to perform the following operations including: select the relatively expensive communication mode or the relatively inexpensive communication mode for transmission of the data signal based at least in part on a comparison of the urgency level to a predetermined urgency threshold.

Example 135

This example includes any or all of the features of example wherein the CM instructions when executed by the processor cause the mobile computing device to perform the following operations including: select the relatively expensive communication mode for transmission of the data signal when the urgency level meets or exceeds the predetermined urgency threshold; and select the relatively inexpensive communication mode for transmission of the data signal when the urgency level is less than the predetermined urgency threshold.

Example 136

This example includes any or all of the features of example 134, wherein the CM instructions when executed by the processor cause the mobile computing device to perform the following operations including: select the relatively expensive communication mode and the relatively expensive communication mode for transmission of the data signal when the urgency level meets or exceeds the predetermined urgency threshold.

Example 137

This example includes any or all of the features of example 1, further including a plurality of wireless communications interfaces supporting a plurality of communication modes, wherein the at least one module includes a communication management (CM) module including computer readable CM instructions which when executed by the processor cause the mobile computing device to perform the following operations including: in response to a request to send a data signal by an application executed on the mobile computing device, select one or more of the plurality of communication modes for the transmission of the data signal based at least in part on a comparison of bandwidth requirements of the application to bandwidth available to the mobile computing device through one or more of the plurality of communication modes.

Example 138

This example includes any or all of the features of example 137, wherein the CM instructions which when executed by the processor further cause the mobile computing device to perform the following operations including: select one or more of the communication modes for transmission of the data signal based at least in part on the maintenance of a predetermined quality of service.

Example 139

This example includes any or all of the features of example 1, wherein the at least one module includes a cache management (CM) module including computer readable CM instructions which when executed by the processor cause the mobile computing device to perform the following operations including: transmit a data signal to at least one server, the data signal including contextual information and being configured to cause the server to determine at least one of a type and nature of data to push to the mobile computing device in at least one push operation based at least in part on the contextual information.

Example 140

According to this example there is provided a screen including a display, a processor and a memory having a device pairing module stored therein, the device pairing module including computer readable pairing instructions, wherein the pairing instructions when executed by the processor cause the screen to perform the following operations including: transmit an identifier message to a mobile computing device, the identifier message configured to cause the mobile computing device to identify the screen; and establish a paired connection with the mobile computing device via at least one of a wired or wireless communication interface; and in response to receipt of a media signal containing at least video information from the mobile computing device over the paired connection, display the video information on the display.

Example 141

This example includes any or all of the features of example 140, wherein the processor is selected from the group consisting of an application specific integrated circuit, a general purpose processor, and combinations thereof.

Example 142

This example includes any or all of the features of example 140, wherein the pairing instructions when executed further cause the screen to perform the following operations including: monitor for receipt of a pairing request message from the mobile computing device; and in response to the pairing request message, transmit the identifier message to the mobile computing device and establish the paired connection with the mobile computing device.

Example 143

This example includes any or all of the features of example 140, wherein the screen is further configured to receive packets from the mobile computing device over the paired connection, the packets including encoded video information.

Example 144

This example includes any or all of the features of example 140, further including a video decode (VD) module stored in the memory, the VD module including computer readable VD instructions which when executed by the processor cause the screen to perform the following operations including: in response to receipt of the packets, decode the packets to obtain the video information contained therein.

Example 145

This example includes any or all of the features of example 140, further including an input device monitoring (IDM) module stored in the memory, the IDM module including computer readable IDM instructions which when executed by the processor cause the screen to perform the following operations including: in response to receipt of an output signal from an input device, monitor the output signal for an input device event; and in response to detection of an input device event, report the input device event to the mobile computing device via the paired connection.

Example 146

This example includes any or all of the features of example 145, wherein the output signal is received by the screen via a wired connection with the input device, a wireless connection with the input device, or a combination thereof.

Example 147

This example includes any or all of the features of example 145, wherein the input device event includes at least one of a mouse click, a mouse release, a touch input, a swipe operation, and a motion operation.

Example 148

This example includes any or all of the features of example 145, wherein the IDM instructions when executed by the processor further cause the screen to report the input device event to the mobile computing device at least in part by transmitting a reporting signal containing an input device report to the mobile computing device, the input device report identifying the input device event.

Example 149

This example includes any or all of the features of example 148, wherein: the wired interface includes a media interface; the pairing instructions when executed by the processor cause the screen to establish the paired connection with the mobile computing device at least in part using the media interface; and the IDM instructions when executed by the processor cause the screen to transmit the reporting signal at least in part over the paired connection.

Example 150

This example includes any or all of the features of example 148, wherein the input device report includes at least one of pixel coordinates specifying a location of the input device event and pixel coordinates specifying a type of the input device event.

Example 151

This example includes any or all of the features of example 148, wherein the input device report specifies at least one of a location of a location of a mouse pointer during a mouse click operation, a location of a mouse pointer during a mouse click and release operation, a location of a touch on a touch screen, and pixel coordinates of a swipe operation.

Example 152

This example includes any or all of the features of example 148, further including a wireless communication interface and a backchannel (BC) module stored in the memory, the BC module including computer readable BC instructions which when executed by the processor cause the screen to perform the following operations including: establish a wireless backchannel between the wireless communication interface and the mobile computing device; and transmit the reporting signal to the mobile computing device via the wireless backchannel.

Example 153

This example includes any or all of the features of example 140, wherein the screen is selected from the group consisting of a dumb screen and a smart screen.

Example 154

This example includes any or all of the features of example 153, wherein the screen is a dumb screen and is selected from the group consisting of a television, a computer monitor, a display dock, and a projector.

Example 155

This example includes any or all of the features of example 153, wherein the screen is a smart screen and is selected from the group consisting of a laptop computer display, a display coupled to a desktop computer, an electronic reader display, a table personal computer display, a personal data assistant display, a smart phone display, and a cellular phone display.

Example 156

This example includes any or all of the features of example 153, wherein the screen forms part of at least one of an automobile, an airplane, a bicycle, a motorcycle, a snowmobile, a train, a medical device, a heads up display, a control interface, an electronic shopping portal, a kiosk, a restaurant menu, binoculars, eye ware, a food preparation

Example 157

This example includes any or all of the features of example 140, wherein the wired communication interface includes a media interface, the media interface including at least one of a digital video interface (DVI), a high definition multimedia interface (HDMI), and a universal serial bus (interface).

Example 158

This example includes any or all of the features of example 140, wherein the wired communication interface includes a media interface, the media interface including a docking connector configured to couple with a corresponding connector of the mobile computing device.

Example 159

This example includes any or all of the features of example 140, further including a screen body configured to physically couple with the mobile computing device.

Example 160

This example includes any or all of the features of example 159, wherein the wired communication interface includes a media interface, the media interface including at least one docking connector, the at least one docking connector being configured to couple with a corresponding connector of the mobile computing device when the screen body and the mobile computing device are physically coupled.

Example 161

This example includes any or all of the features of example 159, wherein the screen body includes a recess to receivably engage the mobile computing device.

Example 162

This example includes any or all of the features of example 160, wherein the screen body includes a recess to receivably engage the mobile computing device, and the docking connector is located within the recess.

Example 163

This example includes any or all of the features of example 140, further including a wireless communication interface, wherein the pairing instructions when executed by the processor further cause the screen to establish the paired connection at least in part with the wireless communication interface.

Example 164

This example includes any or all of the features of example 163, wherein the wireless communication interface is configured to communicate using short range communication.

Example 165

This example includes any or all of the features of example 164, wherein the wireless communication interface is configured to communicate using near field communication.

Example 166

This example includes any or all of the features of example 164, further including a screen body configured to physically couple with the mobile computing device, such that the wireless communication interface is in proximity to a corresponding wireless communication interface of the mobile computing device.

Example 167

This example includes any or all of the features of example 166, wherein the screen body includes a recess configured to receivably engage the mobile computing device, wherein the wireless computing interface is located within or proximate to the recess.

Example 168

This example includes any or all of the features of example 140, wherein the identifier message includes an internet protocol address of the screen.

Example 169

This example includes any or all of the features of example 140, wherein the pairing instructions which when executed by the processor further cause the screen to perform the following operations including: in response to receiving a pairing key from the mobile computing device, establish the paired connection at least in part using the pairing key.

Example 170

This example includes any or all of the features of example 169, wherein the pairing instructions when executed by the processor further cause the screen to display the pairing key on the display.

Example 171

This example includes any or all of the features of example 169, wherein the pairing instructions when executed by the processor further cause the screen to perform the following operations including: determine whether the pairing key is valid; terminate pairing with the mobile computing device when the pairing key is invalid; and establish the paired connection at least in part by establishing a pairing session and a communications channel with the mobile computing device when the pairing key is valid.

Example 172

This example includes any or all of the features of example 171, wherein the communications channel is bidirectional.

Example 173

This example includes any or all of the features of example 171, wherein the communications channel is unidirectional.

Example 174

This example includes any or all of the features of example 171, wherein the pairing instructions when executed by the processor further cause the screen to establish the paired connection using the wireless communications protocol, when the pairing key is valid.

Example 175

This example includes any or all of the features of example 174, wherein the wireless communications protocol includes at least one of a transmission control protocol (TCP), a universal datagram protocol (UDP), and an internet protocol.

Example 176

This example includes any or all of the features of example 171, further including a backchannel (BC) module stored in the memory, the BC module including computer readable BC instructions which when executed by the processor cause the screen to perform the following operations including: establish a wireless backchannel between the wireless communication interface and the mobile computing device.

Example 177

This example includes any or all of the features of example 176, wherein the BC instructions when executed by the processor further cause the screen to establish the backchannel at least in part by negotiating with the mobile computing device a mutually supported socket for use in the backchannel.

Example 178

This example includes any or all of the features of example 176, wherein the mutually supported socket is a real time streaming protocol (RTSP) socket.

Example 179

This example includes any or all of the features of example 140, wherein the pairing instructions when executed by the processor further cause the screen to perform the following operations including: monitor for receipt of a public pairing request from the mobile computing device, the public pairing request including the pairing request message in response to receipt of the public pairing request, ignore other pairing request messages and public pairing requests for a predetermined period of time.

Example 180

This example includes any or all of the features of example 179, wherein the pairing instructions when executed by the processor further cause the screen to perform the following operations including: in response to receipt of the public pairing request, monitor for receipt of a connection key.

Example 181

This example includes any or all of the features of example 180, wherein the pairing instructions when executed by the processor further cause the screen to perform the following operations including: terminate pairing with the mobile computing device when the connection key is not received within a predetermined time period; and in response to receipt of the connection key within a predetermined time period, transmit the connection key to the mobile computing device.

Example 182

This example includes any or all of the features of example 140, wherein the paired connection is a peer to peer connection between the screen and the mobile computing device.

Example 183

This example includes any or all of the features of example 179, and further includes a connection key stored in the memory, wherein the pairing instructions when executed by the processor further cause the screen to perform the following operations including: in response to receipt of the public pairing request, transmit the connection key to the mobile computing device.

Example 184

This example includes any or all of the features of example 140, wherein the pairing instructions when executed by the processor further cause the screen to perform the following operations including: validate an identity of a user of the mobile computing device prior to establishing the paired connection.

Example 185

This example includes any or all of the features of example 140, wherein the pairing instructions when executed by the processor further cause the screen to perform the following operations including: initiate pairing with the mobile computing device by transmitting a pairing request message to the mobile computing device.

Example 186

This example includes any or all of the features of example 185, further including a sensor and a wireless communication interface, wherein the pairing instructions when executed by the processor further cause the screen to perform the following operations including: monitor an output of at least one of the sensor and the wireless communication interface so as to detect the presence of a compatible mobile computing device; in response to detection of a compatible mobile computing device, initiate pairing with the compatible mobile computing device at least in part by transmitting the pairing request message to the compatible mobile computing device.

Example 187

This example includes any or all of the features of example 185, wherein the pairing request message includes

89 an identifier of the screen, and a description of communication modes supported by the screen.

Example 188

This example includes any or all of the features of example 185, further including a wireless communication interface, wherein the pairing instructions when executed by the processor further cause the screen to transmit the pairing request message using the wireless communication interface and a short range communication protocol.

Example 189

This example includes any or all of the features of example 185, wherein the pairing instructions when executed by the processor further cause the screen to perform the following operations including: prior to establishing the paired connection, establish a first level connection with the mobile computing device; via the first level connection, attempt to establish a root of trust with the mobile computing device; terminate pairing with the mobile computing device when a root of trust is not established within a predetermined time period; and continue to establish the paired connection with the mobile computing device when a root of trust is established within a predetermined time period.

Example 190

This example includes any or all of the features of example 189, wherein the pairing instructions when executed by the processor further cause the screen to perform the following operations including: validate an identity of a user of the mobile computing device prior to establishing the paired connection; terminate pairing with the mobile computing device when the identity of the user is not verified within a predetermined time period; and continue to establish the paired connection with the mobile computing device with the identity of the user is verified within the predetermined time period.

Example 191

This example includes any or all of the features of example 140, wherein the pairing instructions when executed by the processor further cause the screen to perform the following operations including: place the screen into a pairing mode; and transmit a lockdown signal, the lockdown signal configured to cause at least one second screen in proximity to the screen to enter a lockdown state in which the second screen becomes unavailable for pairing with the mobile computing device.

Example 192

This example includes any or all of the features of example 191, wherein the pairing instructions when executed by the processor further cause the screen to place the screen into the pairing mode in response to receipt of a pairing request message from the mobile computing device, an input made to the screen, or a combination thereof.

Example 193

This example includes any or all of the features of example 191, wherein the pairing instructions when

90 executed by the processor further cause the screen to perform the following operations including: transmit a release signal configured to release the at least one second screen from the lockdown state.

Example 194

This example includes any or all of the features of example 140, wherein the pairing instructions when executed by the processor further cause the screen to perform the following operations including: place the screen into a pairing mode; in response to the receipt of multiple pairing request messages from different mobile computing devices within a specified time period, ignore the multiple pairing request messages; in response to the receipt of a single pairing request message from a single mobile computing device within a specified time period, transmit the identifier message to the mobile computing device.

Example 195

This example includes any or all of the features of example 140, wherein: the video information includes packets encapsulating frames of a frame buffer of at least one of an application and an operating system executed on the mobile computing device; and the memory has a video decode (VD) module stored therein, the VD module including computer readable VD instructions which when executed by the processor cause the screen to perform the following operations including: in response to receiving the media signal, process the packets to obtain the frames, and displaying the video information on the display.

Example 196

This example includes any or all of the features of example 195, wherein the frames are compressed, and the VD instructions when executed by the processor cause the screen to perform the following operations including: decompress the frames prior to displaying the video information on the display.

Example 197

This example includes any or all of the features of example 196, wherein the packets include a header identifying at least one of a type and level of compression applied to the frames, and the VD instructions when executed by the processor cause the screen to perform the following operations including: inspect the header to determine at least one of the type and level of compression before decompressing the frames.

Example 198

This example includes any or all of the features of example 195, wherein the frames are encrypted frames, and the VD instructions when executed by the processor cause the screen to perform the following operations including: decrypt the encrypted frames to obtain the frames.

Example 199

This example includes any or all of the features of example 140, wherein: the video information includes a video produced from captured frames of a frame buffer of at least one of an application and an operating system executed on the mobile computing device, the video being encoded in a video format; and the memory has a video decode (VD) module stored therein, the VD module including computer readable VD instructions which when executed by the processor cause the screen to perform the following operations including: in response to receiving the media signal, decode the video and display the video information on the display.

Example 200

This example includes any or all of the features of example 199, wherein the video is compressed, and the VD instructions when executed by the processor cause the screen to perform the following operations including: decompress the video prior to displaying the video information on the display.

Example 201

This example includes any or all of the features of example 199, wherein the screen is configured to receive the media signal in accordance with a real time streaming protocol (RTSP).

Example 202

This example includes any or all of the features of example 199, wherein the video is encrypted video, and the VD instructions when executed by the processor cause the screen to perform the following operations including: decrypt the encrypted video to obtain the video.

Example 203

This example includes any or all of the features of example 140, further including a multichannel video transmission (MC) module stored in the memory, the MC module including computer readable MC instructions which when executed by the processor cause the screen to perform the following operations including: monitor a display performance characteristic of the display of the video information on the screen; and transmit a report to the mobile computing device, wherein the report includes the performance characteristic and is configured to cause the mobile computing device to compare the display performance characteristic against a predetermined performance threshold to determine whether performance of the screen is satisfactory.

Example 204

This example includes any or all of the features of example 203, wherein the MC instructions when executed by the processor further cause the screen to perform the following operations including: when the performance of the screen is unsatisfactory, establish a supplementary connection with the mobile computing device an additional transmission mode, the additional transmission mode being other than a first transmission mode upon which the paired connection is established; and in response to receipt of video information via the paired connection and the supplementary connection, display the video information.

Example 205

This example includes any or all of the features of example 203, wherein the display performance characteristic includes at least one of frames per second of the video information that are displayed by the display, a number of frames of the video information that are dropped by the display, a time between frame updates of the display, and a speed with which video information is received from the mobile computing device.

Example 206

This example includes any or all of the features of example 204, wherein the first transmission mode is a short range communication mode, and the additional transmission mode is a long range communication mode.

Example 207

This example includes any or all of the features of example 205, wherein the first transmission mode includes a wireless connection between the mobile computing device and the screen, and the additional transmission mode includes a wired connection between the mobile computing device and the screen.

Example 208

This example includes any or all of the features of example 205, wherein the first transmission mode includes a first type of wireless communication, and the second transmission mode includes a second type of wireless communication that is different from the first type of wireless communication.

Example 209

This example includes any or all of the features of example 140, further including an orientation control (OC) module stored in the memory, the OC module including computer readable OC instructions which when executed by the processor cause the screen to perform the following operations including: in response to receipt of a message conveying a change in one or more expected parameters of a display output of at least one of an application and an operating system executed on the mobile computing device, change at least one characteristic of at least one of the video information and the display such that the video information is displayed on the display in a manner consistent with the change in the one or more expected parameters of the display output.

Example 210

This example includes any or all of the features of example 209, wherein the message includes a header defining the change in expected parameters of the display output, and the OC instructions when executed by the processor cause the screen to perform the following operations including: inspect the header to determine the change in expected parameters of the display output.

Example 211

This example includes any or all of the features of example 210, wherein the message further includes a body portion defining a newly expected value for the one or more expected parameters, and the OC instructions when executed by the processor cause the screen to perform the following operations including: inspect the body of the message to determine the newly expected value for the one or more expected parameters; and change at least one characteristic of at least one of the video information and the display such that the video information is displayed on the display in a manner consistent with the newly expected value for the one or more expected parameters.

Example 212

This example includes any or all of the features of example 209, wherein the one or more expected parameters of the application's display output include at least one of an orientation expected by the application for the display output, a scale expected by the application for the display output, and a resolution expected by the application for the display output.

Example 213

This example includes any or all of the features of example 209, wherein the OC instructions when executed by the processor cause the screen to perform the following operations including: in response to the message, terminate an existing window in which the video information is displayed and open a new window for displaying the video information consistent with the changes in one or more expected parameters.

Example 214

This example includes any or all of the features of example 213, further including: one or more resources for supplementing a capability of said mobile computing device upon successful establishment of said paired connection; at least one module stored in the memory, the at least one module including computer readable instructions which when executed by the processor cause the screen to perform the following operations including: in response to establishment of the paired connection, permit the mobile computing device to assert control over the one or more resources.

Example 215

This example includes any or all of the features of example 140, further including at least one module stored in the memory, wherein the at least one module includes computer readable instructions which when executed by the processor cause the screen to perform the following operations including: delete at least a portion of the video information and other information received via the paired connection from the memory in response to at least one of: receipt of a termination signal from the mobile computing device; expiration of a predetermined time period; detection of a termination event terminating the paired connection; and detection of communication latency that exceeds a predetermined latency threshold.

Example 216

This example includes any or all of the features of example 140, and further includes a protected environment and at least one module including computer readable instructions stored in the memory, wherein: the screen is configured to store at least one of the video information, applications, and other information received via the paired connection in the protected environment; the computer readable instructions when executed by the processor cause the screen to perform the following operations including: delete at least a portion of the video information and other information received via the paired connection from the protected environment in response to at least one of: receipt of a termination signal from the mobile computing device; expiration of a predetermined time period; detection of a termination event terminating the paired connection; and detection of communication latency that exceeds a predetermined latency threshold.

Example 217

This example includes any or all of the features of example 140, further including an encryption module stored in the memory, the encryption module including computer readable encryption instructions which when executed by the processor cause the screen to perform the following operations including: encrypt the video data to produce encrypted video data; and store the encrypted video data in the memory until the video data is to be displayed on the display; and when the video data is to be displayed on the display, decrypt the encrypted video data and display the video data on the display.

Example 218

This example includes any or all of the features of example 217, wherein the encryption instructions when executed by the processor further cause the screen to perform the following additional operations including: after the video data is displayed on the display, re-encrypt the video data to produce re-encrypted video data, and store the re-encrypted video data in the memory.

Example 219

According to this example there is provided a method, the method including, with a mobile computing device: transmitting a video signal including at least video information generated by at least one of an application executing on the mobile computing device and an operating system executing on the mobile computing device to a target screen over a paired connection between the mobile computing device and the target screen; wherein: the paired connection is established over at least one of a wired and a wireless communication interface; the mobile computing device lacks an integral display; the target screen is not integral to the mobile computing device; and the video signal is configured to cause the target screen to display the video information.

Example 220

This example includes any or all of the features of example 219, wherein the target screen is at least one of a dumb screen and a smart screen.

Example 221

This example includes any or all of the features of example 219, wherein the mobile computing device is one of a cellular phone, electronic reader, eyewear, mobile game console, netbook computer, notebook computer, internet device, personal digital assistant, portable media player, portable media recorder, smart phone, tablet personal computer, ultra-mobile personal computer, and wearable computing device.

Example 222

This example includes any or all of the features of example 219, wherein the paired connection is established at least in part by docking the mobile computing device with the target screen.

Example 223

This example includes any or all of the features of example 222, wherein the mobile computing device includes a first docking connector and the target screen includes a second docking connector, and the docking includes mating the first docking connector with the second docking connector.

Example 224

This example includes any or all of the features of example 223, wherein the second docking connector is within a recess of a screen body, the recess configured to receivably engage the mobile computing device.

Example 225

This example includes any or all of the features of example 219, wherein the mobile computing device includes a wired media interface, and the method further includes establishing the paired connection at least in part with the wired media interface.

Example 226

This example includes any or all of the features of example 219, wherein the video information includes frames of a frame buffer of at least one of the application executing on the mobile computing device and the operating system executing on the mobile computing device, and transmitting the video information includes: capturing the frames with the mobile computing device; encapsulating the frames into packets; and transmitting the video signal, the video signal containing the packets; wherein the video signal is configured to cause the target screen to process the packets and obtain the video information.

Example 227

This example includes any or all of the features of example 226, further including compressing the frames with the mobile computing device, prior to encapsulating the frames in the packets.

Example 228

This example includes any or all of the features of example 226, wherein the mobile computing device includes a hardware compression engine, wherein the encapsulating is performed with the hardware compression engine.

Example 229

This example includes any or all of the features of example, and further includes: in response to detection of a terminating event, terminating the transmission of the video signal with the mobile computing device.

Example 230

This example includes any or all of the features of example 227, and further includes: with the mobile computing device, monitoring at least one monitored performance metric; and dynamically adjusting at least one of a level and a type of compression applied to the frames based at least in part on the at least one monitored performance metric.

Example 231

This example includes any or all of the features of example 230, wherein the at least one monitored performance metric includes at least one of mobile computing device processor performance, mobile computing device processor load, performance of the target screen, bandwidth consumption of the paired connection, power consumption of the mobile computing device, power consumption of the target screen, and battery level of the mobile computing device.

Example 232

This example includes any or all of the features of example 230, and further includes: with the mobile computing device, annotating each packet of the packets with information specifying at least one of the type and level of compression applied to the frames.

Example 233

This example includes any or all of the features of example 230, and further includes, with the mobile computing device: comparing the monitored performance metric against a predetermined performance threshold; dynamically adjusting or maintaining the at least one of a level and type of compression applied to the frame based at least in part on whether the monitored performance metric meets or exceeds the predetermined performance threshold.

Example 234

This example includes any or all of the features of example 230, wherein the monitored performance metric includes the bandwidth usage of the paired connection and a load imposed on a processor of the mobile computing device, and the method further includes, with the mobile computing device: dynamically adjusting at least one of the type and level of compression applied to the frames to achieve a desired balance between the load imposed on the processor of the mobile computing device and the bandwidth usage of the paired connection.

Example 235

This example includes any or all of the features of example 219, wherein the video information includes frames of a frame buffer of at least one of the application executing on the mobile computing device and the operating system executing on the mobile computing device, and transmitting the video information includes: capturing the frames with the mobile computing device; converting the frames into video; and transmitting the video signal consistent with a predetermined video transmission protocol, the video signal containing the video.

Example 236

This example includes any or all of the features of example 235, wherein converting the frames to video is performed by the mobile computing device using a predetermined video conversion protocol.

Example 237

This example includes any or all of the features of example 235, wherein the predetermined video transmission protocol is a video streaming protocol.

Example 238

This example includes any or all of the features of example 237, wherein the video streaming protocol is a real time streaming protocol (RTSP).

Example 239

This example includes any or all of the features of example 235, further including compressing the video with the mobile computing device prior to transmitting the video signal.

Example 240

This example includes any or all of the features of example 239, wherein the mobile computing device includes a hardware compression engine and the method further includes performing the compressing with the hardware compression engine.

Example 241

This example includes any or all of the features of example 235, further including, with the mobile computing device: in response to detection of a terminating event, terminating transmission of the video signal with the mobile computing device.

Example 242

This example includes any or all of the features of example 219, further including, with the computing device: monitoring a display performance characteristic of the target screen; comparing the display performance characteristic against a predetermined performance threshold to determine whether performance of the target screen is satisfactory; when the performance of the target screen is satisfactory, continue transmitting the video signal without modification; when the performance of the target screen is unsatisfactory, establishing a supplementary connection with the target screen using an additional transmission mode, the additional transmission mode being other than a first transmission mode upon which the paired connection is established; and transmitting the video signal to the target screen using the paired connection and the supplementary connection.

Example 243

This example includes any or all of the features of example 242, wherein the display performance characteristic includes at least one of frames per second of the video information that are displayed by the target screen, a number of frames of the video information that are dropped by the target screen, and a time between frame updates of the target screen.

Example 244

This example includes any or all of the features of example 242, wherein the first transmission mode is a short range communication mode, and the additional transmission mode is a long range communication mode.

Example 245

This example includes any or all of the features of example 242, wherein the first transmission mode includes a wireless connection between the mobile computing device and the target screen, and the additional transmission mode includes a wired connection between the mobile computing device and the target screen.

Example 246

This example includes any or all of the features of example 242, wherein the first transmission mode includes a first type of wireless communication, and the second transmission mode includes a second type of wireless communication that is different from the first type of wireless communication.

Example 247

This example includes any or all of the features of example 219, wherein the video information has a first orientation and the mobile computing device has a second orientation, and the method further includes, with the mobile computing device, managing the first orientation relative to the second orientation.

Example 248

This example includes any or all of the features of example 247, wherein the mobile computing device manages the first orientation at least in part by causing the operating system to report to the application that the second orientation is fixed.

Example 249

This example includes any or all of the features of example 247, wherein the mobile computing device manages the first orientation at least in part by causing the application to demand that the video information is consistent with the second orientation.

Example 250

This example includes any or all of the features of example 247, wherein the video information is produced at least in part by the application, and the method further includes, with the mobile computing device: monitoring for changes in one or more expected parameters of the application's display output; and in response to a detection of a change in the one or more expected parameters, transmitting a message conveying the change in one or more expected parameters of the application's expected display output to the target screen.

Example 251

This example includes any or all of the features of example 250, wherein the message includes a header defining the change in the one or more expected parameters of the application's display output.

Example 252

This example includes any or all of the features of example 251, wherein the message further includes a body portion defining a newly expected value for the one or more expected parameters.

Example 253

This example includes any or all of the features of example 250, wherein the one or more expected parameters of the application's display output include at least one of an orientation expected by the application for the display output, a scale expected by the application for the display output, and a resolution expected by the application for the display output.

Example 254

This example includes any or all of the features of example 250, wherein the message is further configured to cause the target screen to terminate an existing window in which the video information is displayed and to open a new window for displaying the video information consistent with the changes in one or more expected parameters of the application's display output.

Example 255

This example includes any or all of the features of example 250, further including, with the mobile computing device: monitoring for receipt of an acknowledgement message from the target screen that acknowledges the change in one or more expected parameters.

Example 256

This example includes any or all of the features of example 219, further including, with the mobile computing device: in response to receiving encoded information, routing the encoded information to the target display for decoding.

Example 257

This example includes any or all of the features of example 256, wherein the encoded information includes encoded video.

Example 258

This example includes any or all of the features of example 256, further including, with the mobile computing device: process information affiliated with the encoded information to produce a framebuffer output.

Example 259

This example includes any or all of the features of example 219, wherein the mobile computing device further includes a first database correlating one or more input device outputs with one or more actions, wherein the method further includes, with the mobile computing device: monitoring for receipt of an input device output from least one input device so as to determine a detected input device output; comparing the detected input device output to input device outputs in the first database; and when the detected input device output matches or correlates to an input device output in the input device database, performing the one or more actions correlating to the input device output in the first database.

Example 260

This example includes any or all of the features of example 259, wherein the at least one input device includes at least one of a mouse, a keyboard, a trackball, a trackpad, and a motion sensor.

Example 261

This example includes any or all of the features of example 259, further including, with the mobile computing device: determining whether a predetermined time period has expired when a detected input device output correlating to an input device output in the first database is not detected; continuing to monitor for a detected input device output correlating to a input device output in the data base when the predetermined time period has not expired; and terminating monitoring for the detected input device output when the predetermined time period has expired.

Example 262

This example includes any or all of the features of example 259, wherein the first database further includes at least one contextual modifier modifying the at least one action associated with at least one input device output in the first database, and the method further includes, with the mobile computing device: determining whether the at least one contextual modifier is present when a detected input device output matches or correlates to a input device output in the first database; and performing an action consistent with the input device output in the first database and the contextual modifier.

Example 263

This example includes any or all of the features of example 262, wherein the contextual modifier includes at least one of a status of an application executed on the mobile computing device, a magnitude of the detected input device output, an input action reported by the at least one input device, and combinations thereof.

Example 264

This example includes any or all of the features of example 262, wherein the at least one input device includes a button and a motion sensor, the input action includes a press of the button, the contextual modifier including a combination of the input action and an output from the motion sensor.

Example 265

This example includes any or all of the features of example 259, wherein the application includes a social media application, the first database correlates a first input device output with initiation of the execution of the social media application and a second input device output with performance of an action within the social media application; and the method further includes, with the mobile computing device: executing the social media application when the detected input device output matches or correlates to the first input device output; and performing the action within the social media application when the detected input device output matches or correlates to the second input device output.

Example 266

This example includes any or all of the features of example 259, wherein the mobile computing device further includes a security database correlating one or more input device outputs with one or more authenticated users of the mobile computing device, wherein the method further includes, with the mobile computing device: comparing the detected input device output to input device outputs in the security database; and granting access to the mobile computing device when the detected input device output matches or correlates to an input device output in the security database.

Example 267

This example includes any or all of the features of example 259, wherein the mobile computing device includes a protected environment and the security database is stored in the protected environment.

Example 268

This example includes any or all of the features of example 226, further including, with the mobile computing device: inserting a digital pointer into the frame buffer at a position based at least in part on an output of an input device such that the video information includes the digital pointer.

Example 269

This example includes any or all of the features of example 268, further including, with the mobile computing device: changing the position of the digital pointer at least in part based on a detected change in the output of the input device.

Example 270

This example includes any or all of the features of example 269, further including, with the mobile computing device: converting the output of the input device to two-dimensional screen surface coordinates; inserting the digital pointer into the frame buffer at a position based at least in part on the two-dimensional screen surface coordinates; and changing the position of the digital pointer based at least in part on a detected change in the two-dimensional screen surface coordinates.

Example 271

This example includes any or all of the features of example 268, wherein the at least one input device includes at least one of a mouse, a keyboard, a trackball, a trackpad, and a motion sensor.

Example 272

This example includes any or all of the features of example 268, further including, with the mobile computing device: monitoring the output of the input device for a detected input device event; and reporting the detected input device event to at least one of the application and the operating system, so as to cause the application, the operating system, or a combination thereof to execute an action consistent with the detected input device event.

Example 273

This example includes any or all of the features of example 272, wherein the application includes at least one social media application.

Example 274

This example includes any or all of the features of example 272, wherein the detected input device event includes at least one of motion of the at least one input device, a gesture with the at least one input device, a drag with the at least input device, and a press of a button on the at least one input device.

Example 275

This example includes any or all of the features of example 268, wherein the input device is coupled to the mobile computing device via a wired connection, wireless connection or combination thereof.

Example 276

This example includes any or all of the features of example 268, further including, with the mobile computing device: monitoring for receipt of the output of the input device from the target screen; and inserting a digital pointer into the frame buffer at a position based at least in part on the output of the input device.

Example 277

This example includes any or all of the features of example 276, wherein the paired connection is bidirectional and the method further includes, with the mobile computing device, monitoring for the receipt of the output of the input device via at least the paired connection.

Example 278

This example includes any or all of the features of example 276, further including, with the mobile computing device: monitoring for receipt of the output of the input device via at least a backchannel established between the mobile computing device and the target screen, the backchannel being different than the paired connection.

Example 279

This example includes any or all of the features of example 276, further including, with the mobile computing device: scaling pixel coordinates corresponding to the output of the input device to a native resolution of at least one of the operating system and the application.

Example 280

This example includes any or all of the features of example 276, further including, with the mobile computing device: in response to receipt of a data signal from the target screen including packets in which the output of the input device is encoded, decoding the packets to obtain the output of the input device.

Example 281

This example includes any or all of the features of example 219, further including, with the mobile computing device: establishing an additional paired connection with at least one additional non-integral target screen; and transmitting the video signal to the target screen and the at least one additional non-integral target screen.

Example 282

This example includes any or all of the features of example 281, further including, with the mobile computing device: limiting a degree to which the target screen and the at least one additional non-integral target screen have access to resources on the mobile computing device, control over the mobile computing device, or a combination thereof.

Example 283

This example includes any or all of the features of example 282, wherein the limiting access includes, with the mobile computing device: transmitting an access control token to one or more of the target screen and the at least one additional non-integral target screen, the access control token configured to enable a specified degree of access to resources on the mobile computing device, a specified degree of control over the mobile computing device, or a combination thereof.

Example 284

This example includes any or all of the features of example 283, wherein the mobile computing device transmits the access control token in response to a gesture made with the mobile computing device.

Example 285

This example includes any or all of the features of example 282, further including, with the mobile computing device: monitoring for the receipt of a signal from one or more of the target screen and the at least one additional non-integral target screen, the signal specifying the performance of at least one operation; and executing the at least one operation in response to receipt of the signal.

Example 286

This example includes any or all of the features of example 283, further including, with the mobile computing device: issuing the access control token to one or more of the target screen and the at least one additional non-integral target screen; monitoring for receipt of a signal from one or more of the target screen and the at least one non-integral target screen, the signal specifying at least one operation for execution on the mobile computing device; and in response to receipt of the signal: ignoring the operation when the signal is received from a target screen that does not possess the access control token; and executing the operation with the mobile computing device when the signal is received from a target screen that possesses the access control token.

Example 287

This example includes any or all of the features of example 286, wherein the operation involves resources on the mobile computing device, and the method further includes, with the mobile computing device: determining, prior to executing the operation, whether a target screen that possesses the access control token has been granted sufficient access or sufficient control over the resources to perform the operation.

Example 288

This example includes any or all of the features of example 283, further including, with the mobile computing device: modifying the specified degree of access to resources on the mobile computing device, the specified degree of control over the mobile computing device, or a combination thereof by altering an access control token issued to one or more of the target screen and the at least one additional non-integral target screen, revoking an access control token issued to one or more of the target screen and the at least one additional non-integral target screen, or a combination thereof.

Example 289

This example includes any or all of the features of example 219, wherein: the target screen includes a plurality of target screens; the mobile computing device is configured to interchangeably dock with each of the plurality of target screens; and establishing the paired connection includes docking the mobile computing device with at least one of the target screens.

Example 290

This example includes any or all of the features of example 289, wherein the mobile computing device includes at least one docking connector configured to mate with a corresponding connector of each of the plurality of target screens.

Example 291

This example includes any or all of the features of example 289, wherein the mobile computing device is configured to be receivably engaged within a docking recess of each of the plurality of target screens.

Example 292

This example includes any or all of the features of example 219, wherein the target screen includes one or more resources, and the method further includes, with the mobile computing device: asserting control over the one or more resources.

Example 293

This example includes any or all of the features of example 292, wherein the one or more resources include at least one of a supplemental power source, an input device, a sensor, and a cellular radio.

Example 294

This example includes any or all of the features of example 292, wherein the one or more resources include at least one sensor selected from the group consisting of a camera, a global positioning sensor, a biometric scanner.

Example 295

This example includes any or all of the features of example 219, further including, with the mobile computing device: attempting to establish a direct wired or wireless connection to a wide area network; when a direct connection the wide area network cannot be achieved, sending a data signal to at one or more elements of a mesh network, the data signal configured to cause the one or more elements to route the data signal to the wide area network, either directly or by routing the data signal through at least one additional element of the wide area network.

Example 296

This example includes any or all of the features of example 295, wherein the elements of a mesh network include at least one of an additional mobile computing device, a target screen, a WiFi network, and a television white space network.

Example 297

This example includes any or all of the features of example 295, wherein the mobile computing device is configured to receive data signals from the wide area network directly or via one or more of the elements of the mesh network.

Example 298

This example includes any or all of the features of example 295, further including, with the mobile computing device: establishing a communications channel with the at least one element of the mesh network.

Example 299

This example includes any or all of the features of example 295, further including, with the mobile computing device: monitoring at least one of an amount of data sent by the mobile computing device through the mesh network and an amount of data received by the mobile computing device through the mesh network; and correlating the amount of data sent by the mobile computing device through the mesh network, the amount of data received by the mobile computing device, or a combination thereof to a reward.

Example 300

This example includes any or all of the features of example 219, wherein the mobile computing device includes a plurality of wireless communications interfaces supporting a plurality of communication modes, and the method further includes, with the mobile computing device: in response to receiving a request to transmit a data signal, analyzing the request and assign an urgency level to the data signal; and selecting one or more of the communication modes based at least in part on the urgency level.

Example 301

This example includes any or all of the features of example 300, wherein the plurality of communication modes includes a relatively expensive communication mode and a relatively inexpensive communication mode, and the method further includes, with the mobile computing device: selecting the relatively expensive communication mode or the relatively inexpensive communication mode for transmission of the data signal based at least in part on a comparison of the urgency level to a predetermined urgency threshold.

Example 302

This example includes any or all of the features of example 301, further including, with the mobile computing device: selecting the relatively expensive communication mode for transmission of the data signal when the urgency level meets or exceeds the predetermined urgency threshold; and selecting the relatively inexpensive communication mode for transmission of the data signal when the urgency level is less than the predetermined urgency threshold.

Example 303

This example includes any or all of the features of example 301, further including, with the mobile computing device: selecting the relatively expensive communication mode and the relatively expensive communication mode for transmission of the data signal when the urgency level meets or exceeds the predetermined urgency threshold.

Example 304

This example includes any or all of the features of example 219, wherein the mobile computing device includes a plurality of wireless communications interfaces supporting a plurality of communication modes, and the method further includes, with the mobile computing device: in response to a request to send a data signal by an application executed on the mobile computing device, selecting one or more of the plurality of communication modes for the transmission of the data signal based at least in part on a comparison of bandwidth requirements of the application to bandwidth available to the mobile computing device through one or more of the plurality of communication modes.

Example 305

This example includes any or all of the features of example 304, further including, with the mobile computing device: selecting one or more of the communication modes for transmission of the data signal based at least in part on the maintenance of a predetermined quality of service.

Example 306

This example includes any or all of the features of example 219, further including, with the mobile computing device: transmitting a data signal including contextual information to at least one server, the data signal configured to cause the server to determine at least one of a type and nature of data to push to the mobile computing device in at least one push operation based at least in part on the contextual information.

Example 307

According to this example there is provided at least one computer readable medium including computer readable instructions which when executed by a processor of a mobile computing device cause the mobile computing device to perform the method of any one of examples 219 to 306.

Example 308

According to this example there is provided a method, the method including, with a screen: transmitting an identifier message with a screen including a display, the identifier message configured to cause a mobile computing device to identify the screen; establishing a paired connection with the mobile computing device over at least one of a wired and wireless interface; and in response to receiving with the screen a media signal containing video information via the paired connection, displaying the video information on the display; wherein: the mobile computing device lacks an integral display; and the video information is generated by at least one of an application executed on the mobile computing device and an operating system executed on the mobile computing device.

Example 309

This example includes any or all of the features of example 308, wherein the screen includes a processor selected from the group consisting of an application specific integrated circuit, a general purpose processor, and combinations thereof.

Example 310

This example includes any or all of the features of example 308, further including, with the screen: monitoring for receipt of a pairing request message from the mobile computing device; and in response to the pairing request message, transmitting the identifier message to the mobile computing device and establishing the paired connection with the mobile computing device.

Example 311

This example includes any or all of the features of example 308, wherein the media signal includes packets encoding the video information, and the method further includes: decoding the packets with the screen to obtain the video information contained therein.

Example 312

This example includes any or all of the features of example 308, further including, with the screen: in response to receipt of an output signal from an input device, monitoring the output signal for an input device event; and in response to detection of an input device event, reporting the input device event to the mobile computing device via the paired connection.

Example 313

This example includes any or all of the features of example 312, wherein the screen is configured to receive the output signal via a wired connection with the input device, a wireless connection with the input device, or a combination thereof.

Example 314

This example includes any or all of the features of example 312, wherein the input device event includes at least one of a mouse click, a mouse release, a touch input, a swipe operation, and a motion operation.

Example 315

This example includes any or all of the features of example 312, further including, with the screen: reporting the input device event to the mobile computing device at least in part by transmitting a reporting signal containing an input device report, the input device report identifying the input device event.

Example 316

This example includes any or all of the features of example 315, wherein the wired interface includes a media interface, and the method further includes, with the screen: establishing the paired connection with the mobile computing device at least in part using the media interface; and transmitting the reporting signal at least in part over the paired connection.

Example 317

This example includes any or all of the features of example 315, wherein the input device report includes at least one of pixel coordinates specifying a location of the input device event and pixel coordinates specifying a type of the input device event.

Example 318

This example includes any or all of the features of example 315, wherein the screen includes a wireless communication interface, and the method further includes, with the screen: establishing a wireless backchannel between the wireless communication interface and the mobile computing device; and transmitting the reporting signal to the mobile computing device via the wireless backchannel.

Example 319

This example includes any or all of the features of example 308, wherein the screen is selected from the group consisting of a dumb screen and a smart screen.

Example 320

This example includes any or all of the features of example 308, wherein the screen is a dumb screen selected from the group consisting of a television, a computer monitor, a display dock, and a projector.

Example 321

This example includes any or all of the features of example 308, wherein screen is a smart screen selected from the group consisting of a laptop computer display, a display coupled to a desktop computer, an electronic reader display, a table personal computer display, a personal data assistant display, a smart phone display, and a cellular phone display.

Example 322

This example includes any or all of the features of example 319, wherein the screen forms part of at least one of an automobile, an airplane, a bicycle, a motorcycle, a snowmobile, a train, a medical device, a heads up display, a control interface, an electronic shopping portal, a kiosk, a restaurant menu, binoculars, eye ware, a food preparation tool, audio equipment, a medical record system, a financial transaction system, a badge, and clothing.

Example 323

This example includes any or all of the features of example 308, wherein the wired communication interface includes a media interface, the media interface including at least one of a digital video interface (DVI), a high definition multimedia interface (HDMI), and a universal serial bus (interface).

Example 324

This example includes any or all of the features of example 308, where the wired communication interface includes a media interface, the media interface including a docking connector configured to couple with a corresponding connector of the mobile computing device.

Example 325

This example includes any or all of the features of example 308, wherein the screen includes a screen body configured to physically couple with the mobile computing device.

Example 326

This example includes any or all of the features of example 325, wherein the wired communication interface includes a media interface, the media interface including at least one docking connector, the at least one docking connector being configured to couple with a corresponding connector of the mobile computing device when the screen body and the mobile computing device are physically coupled.

Example 327

This example includes any or all of the features of example 325, wherein the screen body includes a recess to receivably engage the mobile computing device.

Example 328

This example includes any or all of the features of example 326, wherein the screen body includes a recess to receivably engage the mobile computing device, and the docking connector is located within the recess.

Example 329

This example includes any or all of the features of example 308, further including, with the screen: establishing the paired connection at least in part with the wireless communication interface.

Example 330

This example includes any or all of the features of example 329, wherein the wireless communications interface is configured to communicate using short range communication.

Example 331

This example includes any or all of the features of example 330, wherein the short range communication includes near field communication.

Example 332

This example includes any or all of the features of example 330, wherein the screen includes a screen body configured to physically couple with the mobile computing device such that the wireless communication interface is in proximity to a corresponding wireless communication interface of the mobile computing device.

Example 333

This example includes any or all of the features of example 332, wherein the screen body includes a recess configured to receivably engage the mobile computing device, wherein the wireless computing interface is located within or proximate to the recess.

Example 334

This example includes any or all of the features of example 308, wherein the identifier message includes an internet protocol address of the screen.

Example 335

This example includes any or all of the features of example 308, wherein the screen further includes a radio frequency identifier (RFID) tag storing an identifier of the screen, the identifier message includes the identifier, and the method includes transmitting the identifier message at least in part using the RFID tag.

Example 336

This example includes any or all of the features of example 308, further including, with the screen: in response to receiving a pairing key from the mobile computing device, establishing the paired connection at least in part using the pairing key.

Example 337

This example includes any or all of the features of example 336, further including, with the screen: in response to receiving the pairing key from the mobile computing device, displaying the pairing key on the display.

Example 338

This example includes any or all of the features of example 336, further including, with the screen: determining whether the pairing key is valid; terminating pairing with the mobile computing device when the pairing key is invalid; and establishing the paired connection at least in part by establishing a pairing session and a communication channel with the mobile computing device when the pairing key is valid.

Example 339

This example includes any or all of the features of example 338, wherein the communication channel is bidirectional.

Example 340

This example includes any or all of the features of example 338, wherein the communication channel is unidirectional.

Example 341

This example includes any or all of the features of example 338, further including, with the screen: establishing the paired connection using the wireless communication protocol when the pairing key is valid.

Example 342

This example includes any or all of the features of example 341, wherein the wireless communication protocol includes at least one of a transmission control protocol (TCP), a universal datagram protocol (UDP), and an internet protocol.

Example 343

This example includes any or all of the features of example 338, further including, with the screen: establishing a wireless backchannel between the wireless communication interface and the mobile computing device.

Example 344

This example includes any or all of the features of example 343, further including, with the screen: establishing the wireless backchannel at least in part by negotiating with the mobile computing device a mutually supported socket for use in the wireless backchannel.

Example 345

This example includes any or all of the features of example 344, wherein the mutually supported socket is a real time streaming protocol (RTSP) socket.

Example 346

This example includes any or all of the features of example 308, further including, with the screen: monitoring for receipt of a public pairing request from the mobile computing device, the public pairing request including the pairing request message; in response to receipt of the public pairing request, ignoring other pairing request messages and public pairing requests for a predetermined period of time.

Example 347

This example includes any or all of the features of example 346, further including, with the screen: in response to receipt of the public pairing request, monitoring for receipt of a connection key.

Example 348

This example includes any or all of the features of example 347, further including, with the screen: terminating pairing with the mobile computing device when the connection key is not received within a predetermined time period; and in response to receipt of the connection key within a predetermined time period, transmitting the connection key to the mobile computing device.

Example 349

This example includes any or all of the features of example 308, wherein the paired connection is a peer to peer connection between the screen and the mobile computing device.

Example 350

This example includes any or all of the features of example 346, wherein the screen includes a memory having a connection key stored therein, and the method further includes, with the screen: transmitting the connection key to the mobile computing device in response to receipt of the public pairing request.

Example 351

This example includes any or all of the features of example 308, further including, with the screen: validating an identity of a user of the mobile computing device prior to establishing the paired connection.

Example 352

This example includes any or all of the features of example 308, further including, with the screen: initiating pairing with the mobile computing device by transmitting a pairing request message to the mobile computing device.

Example 353

This example includes any or all of the features of example 352, wherein the screen includes a sensor and the wireless communication interface, the method further including, with the screen: monitoring an output of at least one of the sensor and the wireless communication interface so as to detect the presence of a compatible mobile computing device; in response to detection of a compatible mobile computing device, initiating pairing with the compatible mobile computing device at least in part by transmitting the pairing request message to the compatible mobile computing device.

Example 354

This example includes any or all of the features of example 352, wherein the pairing request message includes an identifier of the screen, and a description of communication modes supported by the screen.

Example 355

This example includes any or all of the features of example 352, wherein the screen includes the wireless communication interface, and the method further includes, with the screen: transmitting the pairing request message using the wireless communication interface and a short range communication protocol.

Example 356

This example includes any or all of the features of example 352, further including, with the screen: establishing a first level connection with the mobile computing device prior to establishing the paired connection; attempting to establish a root of trust with the mobile computing device via the first level connection; terminating pairing with the mobile computing device when a root of trust is not established within a predetermined time period; and continuing to establish the paired connection with the mobile computing device when a root of trust is established within a predetermined time period.

Example 357

This example includes any or all of the features of example 356, further including, with the screen: validating an identity of a user of the mobile computing device prior to establishing the paired connection; terminating pairing with the mobile computing device when the identity of the user is not verified within a predetermined time period; and continuing to establish the paired connection with the mobile computing device with the identity of the user is verified within the predetermined time period.

Example 358

This example includes any or all of the features of example 308, further including, with the screen: placing the screen into a pairing mode; and transmitting a lockdown signal, the lockdown signal configured to cause at least one second screen in proximity to the screen to enter a lockdown state in which the second screen becomes unavailable for pairing with the mobile computing device.

Example 359

This example includes any or all of the features of example 358, wherein placing the screen into the pairing mode is in response to receipt of a pairing request message from the mobile computing device, an input made to the screen, or a combination thereof.

Example 360

This example includes any or all of the features of example 358, further including, with the screen: transmitting a release signal configured to release the at least one second screen from the lockdown state.

Example 361

This example includes any or all of the features of example 308, further including, with the screen: placing the screen into a pairing mode; in response to the receipt of multiple pairing request messages from different mobile computing devices within a specified time period, ignoring the multiple pairing request messages; in response to the receipt of a single pairing request message from a single mobile computing device within a specified time period, transmitting the identifier message to the mobile computing device.

Example 362

This example includes any or all of the features of example 308, wherein the video information includes packets encapsulating frames of a frame buffer of as least one of the application and the operating system, and the method further includes, with the screen: in response to receiving the media signal, processing the packets to obtain the frames; and displaying the video information on the display.

Example 363

This example includes any or all of the features of example 362, wherein the frames are compressed, and the method further includes, with the screen: decompressing the frames prior to displaying the video information on the display.

Example 364

This example includes any or all of the features of example 363, wherein the packets include a header identifying at least one of a type and level of compression applied to the frames, and the method further includes, with the screen: inspecting the header to determine at least one of the type and level of compression before decompressing the frames.

Example 365

This example includes any or all of the features of example 362, wherein the frames are encrypted frames, and the method further includes, with the screen: decrypting the encrypted frames to obtain the frames.

Example 366

This example includes any or all of the features of example 308, wherein the video information includes a video produced from captured frames of a frame buffer of at least one of the application and the operating system, the video being encoded in a video format, and the method further includes, with the screen: in response to receiving the media signal, decoding the video and display the video information on the display.

Example 367

This example includes any or all of the features of example 366, wherein the video is compressed, and the method further includes, with the screen: decompressing the video prior to displaying the video information on the display.

Example 368

This example includes any or all of the features of example 366, wherein the screen is configured to receive the media signal in accordance with a real time streaming protocol (RTSP).

Example 369

This example includes any or all of the features of example 366, wherein the video is encrypted video, and the method further includes, with the screen: decrypting the encrypted video to obtain the video.

Example 370

This example includes any or all of the features of example 308, further including, with the screen: monitoring a display performance characteristic of the display of the video information on the screen; and transmitting a report to the mobile computing device, wherein the report includes the performance characteristic and is configured to cause the mobile computing device to compare the display performance characteristic against a predetermined performance threshold to determine whether performance of the screen is satisfactory.

Example 371

This example includes any or all of the features of example 370, further including, with the screen: when the performance of the screen is unsatisfactory, establishing a supplementary connection with the mobile computing device an additional transmission mode, the additional transmission mode being other than a first transmission mode upon which the paired connection is established; and in response to receipt of video information via the paired connection and the supplementary connection, displaying the video information.

Example 372

This example includes any or all of the features of example 370, wherein the display performance characteristic includes at least one of frames per second of the video information that are displayed by the display, a number of frames of the video information that are dropped by the display, a time between frame updates of the display, and a speed with which video information is received from the mobile computing device.

Example 373

This example includes any or all of the features of example 371, wherein the first transmission mode is a short range communication mode, and the additional transmission mode is a long range communication mode.

Example 374

This example includes any or all of the features of example 372, wherein the first transmission mode includes a wireless connection between the mobile computing device and the screen, and the additional transmission mode includes a wired connection between the mobile computing device and the screen.

Example 375

This example includes any or all of the features of example 372, wherein the first transmission mode includes a first type of wireless communication, and the second transmission mode includes a second type of wireless communication that is different from the first type of wireless communication.

Example 376

This example includes any or all of the features of example 308, further including, with the screen: in response to receipt of a message conveying a change in one or more expected parameters of a display output of at least one of the application and the operating system, changing at least one characteristic of at least one of the video information and the display such that the video information is displayed on the display in a manner consistent with the change in the one or more expected parameters of the display output.

Example 377

This example includes any or all of the features of example 376, wherein the message includes a header defining the change in expected parameters of the display output, and the method further includes, with the screen: inspecting the header to determine the change in expected parameters of the display output.

Example 378

This example includes any or all of the features of example 377, wherein the message further includes a body portion defining a newly expected value for the one or more expected parameters, and the method further includes, with the screen: inspecting the body of the message to determine the newly expected value for the one or more expected parameters; and changing at least one characteristic of at least one of the video information and the display such that the video information is displayed on the display in a manner consistent with the newly expected value for the one or more expected parameters.

Example 379

This example includes any or all of the features of example 376, wherein the one or more expected parameters of the application's display output include at least one of an orientation expected by the application for the display output, a scale expected by the application for the display output, and a resolution expected by the application for the display output.

Example 380

This example includes any or all of the features of example 376, further including, with the screen: in response to the message, terminating an existing window in which the video information is displayed and open a new window for displaying the video information consistent with the changes in one or more expected parameters.

Example 381

This example includes any or all of the features of example 376, further including, with the screen: in response to receipt of the message, transmitting an acknowledgement message to the mobile computing device, wherein the acknowledgement message is configured to acknowledge the change in one or more expected parameters.

Example 382

According to this example there is provided at least one computer readable medium having computer readable instructions stored therein, wherein the instructions when executed by a processor of a screen cause the screen to perform the method of any one of examples 308 to 381.

The terms and expressions which have been employed herein and in the appendix are used as terms of description and not of limitation, and there is no intention, in the use of such terms and expressions, of excluding any equivalents of the features shown and described (or portions thereof), and it is recognized that various modifications are possible within the scope of the present disclosure. Accordingly, the present disclosure should be construed to cover all such equivalents.

What is claimed is:

1. A mobile computing device comprising a processor and a memory, the memory comprising at least one module comprising computer readable instructions which when executed by said processor causes said mobile computing device to perform the following operations comprising:
  establishing a paired connection with at least one target screen via at least one of a wired and wireless communication interface, wherein the target screen is a screen that is not integral to said mobile computing device; and
  transmitting at least video information generated by at least one of an application on said mobile computing device and an operating system (OS) on said mobile computing device to said target screen over at least said paired connection;
  wherein:
  said mobile computing device lacks an integral display;
  said at least one module comprises an access control module having access instructions which when executed cause said mobile computing device to perform access management operations, said access management operations comprising transmitting a token to the target screen, wherein said token is configured to specify a degree to which the target screen has control over said application on said mobile computing device, said OS on said mobile computing device, or a combination thereof.

2. The mobile computing device of claim 1, comprising a wireless communication interface wherein said at least one module comprises an input device module comprising computer readable instructions which when executed by said processor cause said mobile computing device to wirelessly pair with said at least one input device via said wireless communication interface.

3. The mobile computing device of claim 1, wherein establishing said paired connection comprises:
  causing said mobile computing device to transmit a request message to the target screen, the request message configured to cause the target screen to transmit an identifier to said mobile computing device; and
  causing said mobile computing device to determine the identity of the target screen from at least said identifier.

4. The mobile computing device of claim 3, wherein establishing said paired connection further comprises:
  causing said mobile computing device to establish a pairing session and a unidirectional communications channel with said target screen; and
  causing said mobile computing device to establish a communications backchannel with said target screen.

5. The mobile computing device of claim 1, wherein said video information comprises frames of a frame buffer of at least one of said application executing on said mobile computing device and said operating system (OS) executing on said mobile computing device, and said at least one module comprises a framethrower (FT) module including computer readable FT instructions, wherein said FT instructions when executed by said processor cause said mobile computing device to perform the following operations comprising:
  capturing said frames;
  encapsulating said frames into packets; and
  transmitting said packets to said target screen over said paired connection.

6. The mobile computing device of claim 5, wherein said FT instructions when executed by said processor further cause said mobile computing device to perform the following operations comprising:
  compressing said frames prior to encapsulating said frames into said packets;
  monitoring at least one monitored performance metric; and
  dynamically adjusting at least one of a level and type of compression applied to said frames at least in part on said at least one monitored performance metric.

7. The mobile computing device of claim 1, wherein said video information comprises frames of a frame buffer of said at least one of said application executing on said mobile computing device and said operating system (OS) executing on said mobile computing device, and said at least one module comprises a streamthrower (ST) module including computer readable ST instructions, wherein said ST instructions when executed by said processor cause said mobile computing device to perform the following operations comprising:
  capturing said frames;
  converting said frames into video; and
  transmitting a signal containing said video to said target screen over said paired connection consistent with a predetermined video transmission protocol.

8. The mobile computing device of claim 1, further comprising:
  a first database correlating one or more input device outputs with one or more actions;
  wherein said at least one module comprises a gesture module comprising computer readable gesture instructions, wherein said gesture instructions when executed cause said mobile computing device to perform the following operations comprising:
  monitoring for receipt of an input device output from least one input device so as to determine a detected input device output;
  comparing the detected input device output to input device outputs in said first database; and
  when said detected input device output matches or correlates to an input device output in said input device database, performing said one or more actions correlating to said input device output in said first database.

9. The mobile computing device of claim 1, wherein said computer readable instructions of said at least one module when executed cause said mobile computing device to assert control over one or more resources of said target screen.

10. A screen comprising a display, a processor, and a memory having a device pairing module having computer readable pairing instructions stored thereon, wherein said pairing instructions when executed cause said screen to perform the following operations comprising:
  monitoring for receipt of a pairing request message from a mobile computing device;
  in response to said pairing request message, transmitting an identifier message to said mobile computing device, said identifier message configured to cause said mobile computing device to identify said screen;
  establishing a paired connection with said mobile computing device via at least one of a wired or wireless communication interface;
  receiving a token from the mobile computing device, said token specifying a degree to which the target screen has control over resources of the mobile computing device, said resources of the mobile computing device comprising an application on said mobile computing device, an operating system on said mobile computing device, or a combination thereof; and in response to receipt of a media signal containing at least video information from said mobile computing device over said paired connection, displaying said video information on said display.

11. The screen of claim 10, wherein:

said media signal comprises packets encapsulating said video information;

said screen further comprises a video decode (VD) module stored in said memory, said VD module comprising computer readable VD instructions which when executed by said processor cause said screen to perform the following operations comprising:

in response to receipt of said packets, decoding said packets to obtain the video information contained therein.

12. The screen of claim 10, further comprising an input device monitoring (IDM) module stored in said memory, said IDM module comprising computer readable IDM instructions which when executed by said processor cause said screen to perform the following operations comprising:

monitoring, in response to receipt of an output signal from an input device, the output signal for an input device event; and transmitting, in response to detection of an input device event, a reporting signal to said mobile computing device, the reporting signal containing an input device report identifying said input device event.

13. The screen of claim 12, wherein said screen further comprises a wireless communication interface and a backchannel (BC) module stored in said memory, said BC module comprising computer readable BC instructions which when executed by said processor cause said screen to perform the following operations comprising:

establishing a wireless backchannel between said wireless communication interface and said mobile computing device; and transmitting said reporting signal to said mobile computing device via said wireless backchannel.

14. The screen of claim 10, wherein said pairing instructions when executed by said processor further cause said screen to perform the following operations comprising, in response to receiving a pairing key from said mobile computing device:

displaying said pairing key on said display;

determining whether said pairing key is valid;

terminating pairing with said mobile computing device when said pairing key is invalid; and establishing said paired connection at least in part by establishing a pairing session and a communications channel with said mobile computing device when said pairing key is valid.

15. The screen of claim 10, wherein:

said video information comprises a video produced from captured frames of a frame buffer of at least one said application and said OS, the video being encoded in a video format; and the screen further comprises a video decode (VD) module stored in said memory, said VD module comprising computer readable VD instructions which when executed by said processor cause said screen to perform the following operations comprising, in response to receiving said media signal, decoding said video and displaying said video information on said display.

16. The screen of claim 10, further comprising:

one or more screen resources for supplementing a capability of said mobile computing device upon successful establishment of said paired connection, said one or more screen resources comprising at least one of a power resource, a communication resource, memory resource, processing resource, input device, and a sensor; and at least one module stored in said memory, said at least one module comprising computer readable instructions which when executed by said processor cause said screen to perform the following operations comprising:

in response to establishment of said paired connection, permit said mobile computing device to assert control over said one or more screen resources.

17. The screen of claim 10, further comprising a protected environment and at least one module stored in said memory, said at least one module comprising computer readable instructions which when executed by said processor cause said screen to perform the following operations comprising:

deleting at least a portion of said video information and other information received via said paired connection from said protected environment in response to at least one of:

receipt of a termination signal from said mobile computing device;

expiration of a predetermined time period;

detection of a termination event terminating said paired connection; and detection of communication latency that exceeds a predetermined latency threshold.

18. A method, comprising, with a mobile computing device:

establishing a paired connection with a first target screen via at least one of a wired and a wireless communication interface, wherein the first target screen is a screen that is not integral to said mobile computing device;

transmitting a token to the first target screen over said paired connection, said token specifying a degree to which the first target screen has control over resources of the mobile computing device, said resources of the mobile computing device comprising an application on said mobile computing device, an operating system (OS) on said mobile computing device, or a combination thereof; and transmitting a video signal comprising at least video information generated by at least one of said application on said mobile computing device and said OS on said mobile computing device to the first target screen over the paired connection between said mobile computing device and said first target screen;

wherein:

said mobile computing device lacks an integral display; and said video signal is configured to cause said first target screen to display said video information.

19. The method of claim 18, wherein said video information comprises frames of a frame buffer of at least one of said application on said mobile computing device and said OS on said mobile computing device, and transmitting said video information comprises:

capturing said frames with said mobile computing device;

encapsulating said frames into packets; and transmitting said video signal, the video signal containing said packets;

wherein the video signal is configured to cause the first target screen to process said packets and obtain said video information.

20. The method of claim 18, wherein said video information comprises frames of a frame buffer of at least one of said application on said mobile computing device and said OS on said mobile computing device, and transmitting said video information comprises:
    capturing said frames with said mobile computing device;
    converting said frames into video; and
    transmitting said video signal consistent with a predetermined video transmission protocol, the video signal containing said video.

21. The method of claim 18, further comprising, with said mobile computing device:
    monitoring a display performance characteristic of said first target screen; comparing said display performance characteristic against a predetermined performance threshold to determine whether performance of said first target screen is satisfactory;
    when the performance of said first target screen is satisfactory, continue transmitting said video signal without modification;
    when the performance of said first target screen is unsatisfactory, establishing a supplementary connection with said target screen using an additional transmission mode, the additional transmission mode being other than a first transmission mode upon which said paired connection is established; and
    transmitting said video signal to said first target screen using said paired connection and said supplementary connection.

22. The method of claim 18, wherein said mobile computing device further comprises a first database correlating one or more input device outputs with one or more actions, wherein the method further comprises, with said mobile computing device:
    monitoring for receipt of an input device output from least one input device so as to determine a detected input device output;
    comparing the detected input device output to input device outputs in said first database; and
    when said detected input device output matches or correlates to an input device output in said input device database, performing said one or more actions correlating to said input device output in said first database.

23. The method of claim 18, further comprising, with the mobile computing device:
    inserting a digital pointer into said frame buffer at a position based at least in part on an output of an input device such that said video information comprises said digital pointer.

24. The method of claim 18, further comprising, with said mobile computing device:
    establishing an additional paired connection with a second target screen; and
    transmitting said video signal to said first and second target screens;
    wherein said token is configured to convey control over said resources only to said first target screen.

25. The method of claim 18, wherein said target screen comprises one or more screen resources, and the method further comprises, with the mobile computing device:
    asserting control over said one or more screen resources.

* * * * *